(12) United States Patent
Sasaki et al.

(10) Patent No.: US 7,993,732 B2
(45) Date of Patent: Aug. 9, 2011

(54) HEAT-SENSITIVE PRESSURE-SENSITIVE ADHESIVE AND HEAT-SENSITIVE ADHESIVE MATERIAL

(75) Inventors: Takayuki Sasaki, Mishima (JP);
Mitsunobu Morita, Numazu (JP);
Takehito Yamaguchi, Numazu (JP);
Kunio Hayakawa, Mishima (JP);
Hitoshi Shimbo, Shizuoka (JP); Yutaka Kuga, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1019 days.

(21) Appl. No.: 11/881,234

(22) Filed: Jul. 26, 2007

(65) Prior Publication Data

US 2008/0026205 A1 Jan. 31, 2008

(30) Foreign Application Priority Data

Jul. 28, 2006 (JP) ................. 2006-207015
Jul. 31, 2006 (JP) ................. 2006-207472
Sep. 7, 2006 (JP) ................. 2006-242557
Sep. 7, 2006 (JP) ................. 2006-242707
Mar. 14, 2007 (JP) ................. 2007-065753

(51) Int. Cl.
*B32B 7/02* (2006.01)

(52) U.S. Cl. ........ 428/212; 428/220; 428/323; 428/341; 428/349; 524/147; 524/154

(58) Field of Classification Search ................. 428/212, 428/220, 323, 341, 349; 524/147, 154
See application file for complete search history.

(56) References Cited

U.S. PATENT DOCUMENTS

| | | | | |
|---|---|---|---|---|
| 4,732,961 A | * | 3/1988 | Oka | ................. 528/87 |
| 5,180,627 A | * | 1/1993 | Inoue et al. | ................. 428/214 |
| 6,503,620 B1 | | 1/2003 | Xie et al. | |
| 7,262,514 B2 | * | 8/2007 | Yoshikawa et al. | ........... 257/793 |
| 2001/0018986 A1 | | 9/2001 | Nagai et al. | |
| 2003/0236362 A1 | | 12/2003 | Bluem et al. | |
| 2004/0265573 A1 | | 12/2004 | Morita et al. | |
| 2006/0068191 A1 | | 3/2006 | Goto et al. | |
| 2007/0112113 A1 | | 5/2007 | Yamaguchi et al. | |

FOREIGN PATENT DOCUMENTS

| | | |
|---|---|---|
| EP | 1634936 A2 | 3/2006 |
| JP | 61-9479 | 1/1986 |
| JP | 6-57226 | 3/1994 |
| JP | 6-57233 | 3/1994 |
| JP | 6-25869 | 4/1994 |
| JP | 7-278521 | 10/1995 |
| JP | 2683733 | 8/1997 |
| JP | 9-235528 | 9/1997 |
| JP | 9-265260 | 10/1997 |
| JP | 10-152660 | 6/1998 |
| JP | 11-279495 | 10/1999 |
| JP | 2000-103969 | 4/2000 |
| JP | 2000-191920 | 7/2000 |
| JP | 2000-191922 | 7/2000 |
| JP | 2000-212527 | 8/2000 |
| JP | 2001-64401 | 3/2001 |
| JP | 2002-146303 | 5/2001 |
| JP | 2001-234151 | 8/2001 |
| JP | 2001-262117 | 9/2001 |
| JP | 2002-38123 | 2/2002 |
| JP | 2002-88678 | 3/2002 |
| JP | 2002-114953 | 4/2002 |
| JP | 2002-173662 | 6/2002 |
| JP | 2002-338935 | 11/2002 |
| JP | 2004-117941 | 4/2004 |
| JP | 3556414 | 5/2004 |
| JP | 2006-111865 | 4/2006 |
| JP | 3922688 | 3/2007 |
| WO | WO 01/32796 A1 | 5/2001 |

OTHER PUBLICATIONS

European search report dated Nov. 7, 2007 in connection with corresponding European Patent Application No. 07 11 3344.
Apr. 20, 2010 European Search Report in connection with counterpart European patent application No. EP 07113344.
Hans-Georg Elias (1990), "Makromoleküle Band 1 Grundlagen," Hüthig & Wepf Verlag, Basel Heidelberg, New York, ISBN: 3-85739-101-4, pp. 845-857.
"Handbook of Adhesives", 12th Ed., Kobunshi Kankokai (1980), pp. 131-135 (including partial English translation).

* cited by examiner

*Primary Examiner* — David R Sample
*Assistant Examiner* — Lawrence D Ferguson
(74) *Attorney, Agent, or Firm* — Cooper & Dunham LLP

(57) ABSTRACT

A heat-sensitive pressure-sensitive adhesive which contains at least a thermoplastic resin and a thermofusible material, wherein the thermoplastic resin has a glass transition temperature of −70° C. to −30° C., and the thermofusible material comprises triphenylphosphine, and at least any one of tris(2,4-di-t-butylphenyl)phosphite and tetrakis[3-(3,5-di-t-butyl-4-hydroxyphenyl)propionate]methane, or a heat-sensitive pressure-sensitive adhesive which contains at least a thermoplastic resin, a thermofusible material and a non-thermofusible material, wherein the thermofusible material contains triphenylphosphine.

25 Claims, No Drawings

HEAT-SENSITIVE PRESSURE-SENSITIVE ADHESIVE AND HEAT-SENSITIVE ADHESIVE MATERIAL

BACKGROUND

1. Technical Field

This disclosure relates to a heat-sensitive pressure-sensitive adhesive that is non-adhesive at room temperature, however, can exhibit surface tackiness and maintain the surface tackiness even after the surface tackiness is exhibited, and a heat-sensitive adhesive material using the heat-sensitive pressure-sensitive adhesive.

2. Description of the Related Art

Recently, label adhesive materials are increasingly used for price labels, product (bar code) labels, quality labels, ingredient labels, and advertisement labels (stickers). As for label recording methods, various methods are developed such as inkjet recording methods, heat-sensitive recording methods, and pressure-sensitive recording methods.

Those label adhesive materials typically have a structure, for example, in which a tacky layer and a release paper are laminated on the opposite surface from a surface of the label on which information is recorded. Such a label adhesive material is widely used because after the release paper is peeled off, and the label adhesive material can be easily affixed by only pressure. Generally, after a release paper is peeled off from a label adhesive material, and a label is used, however, it is difficult to collect and recycle the peeled release paper, and in most cases, the peeled release paper discarded subsequently.

Then, recently, a heat-sensitive adhesive label sheet having a heat-sensitive tacky layer containing a heat-sensitive pressure-sensitive adhesive that does not exhibit surface tackiness at room temperature but can exhibit surface tackiness by application of heat and requires no release paper has been a focus of attention (see Japanese Utility Model Application Laid-Open (JP-U) No. 6-25869).

The heat-sensitive adhesive material used for the heat-sensitive adhesive label sheet, as described in Secchaku Binran "Adhesive Handbook", 12th Ed., Kobunshi Kankokai (1980), on pp. 131-135 etc., basically contains a thermoplastic resin having a relatively high glass transition temperature of 0° C. or more and a low-molecule weight compound and further contains a tackiness imparting agent in accordance with necessity.

However, after the heat-sensitive adhesive material used for the heat-sensitive adhesive label sheet exhibit surface tackiness, the adhesive strength degrades with a lapse of time. Further, there is a need to apply a high thermal energy when thermally activated.

To solve the problem, a technique is proposed to reduce thermal energy i.e., impart high sensitivity when thermally activating such a heat-sensitive adhesive label sheet by forming a heat-insulating layer containing a plastic hollow particle and a water-soluble binder in between a support and a heat-sensitive tacky layer (see Japanese Patent (JP-B) No. 2683733 and Japanese Patent Application Laid-Open (JP-A) No. 10-152660).

These proposed heat-sensitive adhesive label sheets are effective in reducing thermal energy when the heat-sensitive tacky layer is thermally activated, however, the adhesive strength to rough-surfaced adherends such as corrugated board is short of the practical level because the water-soluble binder that does not exhibit surface tackiness at room temperature is used therein. In addition, these proposed heat-sensitive adhesive label sheets have not yet resolved the problem that the adhesive strength after exhibiting the surface tackiness degrades with a lapse of time.

As just mentioned above, a heat-sensitive tacky layer in a heat-sensitive adhesive label sheet has shortcomings that the adhesive strength after exhibiting its surface tackiness degrades with time and the adhesive strength to rough-surfaced adherends such as corrugated board is weak. Further, such a heat-sensitive tacky layer in a heat-sensitive adhesive label sheet further has a problem that the surface tackiness is inconveniently exhibited when stored in a roll shape, and a heat-sensitive tacky layer sticks to the back surface of the label sheet (blocking).

There is a contradictory relation between adhesive strength to adherends and blocking resistance. In other words, when adhesive strength is improved, blocking resistance is degraded. In contrast, blocking resistance is improved, adhesive strength to adherends is reduced. Thus, it is very difficult to improve both of the properties, and the present situation is that it has not yet achieved.

For the purpose to enhance the adhesive strength, for examples, attempts to improve adhesion property of label sheets by using ester materials such as dicyclohexyl phthalate as a thermofusible material have been taken so far (see Japanese patent Application Laid-Open (JP-A) Nos. 61-9479 and 7-278521).

However, there is a tendency that adhesive properties of label sheets to adherends are improved by using these thermofusible materials, however, it is still impossible to maintain a stable adhesive strength of a label sheet to rough-surfaced adherends such as corrugated board. Further, when such a label sheet is stored in a roll shape, the label sheet is likely to stick to the back surface thereof, and blocking resistance thereof is significantly low.

In the meanwhile, as a heat-sensitive adhesive material and a heat-sensitive pressure-sensitive adhesive to improve blocking resistance, which is another problem in this area, conventional ones containing various filler components are already known in the art. As additives usually used in a heat-sensitive tacky layer, blocking inhibitors such as inorganic particles and organic particles are also disclosed in the disclosed proposals stated above.

As examples actually using the method, there have been proposed, for example, a method in which a heat-sensitive tacky layer and a thermoplastic resin layer are formed on a support, and a pigment component is contained in the thermoplastic resin layer (see Japanese Patent Application Laid-Open (JP-A) No. 11-279495), and a method in which an oil-absorbing pigment (oil absorption: 100 mL/100 g) is contained in a heat-sensitive tacky layer containing a thermoplastic resin and a solid plasticizer as its main components (see Japanese Patent Application Laid-Open (JP-A) No. 9-235528).

However, any of these proposals could cause a reduction in adhesive strength to adherends because pigment components inhibiting the adhesive strength is added to the outermost layer and cannot improve blocking resistance and adhesive strength. Therefore, they are not suitable for practical use.

Generally, a thermoplastic resin contained in a heat-sensitive pressure-sensitive adhesive is used to give surface tackiness and adhesive force, and a thermofusible material is used to fluidize or soften a thermoplastic resin which is a solid at room temperature (at 20° C.) and has a relatively high glass transition temperature of 0° C. or more, and an adhesion imparting agent to be further added as needed has a function to improve surface tackiness.

In exhibition of the adhesive strength when such a heat-sensitive pressure-sensitive adhesive is used, the adhesiveness of heat-sensitive pressure-sensitive adhesive to the surface of an adherend to be affixed is important, and when irregularities or convexoconcaves of the adherend surface are large, it is hard for the heat-sensitive pressure-sensitive agent to sufficiently exhibit its function. Generally, to exhibit its surface tackiness to an adherent surface having large irregularities or convexoconcaves (rough surface), in heat-sensitive pressure-sensitive adhesives including typical pressure-sensitive adhesives, it is effective to thicken the thickness of a heat-sensitive tacky layer formed in a heat-sensitive pressure-sensitive adhesive, and the thickened tacky layer can compensate for the irregularities of the adherend surface.

However, to thicken the thickness of a heat-sensitive tacky layer is inefficient and is not a practical method because the method is disadvantageous in production cost and that the method requires significantly large amount of thermal energy when the whole of the heat-sensitive tacky layer is heated.

For another method to compensate for irregularities of an adherend surface, softening a heat-sensitive pressure-sensitive adhesive can be considered. In this case, it can be considered that flexibility of the heat-sensitive pressure-sensitive adhesive is changed by a thermoplastic resin and a thermofusible material contained in materials constituting the heat-sensitive pressure-sensitive adhesive. Aiming to improve surface tackiness of a heat-sensitive pressure-sensitive adhesive to not only rough-surfaced adherends but also various adherends, a variety of techniques are proposed.

For example, Japanese Patent Application Laid-Open (JP-A) Nos. 6-57226 and 6-57233 respective propose to use an ethylene-vinyl acetate copolymer having a glass transition temperature of 0° C. or more or a thermoplastic resin (excluding ethylene-vinyl acetate copolymers) having a glass transition temperature of −5° C. or higher, etc as a thermoplastic resin. However, the adhesive strength of the heat-sensitive pressure-sensitive adhesive to vinyl chloride wrap and polyolefin wrap has not yet reached the practical level, although it can obtain relatively favorable results of the adhesion to stainless steel plates.

Further, there are proposals which incorporates improved points to layer structures and heat-fusible materials. For example, Japanese Patent Application Laid-Open (JP-A) No. 9-265260 proposes a heat-sensitive adhesive material that has a base, a heat-sensitive chromogenic layer, and an under layer containing a non-foamable hollow particle formed in between the base and the heat-sensitive chromogenic layer, in which a heat-sensitive pressure-sensitive adhesive containing dicyclohexyl phthalate as a thermofusible material. The heat-sensitive adhesive material achieved a generally satisfactory level in improving heat-sensitivity of the heat-sensitive chromogenic layer and preventing color developing of the ground of the heat-sensitive chromogenic layer when thermally activated, however, when the heat-sensitive adhesive material is affixed, blocking phenomenon occurs at around 40° C., i.e., an unintended adhesive function is exhibited, therefore, the proposed heat-sensitive adhesive material have not yet reached the level needed for practical use.

Further, Japanese Patent Application Laid-Open (JP-A) Nos. 2003-206455 and 2002-38123 respectively propose a heat-sensitive pressure-sensitive adhesive (a delayed tack adhesive) using benzophenone as a thermofusible material. These heat-sensitive pressure-sensitive adhesives respectively have a favorable adhesive strength to mirror finished surfaces like polyolefin and glass, however, have a weak adhesive strength to rough-surfaced adherends such as corrugated boards. When the heat-sensitive pressure-sensitive adhesive is left for a long time after affixed to a corrugated board, the adhesive strength is reduced, resulting in a significant trouble when practically used in physical distribution such as door-to-door parcel delivery, and further, there is a problem that a blocking phenomenon occurs under the conditions of temperature 60° C.

Japanese Patent Application Laid-Open (JP-A) No. 2002-146303 proposes a technique of forming two or more layers of heat-sensitive tacky layer, in which the temperature at which the maximum adhesive strength of the respective heat-sensitive tacky layers can be exhibited differs to each other. According to the technique, the surface tackiness of the heat-sensitive pressure-sensitive adhesive can be exhibited in a wide temperature range of low temperature environments to high temperature environments, however, the adhesive strength to rough-surfaced adherends such as corrugated boards is weak, and a blocking phenomenon may occur due to the effect of a layer capable of exhibiting adhesion at a relatively low temperature.

Japanese Patent (JP-B) No. 3556414 proposes a delayed tack glue using benzotriazole as a thermofusible material. The proposed tack glue is relatively excellent in blocking resistance and can maintain a constant adhesive strength to adherends composed of materials such as paper, glass, metal; and polyolefin resins such as polypropylene and polyethylene for a long period of time, however, it has problems that it does not exhibit its adhesion function under low temperature environments, and the adhesive strength is reduced after affixed to a corrugated board and left for a long time, and the problem posed a major obstacle when practically used in physical distribution such as door-to-door parcel delivery.

Further, as materials that are excellent in adhesion property to adherends and further excellent in blocking resistance, a heat-sensitive pressure-sensitive material using a phosphorus compound, and various adhesive sheets using the heat-sensitive pressure-sensitive material and the like are proposed (see Japanese Patent Application Laid-Open (JP-A) Nos. 2000-103969, 2000-191920, 2000-191922, 2000-212527, 2001-64401, 2001-262117, 2002-88678, 2002-338935, and 2004-117941).

Of these, Japanese Patent Application Laid-Open (JP-A) Nos. 2000-103969, 2000-191920, and 2000-191922 respectively propose a method to improve the adhesive strength of heat-sensitive pressure-sensitive adhesives by using a phosphorous compound having a melting point of 55° C. to 100° C. as a thermofusible material. However, according to the proposals, a blocking phenomenon easily occur because the melting point of the heat-sensitive tacky layer is lowered from 40° C. to 60° C., and under high temperature environments of 40° C., the heat-sensitive tacky layer does not have stickiness and the adhesive strength becomes significantly weak.

JP-A No. 2004-117941 stated above proposes a method to improve both blocking resistance and adhesion function by using a plurality of thermofusible materials selected from phthalic acid esters, phosphorous compounds, phosphate esters, hindered phenol compounds and triazole compounds. However, according to the proposed method, the adhesive strength is reduced with the lapse of time depending on the used thermofusible material, and surface tackiness cannot be exhibited in a wide temperature range of low temperatures (0° C.) to high temperatures (40° C.). Thus, these problems posed a major obstacle in practical use.

Recently, the present inventors proposed in JP-A No. 2006-111865 a heat-sensitive adhesive label sheet having at least a tacky under layer containing a thermoplastic resin having a glass transition temperature (Tg) of −70° C. to 0° C. and a filler. With use of the heat-sensitive adhesive label sheet, a favorable adhesive strength to rough-surfaced adherends such as corrugated boards can be obtained under the environments of normal temperature and normal humidity (23° C., 65% RH) and even when heated with a thermal head. However, the heat-sensitive adhesive label sheet is insufficient in adhesive strength to rough-surface adherends such as corrugated boards under low temperature environments of 0° C. to 10° C., and when the added amount of a resin for the tacky under layer is increased to increase the adhesive strength under low temperature environments, there is a problem that its blocking resistance is degraded.

As described above, a number of studies on heat-sensitive pressure-sensitive adhesives and heat-sensitive adhesive materials centering on thermofusible materials are provided, however, the present situation is that achieving both improvements in adhesion function and blocking resistance is still at an unsatisfactory level because of its contradictory relation between adhesion function and blocking resistance, and a heat-sensitive pressure-sensitive adhesive and a heat-sensitive adhesive material that has comprehensively excellent properties have not yet been provided so far.

BRIEF SUMMARY

In an aspect of this disclosure, there is provided a heat-sensitive pressure-sensitive adhesive that can maintain an adhesive strength to rough-surfaced adherends such as corrugated boards for a long period of time and exhibit its surface tackiness under the wide-range temperature conditions from low temperatures (0° C.) to high-temperatures (40° C.), and is excellent in blocking resistance and in practicality, allowing for exhibiting its surface tackiness even when affixed with a thermal head, and to provide and a heat-sensitive adhesive material using the heat-sensitive pressure-sensitive adhesive.

In another aspect of this disclosure, there is provided a heat-sensitive pressure-sensitive adhesive and a heat-sensitive adhesive material that can exhibit a high adhesive force under both low temperature and room temperature environments, has a high adhesive strength to rough-surfaced adherends such as corrugated boards, is excellent in thermal responsiveness in exhibition of its adhesive strength even under low energy, enables thermal activation even under low energy, and is also excellent in blocking resistance as well as storage stability without substantially causing a reduction in its adhesive strength with a lapse of time.

In another aspect of this disclosure, there is provided a heat-sensitive adhesive material that has a high adhesive strength to rough-surfaced adherends such as corrugated boards under the environments of low temperatures (0° C.) to room temperature (23° C.), has less reduction in its adhesive strength with a lapse of time, enables thermal activation even under low energy by a thermal head without substantially reducing its adhesive strength with a lapse of time and is also excellent in blocking resistance.

In another aspect of this disclosure, there is provided a heat-sensitive adhesive material that has a high adhesive strength to rough-surfaced adherends such as corrugated boards in a wide temperature range of low temperatures (0° C.) to high temperatures (40° C.), enables thermal activation even under low energy by a thermal head without substantially reducing its adhesive strength with a lapse of time and is also excellent in blocking resistance.

The means to solve the above-noted problems are as follows Various other aspects or features are described herein, such as, for example, the following:

<1> A heat-sensitive pressure-sensitive adhesive, containing a thermoplastic resin, and a thermofusible material, wherein the thermoplastic resin has a glass transition temperature of −70° C. to −30° C., and the thermofusible material contains triphenylphosphine represented by the following Structural Formula (i), and at least any one of tris(2,4-di-t-butylphenyl)phosphite represented by the following Structural Formula (ii) and tetrakis[3-(3,5-di-t-butyl-4-hydroxyphenyl)propionate]methane represented by the following Structural Formula (iii).

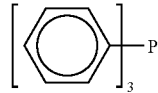

Structural Formula (i)

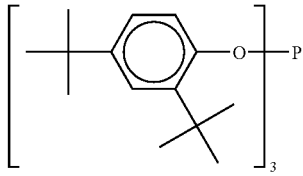

Structural Formula (ii)

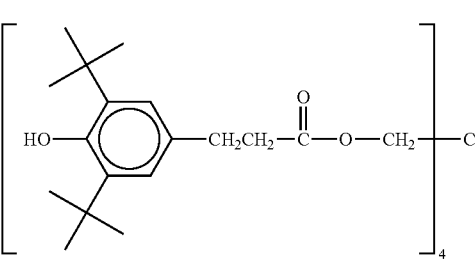

Structural Formula (iii)

<2> The heat-sensitive pressure-sensitive adhesive according to the item <1>, wherein a mass ratio (A:B) of the triphenylphosphine (A) to at least any one of the tris(2,4-di-t-butylphenyl)phosphite and tetrakis [3-(3,5-di-t-butyl-4-hydroxyphenyl)propionate]methane (B) is 75:25 to 50:50.

<3> The heat-sensitive pressure-sensitive adhesive according to the item <1>, further containing a non-thermofusible material, wherein the non-thermofusible material is a spherical particle.

<4> The heat-sensitive pressure-sensitive adhesive according to the item <3>, wherein the non-thermofusible material is any one of a particle containing a silicone resin and a particle containing a crosslinked methyl polymethacrylate.

<5> The heat-sensitive pressure-sensitive adhesive according to the item <1>, used for a heat-sensitive adhesive material which is provided with a support and a heat-sensitive tacky layer containing the heat-sensitive pressure-sensitive adhesive on one surface of the support.

<6> A heat-sensitive pressure-sensitive adhesive, containing a thermoplastic resin, a thermofusible material, and a non-thermofusible material, wherein the thermofusible material contains triphenylphosphine.

<7> The heat-sensitive pressure-sensitive adhesive according to the item <6>, wherein the non-thermofusible material is a spherical particle.

<8> The heat-sensitive pressure-sensitive adhesive according to the item <6>, wherein the non-thermofusible material is any one of a particle containing a silicone resin and a particle containing a crosslinked methyl polymethacrylate.

<9> The heat-sensitive pressure-sensitive adhesive according to the item <6>, wherein a mass ratio of the thermofusible material to the thermoplastic resin is 0.5 to 2.0.

<10> The heat-sensitive pressure-sensitive adhesive according to the item <1>, wherein the thermofusible material contains a dispersing agent, and the dispersing agent is a polyvinyl alcohol resin.

<11> The heat-sensitive pressure-sensitive adhesive according to the item <10>, wherein the polyvinyl alcohol resin has a number average molecular mass of 10,000 to 40,000 and a saponification degree of 70% or more.

<12> The heat-sensitive pressure-sensitive adhesive according to the item <6>, wherein the thermoplastic resin is at least one selected from acrylic acid ester copolymers, methacrylic acid ester copolymers, acrylic acid ester-methacrylic acid ester copolymers, acrylic acid ester-styrene copolymers, acrylic acid ester-methacrylic acid ester-styrene copolymers, and ethylene-vinyl acetate copolymers.

<13> The heat-sensitive pressure-sensitive adhesive according to the item <6>, further containing an adhesion imparting agent, wherein the adhesion imparting agent is at least one selected from rosin ester resins, terpene resins, aromatic-modified terpene resins, terpene phenol resins and hydrogenated terpene resins.

<14> The heat-sensitive pressure-sensitive adhesive according to the item <6>, used for a heat-sensitive adhesive material which is provided with a support and a heat-sensitive tacky layer containing the heat-sensitive pressure-sensitive adhesive on one surface of the support.

<15> A heat-sensitive adhesive material, containing a support, and at least an under layer, and a heat-sensitive tacky layer formed in this order on one surface of the support, wherein the under layer contains a thermoplastic resin having a glass transition temperature (Tg) of −35° C. to 25° C. and a hollow filler, the thermoplastic resin contains any one selected from styrene-butadiene copolymers and modified compounds thereof, the heat-sensitive tacky layer contains a thermoplastic resin, an adhesion imparting agent and a thermofusible material, and the thermofusible material contains at least triphenylphosphine.

<16> The heat-sensitive adhesive material according to the item <15>, wherein the heat-sensitive tacky layer further contains a non-thermofusible material.

<17> The heat-sensitive adhesive material according to the item <16>, wherein the non-thermofusible material contains a particle containing a silicone resin.

<18> The heat-sensitive adhesive material according to the item <15>, wherein the modified compound of styrene-butadiene copolymer is a carboxy-modified styrene-butadiene copolymer.

<19> The heat-sensitive adhesive material according to the item <15>, wherein the hollow filler is a spherical hollow particle having a volume average particle diameter of 2.0 μm to 5.0 μm, and the spherical hollow particle has a hollow rate of 70% or more.

<20> The heat-sensitive adhesive material according to the item <19>, wherein material of the spherical hollow particle is any one of a vinylidene chloride-acrylonitrile copolymer, an acrylonitrile-vinylidene chloride-methyl methacrylate copolymer and an acrylonitrile-methacrylonitrile-isobonyl methacrylate copolymer.

<21> The heat-sensitive adhesive material according to the item <15>, wherein a mixture ratio of the thermoplastic resin to the hollow filler in the under layer is 0.1 parts by mass to 2 parts by mass of the hollow filler to 1 part by mass of the thermoplastic resin.

<22> The heat-sensitive adhesive material according to the item <15>, wherein the thermofusible material further contains a benzotriazole compound represented by the following Structural Formula (1),

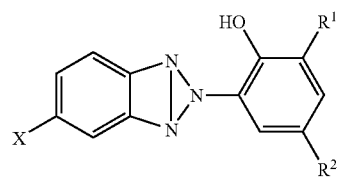

Structural Formula (1)

wherein $R^1$ and $R^2$ may be the same to each other or may be different from each other, and respectively represent any one of a hydrogen atom, an alkyl group and an α,α-dimethylbenzyl group; and X represents any one of a hydrogen atom and a halogen atom.

<23> The heat-sensitive adhesive material according to the item <15>, wherein a content of the triphenylphosphine in the thermofusible material is 50% by mass to 90% by mass.

<24> The heat-sensitive adhesive material according to the item <15>, wherein a dry adhesion amount of the heat-sensitive tacky layer is 5 g/m$^2$ to 20 g/m$^2$.

<25> The heat-sensitive adhesive material according to the item <15>, wherein the support has at least a heat-sensitive recording layer on the opposite surface thereof from the surface having the heat-sensitive tacky layer, and the heat-sensitive recording layer contains at least a leuco dye and a color developer.

<26> The heat-sensitive adhesive material according to the item <15>, formed in any one of a label, a sheet, a label sheet and a roll.

A first embodiment of the aforementioned heat-sensitive pressure-sensitive adhesive contains at least a thermoplastic resin and a thermofusible material, in which the thermoplastic resin has a glass transition temperature of −70° C. to −30° C., and the thermofusible material contains triphenylphosphine represented by the Structural Formula (i) and at least any one of tris(2,4-di-t-butylphenyl) phosphite represented by the Structural Formula (ii) and tetrakis[3-(3,5-di-t-butyl-4-hydroxyphenyl) propionate]methane represented by the Structural Formula (iii). In the heat-sensitive pressure-sensitive adhesive, the glass transition temperature of the thermoplastic resin is −70° C. to −30° C., and the thermofusible material contains triphenylphosphine represented by the Structural Formula (i) and at least any one of tris(2,4-di-t-butylphenyl) phosphite represented by the Structural Formula (ii) and tetrakis[3-(3,5-di-t-butyl-4-hydroxyphenyl) propionate]methane represented by the Structural Formula (iii), and thus the adhesive strength of the heat-sensitive pressure-sensitive adhesive to rough-surfaced adherends such as corrugated boards is high, it enables to exhibit surface tackiness in a wide temperature range of low temperatures (0° C.) to high temperatures (40° C.) and to enhance the blocking resistance, thereby improvements in contradictory properties between adhesion property and blocking resistance can be achieved.

A second embodiment of the aforementioned heat-sensitive pressure-sensitive adhesive contains at least a thermoplastic resin, a thermofusible material, and a non-thermofusible material, and the thermofusible material contains a triphenylphosphine.

In the heat-sensitive pressure-sensitive adhesive according to the second embodiment, it enables improve the adhesive strength to rough-surfaced adherends such as corrugated boards and is excellent in blocking resistance in a condition where it is rolled in shape by using a triphenylphosphine as a thermofusible material in the heat-sensitive tacky layer composed of a heat-sensitive adhesive material and further adding thereto a non-thermofusible material such as a filler to prevent occurrence of blocking. The mechanism that achieves improvements in two contradictory properties between adhesion property and blocking resistance induced by effect of a combination of the thermofusible material and the non-thermofusible material is not clearly understood, however, is assumed as follows.

It is considered that the heat-sensitive tacky layer can be formed in a significantly soft condition when heated by effect of triphenylphosphine used as the thermofusible material. By adding a non-thermofusible material such as a pigment to prevent occurrences of blocking to the system, both adhesion property and blocking resistance can be improved. Specifically, it is considered that in a case of the heat-sensitive pressure-sensitive adhesive using a triphenylphosphine, the blocking resistance can be improved by effect of the non-thermofusible material, and the adhesive strength is not impaired because the triphenylphosphine contained in the heated heat-sensitive tacky layer appears, because of its softness, on the outermost surface layer in space of the non-thermofusible material such as pigment.

It is known that improvements in both adhesive strength and blocking resistance can be achieved only in the case where triphenylphosphine is used as a thermofusible material, and in a system using no triphenylphosphine as a thermofusible material, adhesion property of a heat-sensitive pressure-sensitive adhesive under low temperature environments (0° C.) is insufficient, even though the blocking resistance is increased and improvements in both of the two type properties cannot be achieved. The improvements in both of these properties can be achieved by a combination with the heat-sensitive pressure-sensitive adhesive according to the second embodiment.

Thus, the heat-sensitive pressure-sensitive adhesive according to the second embodiment has a high adhesive strength to rough-surfaced adherends such as corrugated boards and enables improving blocking resistance and achieve both contradictory properties between adhesion property and blocking resistance by the fact that it contains a triphenylphosphine as a thermofusible material and further contains a non-thermofusible material.

A first embodiment of the aforementioned heat-sensitive adhesive material has a support, and a heat-sensitive tacky layer containing a heat-sensitive pressure-sensitive adhesive according to the first embodiment on one surface of the support.

The heat-sensitive adhesive material according to the first embodiment has a support, and a heat-sensitive tacky layer containing the aforementioned heat-sensitive pressure-sensitive adhesive on one surface of the support. Since the heat-sensitive adhesive material contains the aforementioned heat-sensitive pressure-sensitive adhesive, it has a high adhesive strength to rough-surfaced adherends such as corrugated boards and enables to exhibit its surface tackiness under the conditions of a wide temperature range of low temperature environments (0° C.) to high temperature environments (40° C.) and to improve blocking resistance.

A second embodiment of the aforementioned heat sensitive adhesive material has a support and a heat-sensitive tacky layer containing a heat-sensitive pressure-sensitive adhesive according to the first embodiment on one surface of the support.

In the heat-sensitive adhesive material according to the second embodiment, the heat-sensitive tacky layer contains the aforementioned heat-sensitive pressure-sensitive adhesive, and thus it has a high adhesive strength to rough-surfaced adherends such as corrugated boards and enables to improve blocking resistance.

A third embodiment of the heat-sensitive adhesive has a support, and at least an under layer and a heat-sensitive tacky layer formed in this order on one surface of the support, and the under layer contains a thermoplastic resin having a glass transition temperature (Tg) of −35° C. to 25° C., and a hollow filler, and the thermoplastic resin contains one selected from styrene-butadiene copolymers and modified compounds thereof, the heat-sensitive tacky layer contains a thermoplastic resin, an adhesion imparting agent and a thermofusible material, and the thermofusible material contains at least a triphenylphosphine.

The heat-sensitive adhesive material according to the third embodiment has a support, and at least an under layer and a heat-sensitive tacky layer formed in this order on one surface of the support, the under layer contains one selected from styrene-butadiene copolymers having a glass transition temperature (Tg) of −35° C. to 25° C. and modified compounds thereof, a thermofusible material contained in the heat-sensitive tacky layer contains at least a triphenyl phosphine, thereby the heat-sensitive adhesive material has a high adhesive strength to rough-surfaced adherends such as corrugated boards under the environments of low temperatures (0° C.) to room temperature (23° C.), has less reduction in adhesive strength with a lapse of time, enables thermal activation under low energy by a thermal head, and is also excellent in blocking resistance.

Further, as a variant of the heat-sensitive adhesive material according to the third embodiment, an embodiment is preferable which has a support, and at least an under layer and a heat-sensitive tacky layer formed in this order on one surface of the support, the under layer contains a thermoplastic resin having a glass transition temperature (Tg) of −35° C. to 25° C. and a hollow filler, the thermoplastic resin contains any one of a styrene-butadiene copolymer and a modified compound thereof, the heat-sensitive tacky layer contains a thermoplastic resin, an adhesion imparting agent, a thermofusible resin, and a silicone resin particle, and the thermofusible resin contains a triphenylphosphine and a benzotriazole compound represented by the Structural Formula (1). With this configuration, it is possible to obtain a heat-sensitive adhesive material that has a high adhesive strength to rough-surfaced adherends such as corrugated boards under the wide temperature environments of low temperatures (0° C.) to high temperatures (40° C.), has less reduction in adhesive strength with a lapse of time, enables thermal activation under low energy by a thermal head and is also excellent in blocking resistance.

DETAILED DESCRIPTION OF THE INVENTION (Heat-Sensitive Pressure-Sensitive Adhesive)

The heat-sensitive pressure-sensitive adhesive according to the first embodiment of the present invention contains at least a thermoplastic resin, a thermofusible material, contains a non-thermofusible material, an adhesion imparting agent, and further contains other components in accordance with necessity.

The thermoplastic resin has a glass transition temperature (Tg) of −70° C. to −30° C., and the thermofusible material contains at least a triphenylphosphine and at least any one of a tris(2,4-di-t-butylphenyl)phosphite and a tetrakis[3-(3,5-di-t-butyl-4-hydroxyphenyl)propionate]methane.

The heat-sensitive pressure-sensitive adhesive according to the second embodiment of the present invention contains at least a thermofusible material containing a thermoplastic resin and a triphenylphosphine and a non-thermofusible material and further contains other components in accordance with necessity.

-Thermofusible Material-

Because the thermofusible material is solid at room temperature (at around 20° C.), it does not give plasticity to resins, however, it is fused by application of heat to swell or soften resins to exhibit its surface tackiness, and after fused by application of heat, it is slowly crystallized. Therefore, the thermofusible material can maintain its surface tackiness for a long period of time even after a heat source is eliminated.

In the present invention, the term "has a surface tackiness" means that a subject has both a stickiness that has wet property to adherends in low temperature environments (0° C.) to high temperature environments (40° C.) and elasticity at the level where the subject is hardly peeled off from adherends.

In the first embodiment, the thermofusible material contains a triphenylphosphine represented by the following Structural Formula (i), and at least any one of tris(2,4-di-t-butylphenyl)phosphite represented by the following Structural Formula (ii) and tetrakis[3-(3,5-di-t-butyl-4-hydroxyphenyl)propionate]methane represented by the following Structural Formula (iii).

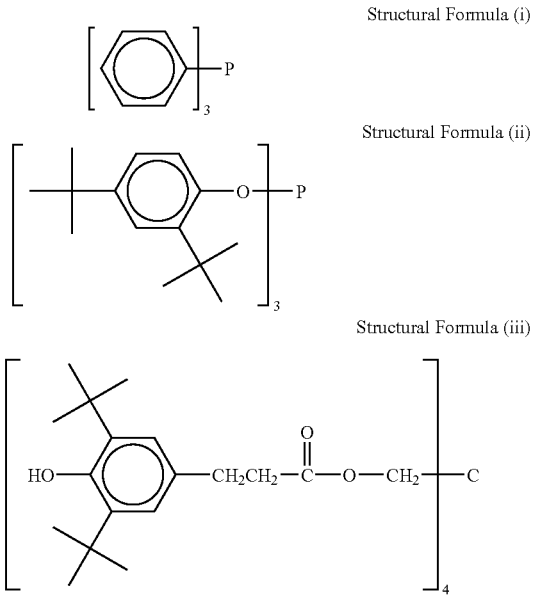

Structural Formula (i)

Structural Formula (ii)

Structural Formula (iii)

A triphenyl phosphine represented by the Structural Formula (i) has a low melting point of 81° C., is fused under low energy, and the surface is fluidized to stick fast to an adherend, and it is excellently soluble in thermoplastic resins and cause no reduction in adhesive strength even when stored for a long period of time.

A tris(2,4-di-t-butylphenyl)phosphite represented by the Structural Formula (ii) has a melting point of 185° C., a function to inhibit blocking during storage and an effect to maintain cohesiveness of the heat-sensitive tacky layer when fused, and can enhance adhesive strength in particular under high temperature (40° C.) environments. By combining the tris(2,4-di-t-butylphenyl)phosphite with any one of the triphenyl phosphine and the tetrakis[3-(3,5-di-t-butyl-4-hydroxyphenyl)propionate]methane, it is possible to form a heat-sensitive adhesive material that does not cause blocking during storage while maintaining its adhesive strength.

A tetrakis[3-3,5-di-t-butyl-4-hydroxyphenyl]propionate] methane represented by the Structural Formula (iii) has a melting point of 110° C., a function to inhibit blocking during storage and an effect to maintain cohesiveness of the heat-sensitive tacky layer when fused, and can enhance adhesive strength in particular under high temperature environments. By combining the tetrakis[3-3,5-di-t-butyl-4-hydroxyphenyl]propionate]methane with any one of the triphenylphosphine and the tris(2,4-di-t-butylphenyl)phosphite, it is possible to form a heat-sensitive adhesive material that does not cause blocking during storage while maintaining its adhesive strength.

A mass ratio (A:B) of the triphenylphosphine (A) to at least any one of the tris(2,4-di-t-butylphenyl)phosphite and the tetrakis [3-3,5-di-t-butyl-4-hydroxyphenyl]propionate] methane (B) is preferably 75:25 to 50 to 50, and more preferably 75:25 to 60:40.

When the proportion of the triphenylphosphine is greater than the mass ratio (A:B), the blocking resistance and surface tackiness under high temperature environments (40° C.) may be reduced. In contrast, when the proportion of the tris(2,4-di-t-butylphenyl)phosphite or the tetrakis [3-3,5-di-t-butyl-4-hydroxyphenyl]propionate]methane is greater than the mass ratio (A:B), the surface tackiness of the heat-sensitive pressure-sensitive adhesive when stored at low temperature environments (0° C.) may be reduced.

In the second embodiment, the thermofusible material must contain a triphenylphosphine ($C_{18}H_{15}P$, melting point of 79° C. to 81° C., colorless (white) solid) and may contain other thermofusible materials in accordance with necessity.

For the other thermofusible materials, for example, the following compounds can be used in combination. Specifically, benzotriazole compounds represented by the following Structural Formula (1), hydroxy benzoate ester compounds represented by the following Structural Formula (2), compounds represented by any one of the following Structural Formulas (3), (4), and (5), and phosphine compounds represented by any one of the following Structural Formulas (6) and (7) can be used in combination.

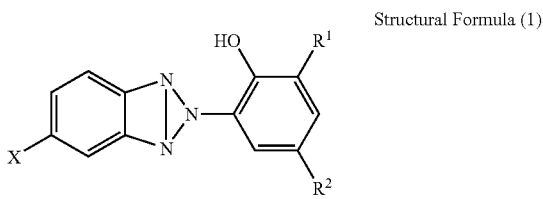

Structural Formula (1)

In the Structural Formula (1), $R^1$ and $R^2$ may be the same to each other or may be different from each other, and respectively represent any one of a hydrogen atom, an alkyl group and an α,α-dimethylbenzyl group; X represents any one of a hydrogen atom and a halogen atom.

The alkyl group preferably has $C_1$ to $C_8$ carbon atoms, and examples thereof include methyl group, ethyl group, n-propyl group, n-butyl group, n-pentyl group, n-hexyl group, and n-heptyl group. Each of these alkyl groups may be further substituted by substituent groups.

Examples of the substituent group include hydroxyl group, halogen atom, nitro group, carboxyl group, cyano group; and alkyl group, aryl group, heterocyclic group that may have specific substituent groups (those may be substituted by, for example, halogen atom or nitro group).

Examples of the halogen atom include fluorine, chlorine, bromine, and iodine.

Examples of the benzotriazole compound represented by the Structural Formula (1) include 2-(2'-hydroxy-5'-methylphenyl)benzotriazole, 2-(2'-hydroxy-5'-t-octylphenyl)benzotriazole, 2-(2'-hydroxy-3'-t-butyl-5'-methylphenyl)-5- chlorobenzotriazole, 2-(2'-hydroxy-3',5'-di-t-amylphenyl) benzotriazole, 2-(2'-hydroxy-3',5'-t-butylphenyl)-5-chlorobenzotriazole, 2-[2'-hydroxy-3',5'-di(1,1-dimethylbenzyl)phenyl]benzotriazole, 2-(2'-hydroxy-3'5'-di-t-butylphenyl)benzotriazole, and 2-(2'-hydroxy-3'-sec-butyl-5'-t-butylphenyl)benzotriazole. Each of these benzotriazole compounds may be used alone or in combination with two or more.

Structural Formula (2)

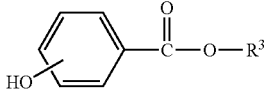

In the Structural Formula (2), $R^3$ represents any one of alkyl group, alkenyl group, aralkyl group, and aryl group, and these groups may be further substituted by substituent groups.

For the alkyl group, alkyl groups having 1 to 18 carbon atoms are exemplified. Specific examples thereof include straight chain alkyl groups such as methyl group, ethyl group, n-propyl group, n-butyl group, n-pentyl group, n-hexyl group, n-heptyl group, n-octyl group, n-nonyl group, and n-decyl group; branched alkyl groups such as isobutyl group, isoamyl group, 2-methylbutyl group, 2-methylpentyl group, 3-methylpentyl group, 4-methylpentyl group, 2-ethylbutyl group, 2-methylhexyl group, 3-methylhexyl group, 4-methylhexyl group, 5-methylhexyl group, 2-ethylpentyl group, 3-ethylpentyl group, 2-methylheptyl group, 3-methylheptyl group, 4-methylheptyl group, 5-methylheptyl group, 2-ethylhexyl group, 3-ethylhexyl group, isopropyl group, sec-butyl group, 1-ethylpropyl group, 1-methylbutyl group, 1,2-dimethylpropyl group, 1-methylheptyl group, 1-ethylbutyl group, 1,3-dimethylbutyl group, 1,2-dimethylbutyl group, 1-ethyl-2-methylpropyl group, 1-methylhexyl group, 1-ethylheptyl group, 1-propylbutyl group, 1-isopropyl-2-methylpropyl group, 1-ethyl-2-methylbutyl group, 1-propyl-2-methylpropyl group, 1-ethylhexyl group, 1-propylpentyl group, 1-isopropylpentyl group, 1-isopropyl-2-methylbutyl group, 1-isopropyl-3-methylbutyl group, 1-methyloctyl group, 1-propylhexyl group, 1-isobutyl-3-methylbutyl group, neopentyl group, tert-butyl group, tert-hexyl group, tert-amyl group, and tert-octyl group; and cycloalkyl groups such as cyclohexyl group, 4-methylcyclohexyl group, 4-ethylcyclohexyl group, 4-tert-butylhexyl group, 4-(2-ethylhexyl)cyclohexyl group, bornyl group, isobornyl group, and adamantyl group. Each of these alkyl groups may be further substituted by substituent groups.

For the alkenyl group, alkenyl groups having 2 to 8 carbon atoms are preferable. Examples thereof include vinyl group, aryl group, 1-propenyl group, methacryl group, crotyl group, 1-butenyl group, 3-butenyl group, 2-pentenyl group, 4-pentenyl group, 2-hexenyl group, 5-hexenyl group, 2-heptenyl group, and 2-octenyl group. Each of these alkenyl groups may be further substituted by substituent groups.

The aralkyl group is not particularly limited and may be suitably selected in accordance with the intended use. Examples thereof include benzyl group, phenylethyl group and phenylpropyl group. Each of these aralkyl groups may be further substituted by substituent groups.

Examples of the aryl group include phenyl group, naphthyl group, anthranil group, fluorenyl group, phenalenyl group, phenanthranil group, triphenylenyl group, and pyrenyl group. Each of these aryl groups may be further substituted by substituent groups.

Examples of the substituent group of the alkyl group, alkenyl group, aralkyl group or aryl group include hydroxyl group, halogen atom, nitro group, carboxyl group, cyano group, and alkyl group, aryl group and heterocyclic group that may have specific substituent groups (those may be substituted by, for example, halogen atom or nitro group).

Examples of the hydroxy benzoate ester compound represented by the Structural Formula (2) include methyl m-hydroxy benzoate, ethyl m-hydroxy benzoate, phenyl m-hydroxy benzoate, methyl p-hydroxy benzoate, ethyl p-hydroxy benzoate, n-propyl p-hydroxy benzoate, n-butyl p-hydroxy benzoate, p-hydroxy stearyl benzoate p-hydroxycyclohexyl benzoate, p-benzyl hydroxy benzoate, p-hydroxychlorobenzyl benzoate, p-hydroxy methylbenzyl benzoate, and p-hydroxy phenyl benzoate. Each of these may be used alone or in combination with two or more.

Structural Formula (3)

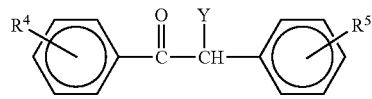

In the Structural Formula (3), $R^4$ and $R^5$ may be the same to each other or may be different from each other, and respectively represent any one of an alkyl group and an alkoxy group; and Y represents any one of a hydrogen atom and a hydroxyl group.

Structural Formula (4)

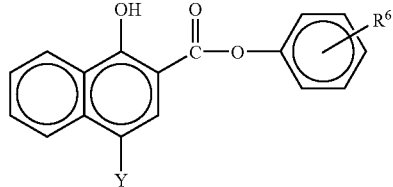

In the Structural Formula (4), $R^6$ represents any one of a hydrogen atom, a halogen atom, an alkyl group and an alkoxy group; and Y represents any one of a hydrogen atom and a hydroxyl group.

Structural Formula (5)

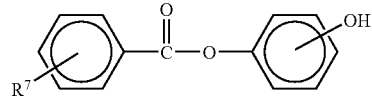

In the Structural Formula (5), $R^7$ represents any one of a hydrogen atom, a halogen atom, an alkyl group, and an alkoxy group.

In the Structural Formulas (3) to (5), for the alkyl group, the same ones mentioned as in the Structural Formula (1) are exemplified.

Examples of the alkoxy group include methoxy group, ethoxy group, propyloxy group, i-propyloxy group, buthoxy group, i-buthoxy group, t-buthoxy group, pentyloxy group, hexyloxy group, cyclohexyoxy group, heptyloxy group, octyloxy group, 2-ethylhexyloxy group, nonyloxy group, decyloxy group, 3,7-dimethyloctyloxy group, and lauryloxy group.

Examples of compounds represented by the Structural Formula (3) include Toluoin, Anisoin, m-Anisoin, Deoxytoluoin, Deoxy Anisonin, 4,4'-Diethyl Benzoin, and 4,4'-Diethoxy Benzoin. Each of these may be used alone or in combination with two or more.

Examples of compounds represented by the Structural Formula (4) include 1-hydroxy-2-phenyl naphthoate, p-chlorophenyl-1-hydroxy-2-naphthoate, 1-hydroxy-2-naphthoic acid-o-chlorophenyl naphthoate, p-methylphenyl 1-hydroxy-2-naphthoate, 1-hydroxy-2-naphthoate-o-methylphenyl, 1,4-dihydroxy-2-phenyl naphthoate, 1,4-dihydroxy-2-naphthoate-p-chlorophenyl, and 1,4-dihydroxy-2-naphthoate-o-chlorophenyl. Each of these may be used alone or in combination with two or more.

Examples of compounds represented by the Structural Formula (5) include 3-hydroxyphenyl benzoate, 4-hydroxyphenyl-benzoate, 2-hydroxyphenyl-benzoate, o-methyl-3-hydroxyphenyl benzoate, and p-chloro-3-hydroxyphenyl benzoate. Each of these may be used alone or in combination with two or more.

Structural Formula (6)

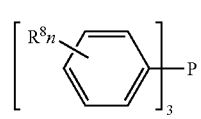

In the Structural Formula (6), $R^8$ represents an alkyl group that may be branched and have 1 to 4 carbon atoms such as methyl group, ethyl group, propyl group, butyl group, and t-butyl group; and "n" represents an integer of 1 to 5.

Structural Formula (7)

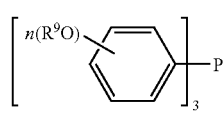

In the Structural Formula (7), $R^9$ represents an alkyl group that may be branched and have 1 to 4 carbon atoms such as methyl group, ethyl group, propyl group, butyl group, and t-butyl group; and "n" represents an integer of 1 to 5.

Examples of compounds represented by the Structural Formula (6) include tri-m-triphosphine, tri-p-tolylphosphine, tri-o-tolylphosphine, tri-2,4-xylene phosphine, tri-2,5-xylene phosphine, tri-2,6-xylene phosphine, tri-3,4-xylene phosphine, and tri-3,5-xylene phosphine. Each of these compounds may be used alone or in combination with two or more.

Examples of compounds represented by the Structural Formula (7) include tris(o-methoxyphenyl)phosphine, tris(m-methoxyphenyl)phosphine, tris(p-methoxyphenyl)phosphine, tris(p-ethoxyphenyl)phosphine, tris(p-n-propyloxyphenyl)phosphine, tris(m-t-buthoxyphenyl)phosphine, tris(m-t-buthoxyphenyl)phosphine, tris(m-n-buthoxyphenyl)phosphine, tris(m-t-buthoxyphenyl)phosphine, tris(m-n-buthoxyphenyl)phosphine, tris(p-n-buthoxyphenyl)phosphine, tris(p-t-buthoxyphenyl) phosphine, and tris(m-t-buthoxyphenyl)phosphine. Each of these compounds may be used alone or in combination with two or more.

For the compounds represented by any one of the Structural Formulas (1) to (7), compounds that are solid at room temperature, however, fused when heated are preferably used. The melting point of these compounds is preferably 70° C. or more, more preferably 80° C. or more, and the maximum value of melting point is around 200° C. When the melting point is lower than 70° C., troubles in storage (blocking) may occur, for example, the adhesive strength of the heat-sensitive pressure-sensitive adhesive prepared with the compounds may exhibit at temperatures for normal storage environments. Further, troubles in production may occur, for example the adhesive strength of the heat-sensitive pressure-sensitive adhesive prepared with the compounds may exhibit when a coating solution for the heat-sensitive pressure-sensitive adhesive is applied and the applied coating solution is dried. In contrast, when the melting point is higher than 200° C., a large amount of energy is required to make the adhesive strength exhibited, and troubles may occur in practical use. Further, when heat-sensitive recording paper having a heat-sensitive recording layer is used as a support, and the adhesive strength is made to exhibit with a large amount of energy, the heat-sensitive recording layer is color-developed. For this reason, there is a problem that an image to be printed may not be read.

Triphenylphosphine and compounds represented by the Structural Formulas (1) to (7), which are the thermofusible materials, are preferably pulverized so as to have a volume average particle diameter of 10 μm or less, and more preferably so as to have a volume average particle diameter of 3 μm or less for use. When the volume average particle diameter of the thermofusible material is within the range, dynamic thermal activation sensitivity is increased, and the thermofusible material is soluble in a thermoplastic resin and an adhesion imparting agent with low energy to be a heat-sensitive pressure-sensitive adhesive. Further, by adjusting the volume average particle diameter of the thermofusible material to less than 3 μm or less, the storage stability of the heat-sensitive pressure-sensitive adhesive can be enhanced at normal storage environments. In other words, the blocking resistance thereof can be enhanced.

Here, the volume average particle diameter of the thermofusible material means an average particle diameter at which the volume percentage becomes 50% and can be measured by laser diffractrometry/scattering method. Specifically, the volume average particle diameter of the thermofusible material was measured using a laser diffractrometry/scattering particle size distribution measuring device "LA920" manufactured by HORIBA Instruments Inc. Namely, the volume average particle diameter means, in the present invention, an average particle diameter corresponding to 50% of cumulative distribution of the thermofusible material in a dispersion.

Except for using a triphenylphosphine alone as the thermofusible material, the triphenylphosphine may be used in combination with a compound represented by any one of the Structural Formulas (1) to (7) at an arbitral mass ratio. When the triphenylphosphine is used alone, it will be a heat-sensitive pressure-sensitive adhesive that is excellent in surface tackiness under low temperature environments, and when it is used in combination with a compound represented by the Structural Formulas (1) to (7), it will be a heat-sensitive pressure-sensitive adhesive that is excellent in blocking resistance.

When the triphenylphosphine is used in combination as above, the content of the triphenylphosphine in the thermofusible material is preferably 50% by mass to 75% by mass, and the content of the compound represented by any one of the Structural Formulas (1) to (7) is preferably 50% by mass to 25% by mass. When the content of the compound represented by the Structural Formulas (1) to (7) is less than 25% by mass, the blocking resistance may be reduced, and when more than 50% by mass, the adhesive strength may be reduced under low temperature environments of 0° C. to 10° C.

The total content of the thermofusible material in the heat-sensitive adhesive material is preferably 25% by mass to 80% by mass, more preferably 40% by mass to 80% by mass, and further preferably 60% by mass to 80% by mass. When the total content is less than 25% by mass, troubles (blocking) may occur during storage, for example, the adhesive strength is exhibited at temperatures for normal storage environments, and when more than 80% by mass, the adhesive strength may be reduced.

The thermofusible material is finely granulated using a wet-process or dry-process pulverizer such as ball mill, sand mill, paint shaker, dyno mill, attritor, and HENSCHEL MIXER and then used as an aqueous dispersion, however, the thermofusible material can be microcapsulated by a conventional method for use. The particle diameter of the thermofusible material is preferably 10 µm or less, and more preferably 5 µm or less. In practical use, the particle diameter is further preferably 0.7 µm to 2 µm.

For a dispersing agent for the thermofusible material, for example, a polyvinyl alcohol resin is preferably used.

The polyvinyl alcohol resin is not particularly limited and may be produced by a conventional method and may contain a monomer that can be copolymerized with other vinyl esters, besides saponified products of polyvinyl acetate. Examples of the monomer include olefins such as ethylene, propylene and isobutylene; unsaturated acids such as acrylic acid, methacrylic acid, crotonic acid, maleic acid, maleic anhydride and itaconic acid or salts thereof, nitriles such as acrylonitrile and methacrylonitrile; amides such as acrylamide and methacryl amide; olefin sulfonates such as ethylene sulfonate, acryl sulfonate and methacryl sulfonate or salts thereof.

Of these, copolymers of olefin sulfonates or salts thereof are particularly preferable from the perspective that they are excellently soluble in thermofusible materials and the adhesion property thereof when thermally fused is improved.

The number average molecular mass of the polyvinyl alcohol resin is preferably 10,000 to 40,000, and more preferably 10,000 to 20,000. When the number average molecular mass is less than 10,000, the binding ability of the heat-sensitive tacky layer may be weakened and the blocking resistance may be substantially reduced. When the number average molecular mass is more than 40,000, the blocking resistance of the heat-pressure pressure-sensitive adhesive is excellent, however, the adhesive strength to rough-surfaced adherends like corrugated boards may be reduced.

The number average molecular mass of the polyvinyl alcohol resin can be measured by gel permeation chromatography (GPC) by using a dispersion in which a polyvinyl alcohol resin is dissolved in a solvent, as a sample.

The saponification degree of the polyvinyl alcohol resin is preferably 70% or more and more preferably 85% or more. When the saponification degree is less than 70%, the water solubility of the polyvinyl alcohol resin itself also tends to be reduced, and thus the polyvinyl alcohol resin hardly disperses thermofusible materials to cause troubles easily in a dispersion step.

When the saponification degree of the polyvinyl alcohol resin can be measured according to JIS K6726, the polyvinyl alcohol test method.

The added amount of the dispersing agent to the thermofusible material is preferably 2 parts by mass to 10 parts by mass, and more preferably 5 parts by mass to 10 parts by mass to 100 parts by mass of the thermofusible material. When the added amount of the dispersing agent is less than 2 parts by mass, the thermofusible material may be insufficiently dispersed to cause troubles in production process. When the added amount is more than 10 parts by mass, the adhesive strength of the heat-sensitive pressure-sensitive adhesive may be reduced.

-Thermoplastic Resin-

The thermoplastic resin is not particularly limited and may be suitably selected in accordance with the intended use, however, when the heat-sensitive pressure-sensitive adhesive of the present invention is used in a heat-sensitive adhesive material and a resin that is the same as a thermoplastic resin used for an under layer to be hereinafter described is used, it is preferable that the adhesive strength to rough-surfaced adherends such as corrugated boards is improved, because the resins used for both of these layers are soluble to each other.

The thermoplastic resin is not particularly limited and may be suitably selected from among those known in the art. Examples thereof include natural rubber latexes with vinyl monomer-graft copolymerized thereon, acrylic acid ester copolymers, methacrylic acid ester copolymers, acrylic acid ester-methacrylic acid ester copolymers, acrylic acid ester-styrene copolymers, acrylic acid ester-methacrylic acid ester-styrene copolymers, and ethylene-vinyl acetate copolymers. Each of these thermoplastic resins may be used alone or in combination with two or more.

In the first embodiment, the thermoplastic resin is required to have a glass transition temperature of −70° C. to −30° C. and preferably have a glass transition temperature of −70° C. to −50° C. When the glass transition temperature of the thermoplastic resin is higher than −30° C., the surface tackiness of the heat-sensitive pressure-sensitive adhesive may be reduced, and when lower than −70° C., the blocking resistance may be reduced.

The glass transition temperature can be measured, for example, by using a physical pendulum, a differential thermal analyzer, or the like.

The content of the thermoplastic resin in the heat-sensitive pressure-sensitive adhesive is preferably 10% by mass to 60% by mass and more preferably 15% by mass to 50% by mass. When the content of the thermoplastic resin is less than 10% by mass or more than 60% by mass, the adhesive strength of the heat-sensitive pressure-sensitive adhesive may be reduced. Particularly when the content of the thermoplastic resin is more than 60% by mass, the surface tackiness is exhibited at temperatures for normal storage environments and troubles in storage (blocking) may occur.

-Non-thermofusible Material-

The non-thermofusible material means a material that does not cause a fusing (meltdown) phenomenon at the time of heating, like organic low molecular weight compounds. Preferred examples of the non-thermofusible material include inorganic fillers, organic fillers and complex fillers composed of organic filler and inorganic filler having a volume average particle diameter of 0.5 µm to 20 µm. The volume average particle diameter of the non-thermofusible material is preferably 1 µm to 10 µm.

The shape of the non-thermofusible material is not particularly limited and may be suitably selected in accordance with the intended use, however, it is preferably formed in a spherically shaped particle.

Examples of the inorganic filler include calcium carbonates, silica, titanium oxides, aluminum hydroxides, clays, calcined clays, magnesium silicates, magnesium carbonates, white carbons, zinc oxides, barium sulfates, and calcium carbonates subjected to a surface treatment.

Examples of the organic filler include fine powders of benzoguanamine-formaldehyde condensates, benzoguanamine-melamine-formaldehyde condensates, methyl polymethacrylate crosslinking compounds, urea-formalin resins, styrene-methacrylic acid copolymers, polystyrene resins. Further, particles of which these organic fillers are respectively processed into a porous structure can also be used.

Examples of the composite filler composed of organic filler and inorganic filler include silica-acryl complex compounds.

Besides the above, a particle of silicone resin, which is excellent in releasing property, can be used. Preferred examples thereof include particles composed of silicone rubber, particles composed of silicone resin, and complex particles composed of silicone rubber and silicone resin.

Among these non-thermofusible materials, organic fillers are preferable. Of these, particles composed of silicone resin and particles composed on crosslinked methyl polymethacrylate (crosslinked PMMA particle) are more preferable. It is considered that materials of these resin particles are excellent in releasing property relating to blocking resistance, and their spherical structures also enhance the effect. When exhibition or activation of surface tackiness caused by a thermal head is considered, these resin particles produce less damage on thermal heads and are excellent in head-matching property.

A mass ratio of the non-thermofusible material to the thermoplastic resin (non-thermofusible material/thermoplastic resin) is preferably 0.5 to 2.0 and more preferably 0.7 to 1.2. When the mass ratio of the non-thermofusible material is less than 0.5, the blocking resistance may be reduced, and when more than 2.0, the surface tackiness may be reduced.

Further, a mass ratio of the non-thermofusible material to the thermofusible material (non-thermofusible material/thermofusible material) is preferably 0.1 to 0.5, and more preferably 0.1 to 0.3.

When the mass ratio of the non-thermofusible material is less than 0.1, the blocking resistance may be reduced, and when more than 0.5, the surface tackiness may be reduced.

-Adhesion Imparting Agent-

The adhesion imparting agent is added to increase the adhesive strength of the heat-sensitive pressure-sensitive adhesive, is not particularly limited and may be suitably selected from among those known in the art. Examples thereof include rosin derivatives such as rosin, polymerized rosin and hydrogenerated rosin; terpene resins such as terpene resin, aromatic modified terpene resin, terpene phenol resin and hydrogenerated terpene resin; petroleum resins, phenol resins, and xylene resins. These adhesion imparting agents are soluble in thermoplastic resins and thermofusible materials, thereby remarkably enhance the adhesive strength of the heat-sensitive pressure-sensitive adhesive.

The melting point or softening point of the adhesion imparting agent is preferably 80° C. or more, and more preferably 80° C. to 200° C. When the melting point or softening point of the adhesion imparting agent is less than 80° C., troubles in storage may occur at temperatures for normal storage environments, i.e., the blocking resistance may be reduced.

The content of the adhesion imparting agent in the heat-sensitive pressure-sensitive agent is preferably 1% by mass to 30% by mass, and more preferably 10% by mass to 20% by mass. When the content of the adhesion imparting agent is less than 1% by mass, the adhesive strength of the heat-sensitive pressure-sensitive adhesive may be reduced, and when more than 30% by mass, troubles in storage may occur at temperatures for normal storage environments, i.e., the blocking resistance may be reduced, and the initial adhesive strength of the heat-sensitive pressure-sensitive adhesive under low temperature environments may be reduced.

(Heat-Sensitive Adhesive Material)

The heat-sensitive adhesive material according to the first embodiment of the present invention has a support and at least a heat-sensitive tacky layer containing a heat-sensitive pressure-sensitive adhesive according to the first embodiment of the present invention on one surface of the support, has an under layer, and further has other layers in accordance with necessity.

The heat-sensitive adhesive material according to the second embodiment of the present invention has a support and at least a heat-sensitive tacky layer containing a heat-sensitive pressure-sensitive adhesive according to the second embodiment of the present invention on one surface of the support, has an under layer, and further has other layers in accordance with necessity.

For the heat-sensitive pressure-sensitive adhesives according to the first and second embodiments, those described above can be used.

The heat-sensitive pressure adhesive according to the third embodiment of the present invention has a support and at least an under layer and a heat-sensitive tacky layer formed in this order on one surface of the support, wherein the under layer contains a thermoplastic resin having a glass transition temperature (Tg) of −35° C. to 25° C. and a hollow filler, and the thermoplastic resin contains any one selected from styrene-butadiene copolymers and modified compounds, the heat-sensitive tacky layer contains a thermoplastic resin, an adhesion imparting agent and a thermofusible material, and the thermofusible material contains at least triphenylphosphine.

Further, as a variant of the heat-sensitive adhesive material according to the third embodiment, a heat-sensitive adhesive material is preferable in which the heat-sensitive tacky layer further contains a non-thermofusible material, and the non-thermofusible material is a particle composed of a silicone resin. Further, it is preferable that the thermofusible material in the heat-sensitive tacky layer is composed of a combination of triphenylphosphine and a benzotriazole compound represented by the Structural Formula (1).

It is preferable that the heat-sensitive adhesive material has a recording layer, or a recording layer and a protective layer formed in this order, on the opposite surface of the support from the surface having the heat-sensitive tacky layer, further other layers may be formed on the opposite surface of the support.

<Support>

The support is not particularly limited as to the shape, structure, size and the like and may be suitably selected in accordance with the intended use. Examples of the shape include a flat plate shape. For the structure, the support may have a single layer structure or may have a multi-layered structure. The size of the support may be suitably selected in accordance with the size of the heat-sensitive adhesive material.

Material of the support is not particularly limited and may be suitably selected in accordance with the intended use. For example, inorganic materials or organic materials are exemplified. Examples of the inorganic materials include glass, quartz, silicon, silicon oxides, aluminum oxides, $SiO_2$ and metals. Examples of the organic materials include papers such as high-quality paper, art paper, coat paper and synthetic paper; cellulose derivatives such as cellulose triacetate; polyester resins such as polyethylene terephthalate (PET) and polybutylene terephthalate; polyolefins such as polycarbonate, polystyrene, polymethyl methacrylate, polyamide, polyethylene and polypropylene. Of these, high-quality paper, coat paper, plastic film and synthetic paper are preferable, and plastic film and synthetic paper are particularly preferable. Each of these materials may be used alone or in combination with two or more.

Examples of the synthetic paper include those made from a synthetic fiber such as polyethylene, polypropylene, polyethylene terephthalate, polyamide, etc. and those with one of these papers partly bonded, or bonded to one surface thereof or bonded to both surfaces thereof. Examples of commercially available products of the synthetic papers include FPG, FGS, GFG and KPK manufactured by YUPO Corporation.

With use of a support made from a film or synthetic paper, liquid infiltration to the heat-sensitive tacky layer is poor as compared to high-quality paper and waste paper made from pulp or the like, and the anchor property of the support is significantly insufficient. Further, the contact activation method using a thermal heat has been a focus of attention because of recent tendency to respond to demands for safety, high-speed performance and on-demand processability as a thermal activation method. The contact activation using a thermal head has a side-effect that the thermal head scrape the surface of a one-surface active layer off. Particularly in thermal activation, a thermal head itself is heated to high temperature because the entire surface of a label is activated. As a result, the heat-sensitive tacky layer is significantly layered down. However, in the present invention, even when a film or synthetic paper is used as a support, it is possible to prevent layer-down and shrinkage of the film and the synthetic paper when thermally activated, and there is no glue residue at the time of re-labeling.

It is preferable that the support surface is reformed by subjecting the surface to a corona discharge treatment, an oxidizing reaction treatment (with chromic acid, etc.), an etching treatment, an easy bonding treatment, or an antistatic treatment to improve the adhesiveness of the coated layer. Further, it is preferable to add a white pigment such as a titanium oxide to the support to make it white.

The thickness of the support is not particularly limited and may be suitably selected in accordance with the intended use. It is preferably 50 µm to 2,000 µm, and more preferably 100 µm to 1,000 µm.

<Under Layer>

Under layers in the first, second and third embodiments of the heat-sensitive adhesive material of the present invention respectively contain a thermoplastic resin and a hollow particle and further contain other components in accordance with necessity.

-Thermoplastic Resin-

The thermoplastic resin is not particularly limited and may be suitably selected in accordance with the intended use. Examples thereof include natural rubber latexes with vinyl monomer-graft copolymerized thereon, acrylic acid ester copolymers, methacrylic acid ester copolymers, acrylic acid ester-methacrylic acid ester copolymers, acrylic acid ester-styrene copolymers, acrylic acid ester-methacrylic acid ester-styrene copolymers, ethylene-vinyl acetate copolymers, styrene-butadiene copolymers, acryl-acrylonitrile copolymers, methylmethacrylate-butadiene polymers, polybutadienes, 2-vinylpyridine-styrene-butadiene polymers and acrylonitrile-butadiene polymers. Each of these thermoplastic resins may be used alone or in combination with two or more.

The glass transition temperature (Tg) of the thermoplastic resin is preferably −35° C. to 25° C., and more preferably −35° C. to 5° C. When the glass temperature (Tg) is higher than 25° C., the binding strength and inter-layer binding strength of the hollow filler may be weakened and the adhesive strength to adherends may also be weakened. When it is lower than −35° C., the blocking resistance may be reduced.

-Hollow Particle-

The hollow particle is not particularly limited and a typically used inorganic filler or organic filler having a volume average particle diameter of 0.5 µm to 10 µm is used.

Examples of the inorganic filler include calcium carbonates, silica, titanium oxides, aluminum hydroxides, clays, calcined clays, magnesium silicates, magnesium carbonates, white carbons, zinc oxides, barium sulfates, and calcium carbonates subjected to a surface treatment.

Examples of the organic filler include fine powders composed of urea-formalin resins, styrene-methacrylic acid copolymers, polystyrene resins.

Of these, in consideration of low-energy thermal activation (high-sensitive thermal activation), a spherical hollow plastic particle having insulation effect, a volume average particle diameter of 2.0 µm to 5.0 µm and a hollow rate of 70% or more is preferable. A hollow particle having a maximum particle diameter of 10.0 µm or less, a volume average particle diameter of 2.0 µm to 5.0 µm and a hollow rate of 70% or more is particularly preferable.

With use of a hollow particle having a low hollow rate, thermal energy is released out from a thermal head through to the support because of insufficient insulation effect of the under layer, and its high-sensitive thermal activation effect may be degraded. When a heat-sensitive tacky layer is formed on an under layer that is formed by using a hollow particle having a volume average particle diameter greater than 5.0 µm, in regions of the under layer in which large particles exist, there exist regions in which no heat-sensitive tacky layer is formed, and the adhesive strength of the heat-sensitive adhesive material is likely to be reduced when thermally activated. When the volume average particle diameter is smaller than 2.0 µm, it may be difficult to ensure a hollow rate of 70% or more, resulting in degraded effect of high-sensitive thermal activation.

The spherical hollow plastic particle means a hollow particle having a shell formed of a thermoplastic resin and containing air and other gasses inside thereof and the hollow particle has been in a foamed condition.

Here, the hollow rate means a ratio of the outside volume of a hollow particle to the volume of the inside void portion thereof.

The hollow rate of a hollow particle used for the under layer is preferably 70% or more in terms of ensuring a high adhesive strength of the heat-sensitive adhesive material in thermal activation method using a thermal head. Examples of material of the hollow particle include acrylonitrile-vinylidene chloride-methyl methacrylate copolymers and acrylonitrile-methacrylonitrile-isobonyl methacrylate copolymers.

The method of forming the under layer is not particularly limited and may be formed in accordance with a conventional method, however, it can be preferably formed by a coating method using an under layer coating solution in which the above-mentioned components are blended. Examples of the coating method include blade coating, gravure coating, gravure offset coating, bar-coating, roller coating, knife coating, air-knife coating, comma coating, U comma coating, AKKU coating, smoothing coating, micro-gravure coating, reverse roller coating, coating method using four rollers or five rollers, dip coating, drop curtain coating method, slide coating and die coating.

The coated amount of the under layer coating solution is preferably, when based on the dried coated amount, 1 g/m$^2$ to 35 g/m$^2$, and more preferably 2 g/m$^2$ to 25 g/m$^2$. When the dried coated amount is less than 1 g/m$^2$, a sufficient adhesion effect may not be obtained when the under layer is thermally bonded, and its insulation effect may be degraded. When the coated amount is more than 35 g/m², it is economically unfavorable because the adhesion force and the insulation effect are saturated.

<Heat-Sensitive Tacky Layer>

In the first and second embodiments of the heat-sensitive adhesive materials of the present invention, the heat-sensitive tacky layer contains any one of heat-sensitive pressure-sensitive adhesives according to the first embodiment and the second embodiment of the present invention.

In the third embodiment of the heat-sensitive adhesive material of the present invention, the heat-sensitive adhesive material contains at least a thermoplastic resin, an adhesion imparting agent and a thermofusible material and further contains other components in accordance with necessity.

For the thermoplastic resin and the adhesion imparting agent, similar ones to those used for the heat-sensitive pressure-sensitive adhesives according to the first embodiment and the second embodiment of the present invention can be used.

A thermofusible material to be used in the third embodiment of the present invention essentially contains triphenylphosphine, and it is preferable to use other thermofusible materials in combination.

The content of triphenylphosphine in the thermofusible material is preferably 50% by mass to 90% by mass, and more preferably 80% by mass to 90 by mass. When the content of the triphenylphosphine is less than 50% by mass, the adhesive strength of the heat-sensitive tacky layer may be weak immediately after bonding the heat-sensitive tacky layer at temperatures from 23° C. to 40° C. When the content is more than 90% by mass, the delayed property of the heat-sensitive adhesive material may be reduced and the adhesive strength may be reduced.

The other thermofusible materials are not particularly limited and may be suitably selected in accordance with the intended use, however, a benzotriazole compound represented by the following Structural Formula (1) is particularly preferable in terms that both adhesive strength to corrugated boards at a temperature of 0° C. and blocking resistance can be sufficiently ensured.

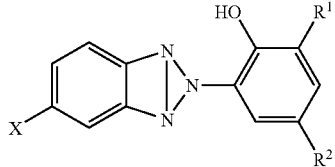

Structural Formula (1)

In the Structural Formula (1), $R^1$ and $R^2$ may be the same to each other or may be different from each other, and respectively represent any one of a hydrogen atom, an alkyl group and an α,α-dimethylbenzyl group; X represents any one of a hydrogen atom and a halogen atom.

For the other thermofusible materials other than benzotriazole compounds represented by the Structural Formula (1), similar ones to those used for the heat-sensitive pressure-sensitive adhesive can be used. Specifically, a hydroxy benzoic ester compound represented by the Structural Formula (2), a compound represented by any one of the Structural Formulas (3), (4), and (5), a phosphine compound represented by any one of the Structural Formulas (6) and (7) can be used in combination.

The method for forming a heat-sensitive tacky layer according to the first embodiment to the third embodiment of the heat-sensitive adhesive materials of the present invention is not particularly limited and the heat-sensitive tacky layer can be formed according to a conventional method, for example, preferably can be formed by a coating method using a liquid of the heat-sensitive pressure-sensitive adhesive in which the above-noted components are blended.

Examples of the coating method include blade coating, gravure coating, gravure offset coating, bar-coating, roller coating, knife coating, air-knife coating, comma coating, U comma coating, AKKU coating, smoothing coating, microgravure coating, reverse roller coating, coating method using four rollers or five rollers, dip coating, drop curtain coating method, slide coating and die coating.

For drying conditions at the time of the coating or printing, the liquid of the heat-sensitive pressure-sensitive adhesive should be dried within a range of temperature at which thermofusible materials and eutectic agents to be used cannot be fused. For a method for the drying, besides hot-air drying, a drying methods utilizing a heat source based on infrared rays, microwaves or high-frequency wave can be used.

The coated amount of the heat-sensitive pressure-sensitive adhesive liquid is preferably, when based on the dried coated amount, 5 g/m² to 20 g/m², and more preferably 10 g/m² to 20 g/m². When the dried coated amount is less than 5 g/m², a sufficient adhesion effect may not be obtained when the heat-sensitive tacky layer is bonded at low-temperature, and its insulation effect may be degraded. When the coated amount is more than 20 g/m², insulation effect of the under layer may be reduced, and cost performance may be lowered.

Next, in the heat-sensitive adhesive materials according to the first embodiment to the third embodiment of the present invention, details of a recording layer and a protective layer will be described hereinafter, in the case where the recording layer is or the recording layer and the protective layer are formed in this order on the opposite surface of the support from the surface having the heat-sensitive tacky layer.

<Recording Layer>

The recording layer is a layer on which images and the like can be recorded. The recording layer is not particularly limited and may be suitably selected in accordance with the intended use. Preferred examples thereof include a heat-sensitive recording layer, a thermal transfer recording ink-receiving layer and an inkjet-ink receiving layer.

[Heat-Sensitive Adhesive Material for Heat-sensitive Recording]

The heat-sensitive recording layer in the heat-sensitive adhesive material for heat-sensitive recording contains a leuco dye, a color developer and a binder resin and further contains other components in accordance with necessity.

The leuco dye is not particularly limited and may be suitably selected from among conventional leuco dyes in accordance with the intended use. Examples thereof include triphenylmethane dyes, fluoran dyes, phenothiazine dyes, auramine dyes, spiropyran dyes and indolinophthalide dyes.

Examples of the leuco dyes include 3,3-bis(p-dimethylaminophenyl) phthalide, 3,3-bis(p-dimethylaminophenyl)-6-dimethylaminophthalide (another name: crystal violet lactone), 3,3-bis(p-dimethylaminophenyl)-6-diethylaminophthalide, 3,3-bis(p-dimethylaminophenyl)-6-chlorophthalide, 3,3-bis(p-dibutylaminophenyl)phthalide, 3-cyclohexylamino-6-chlorofluoran, 3-dimethylamino-5,7-dimethylfluoran, 3-diethylamino-7-chlorofluoran, 3-diethylamino-7-methylfluoran, 3-diethylamino-7,8-benzofluoran, 3-diethylamino-6-methyl-7-chlorofluoran, 3-(N-p-tolyl-N-ethylamino)-6-methyl-7-aminofluoran, 3-pyrrolidino-6-methyl-7-aminofluoran, 2-{N-(3'-trifluoromethylphenyl) amino}-6-diethylaminofluoran, 2-{3,6-bis(diethylamino)-9-(o-chloroanilino) xanthyl benzoate lactam}, 3-diethylamino-6-methyl-7-(m-trichloromethylanilino)fluoran, 3-diethylamino-7-(o-chloroanilino)fluoran, 3-dibutylamino-7-(o-chloroanilino)fluoran, 3-N-methyl-N-amylamino-6-methyl-7-anilino fluoran, 3-N-methyl-N-cyclohexylamino-6-methyl-7-anilino fluoran, 3-diethylamino-6-methyl-7-anilinofluoran, 3-(N,N-diethylamino)-5-methyl-7-(N,N-dibenzylamino)fluoran, benzoyl-leucomethylene blue, 6'-chloro-8'-methoxy-benzoindolino-spiropyran, 6'-bromo-3'-methoxy-benzoindolino-spiropyran, 3-(2'-hydroxy-4'-dimethylaminophenyl)-3-(2'-methoxy-5'-chlorophenyl) phthalide, 3-(2'-hydroxy-4'-dimethylaminophenyl)-3-(2'-methoxy-5'-nitrophenyl) phthalide, 3-(2'-hydroxy-4'-diethylaminophenyl)-3-(2'-methoxy-5'-methylphenyl) phthalide, 3-diethylamino-6-methyl-7-(2',4'-dimethylanilino)fluoran, 3-(2'-methoxy-4'-dimethylaminophenyl)-3-(2'-hydroxy-4'-chloro-5'-methylphenyl) phthalide, 3-morfolino-7-(N-propyl-trifluoromethylanilino)fluoran, 3-diethylamino-5-chloro-7-(N-benzyl-trifluoromethylanilino)fluoran, 3-pyrrolidino-7-(di-p-chlorophenyl)methylamino fluoran, 3-diethylamino-5-chloro-7-(α-phenyl ethylamino)fluoran, 3-diethylamino-7-(o-methoxycarbonyl phenylamino)fluoran, 3-diethylamino-5-methyl-7-(α-phenyl ethylamino)fluoran, 3-diethylamino-7-pyperidino fluoran, 2-chloro-3-(N-methyltoluidino)-7-(p-n-butylanilino)fluoran, 3-(N-benzyl-N-cyclohexylamino)-5,6-benzo-7-α-naphthylamino-4'-o-bromofluoran, 3-diethylamino-6-methyl-7-(2',4'-dimethylanilino)fluoran, 3-(p-dimethylaminophenyl)-3-{1, 1-bis(p-dimethylaminophenyl) ethylene-2-yl}phthalide, 3-(p-dimethylaminophenyl)-3-{1,1-bis (p-dimethylaminophenyl)ethylene-2-yl}-6-dimethylamino phthalide, 3-(p-dimethylaminophenyl)-3-(1-p-dimethylaminophenyl-1-phenylethylene-2-yl)phthalide, 3-(p-dimethylaminophenyl-3-(1-p-dimethylaminophenyl-1-p-chlorophenyl ethylene-2-yl)-6-dimethylamino phthalide, 3-(4'-dimethylamino-2'-methoxy)-3-(1"-p-dimethylaminophenyl-1"-p-chlorophenyl-1",3"-butadiene-4"-yl)benzophthalide, 3-(4'-dimethylamino-2'-benzyloxy)-3-(1"-p-dimethylaminophenyl-1"-phenyl-1",3"-butadiene-4"-yl) benzophthalide, 3-dimethylamino-6-dimethylamino-fluorene-9-spiro-3'-(6'-dimethylamino) phthalide, 3,3-bis{2-(p-dimethylaminophenyl)-2-(p-methoxyphenyl) ethenyl}-4,5,6,7-tetrachlorophthalide, 3-bis{1,1-bis(4-pyrrolidinophenyl) ethylene-2-yl}-5,6-dichloro-4,7-dibromophthalide, bis(p-dimethylaminostyryl)-1-naphthalene sulfonyl methane, 3-(N-methyl-N-propylamino)-6-methyl-7-anilido fluoran, 3-diethylamino-6-methyl-7-anilino fluoran, 3,6-bis(dimethylamino)fluoran spiro(9,3')-6'-dimethylaminophthalide, 3-diethylamino-6-chloro-7-anilinofluoran, 3-N-ethyl-N-(2-ethoxypropyl) amino-6-methyl-7-anilinofluoran, 3-N-ethyl-N-tetrahydrofurfurylamino-6-methyl-7-anilino fluoran, 3-diethylamino-6-methyl-7-mesitydino-4',5'-benzofluoran, 3-N-methyl-N-isobutyl-6-methyl-7-anilinofluoran and 3-N-ethyl-N-isoamyl-6-methyl-7-anilinofluoran. Each of these may be used alone or in combination with two or more.

The color developer is not particularly limited and may be suitably selected from among conventional electron-acceptable compounds in accordance with the intended use. Examples thereof include phenol compounds, thiophenol compounds, thiourea derivatives, organic acids or metal salts thereof. Specific examples of the color developers include 4,4'-isopropyliden bisphenol, 3,4'-isopropylidene bisphenol, 4,4-idopropylidene bis(o-methylphenol), 4,4'-secondary buthylidene bisphenol, 4,4'-isopropyliden bis(o-tertiary butylphenol), 4,4'-cyclohexylidene phenol, 4,4'-isopropylidene bis(2-chlorophenol), 2,2'-methylene bis(4-methyl-6-tertiary butylphenol), 2,2'-methylene bis(4-ethyl-6-tertiary butylphenol), 4,4'-butylidene bis(6-tertiary butyl-2-methyl) phenol, 1,1,3-tris(2-methyl-4-hydroxy-5-tertiary butylphenyl)butane, 1,1,3-tris(2-methyl-4-hydroxy-5-cyclohexyl phenyl)butane, 4,4'-thiobis(6-tertiary butyl-2-methyl)phenol, 4,4'-diphenol sulfone, 4,2'-diphenol sulfone, 4-isopropoxy-4'-hydroxy diphenyl sulfone, 4-benzyloxy-4'-hydroxydiphenyl sulfone, 4,4'-diphenol sulfoxide, p-hydroxy isopropyl benzoate, p-hydroxybenzyl benzoate, benzyl protocatechuic acid, stearyl gallate, lauryl gallate, octyl gallate, 1,7-bis(4-hydroxyphenyl thio)-3,5-dioxaheptane, 1,5-bis(4-hydroxyphenyl thio)-3-oxaheptane, 1,3-bis(4-hydroxyphenyl thio)-propane, 2,2'-methylenebis(4-ethyl-6-tertiary butylphenol), 1,3-bis(4-hydroxyphenylthio)-2-hydroxypropane, N,N'-diphenyl thio urea, N,N'-di(m-chlorophenyl)thio urea, salicylanilide, 5-chloro-salicylanilide, salicyl-o-chloroanilide, 2-hydroxy-3-naphthoate, antipyrine complexes of zinc thiocyanate, zinc salts of 2-acetyloxy-3-naphthoic acid, metal salts of 2-hydroxy-1-naphthoic acid, 1-hydroxy-2-naphthoic acid, zinc of hydroxy naphthoic acid and aluminum, bis-(4-hydroxyphenyl)methyl acetate ester, bis-(4-hydroxyphenyl)benzyl acetate ester, bis-(4-hydroxyphenyl) benzyl acetate ester, 4-{β-(p-methoxyphenoxy) ethoxy}salicylic acid, 1,3-bis(4-hydroxycumyl) benzene, 1,4-bis(4-hydroxycumyl)benzene, 2,4'-diphenolsulfone, 3,3'-diallyl-4,4'-diphenolsulfone, antipyrine complexes of α,α-bis(4-hydroxyphenyl)-α-methyl toluene zinc thiocyanate, tetrabromobisphenol A, tetrabromobisphenol S, 4,4'-thiobis (2-methylphenol), 3,4-hydroxy-4'-methyl-diphenyl sulfone and 4,4'-thiobis (2-chrorophenol). Each of these may be used alone or in combination with two or more.

The added amount of the color developer in the heat-sensitive recording layer is not particularly limited and may be suitably adjusted in accordance with the intended use. It is preferably 1 part by mass to 20 parts by mass, and more preferably 2 parts by mass to 10 parts by mass to 1 part by mass of the leuco dye.

The binder resin is not particularly limited and may be suitably selected from among those known in the art. Examples thereof include polyvinyl alcohols, starches or derivatives thereof; cellulose derivatives such as methoxy cellulose, hydroxyethyl cellulose, carboxy methyl cellulose, methyl cellulose and ethyl cellulose; water-soluble polymers such as polyacrylic acid soda, polyvinyl pyrrolidone, acrylamide-acrylic acid ester copolymer, acrylamide-acrylic acid ester-methacrylic acid ternary copolymer, styrene-maleic anhydride copolymer alkaline salt, isobutylene-maleic anhydride copolymer alkaline salt, polyacrylamide, alginic acid soda, gelatin and casein; emulsions of polyvinyl acetate, polyurethane, polyacrylic acid, polyacrylic acid ester, polymethacrylic acid ester, polybutyl methacrylate, vinylchloride-vinylacetate copolymer, ethylene-vinylacetate copolymer and the like; and latexes of styrene-butadiene copolymer, styrene-butadiene-acryl copolymer and the like. Each of these may be used alone or in combination with two ore more.

In the heat-sensitive recording layer, various thermofusible materials can be used as fillers. Examples of the thermofusible material include fatty acids such as stearic acid and behenic acid; fatty acid amides such as stearic acid amide and palmitic acid amide; fatty acid metal salts such as zinc stearate, aluminum stearate, calcium stearate, zinc palmitate and zinc behenate; p-benzylbiphenyl, terphenyl, triphenyl methane, p-benzyloxy benzoic acid benzyl, β-benzyloxy naphthalene, β-naphthoic acid phenyl ester, 1-hydroxy-2-naphthoic acid phenyl ester, 1-hydroxy-2-naphthoic acid methyl ester, diphenyl carbonate, terephthalic acid dibenzyl ester, terephthalic acid dimethyl ester, 1,4-dimethoxy naphthalene, 1,4-diethoxy naphthalene, 1,4-dibenzyloxy naphthalene, 1,2-bis(phenoxy)ethane, 1,2-bis(3-methylphenoxy)ethane, 1,2-bis(4-methylphenoxy)ethane, 1,4-bis(phenoxy)butane, 1,4-bis(phenoxy)-2-butene, 1,2-bis(4-methoxyphenylthio)ethane, dibenzoyl methane, 1,4-bis(phenyl thio)butane, 1,4-bis(phenyl thio)-2-butene, 1,2-bis(4-methoxyphenyl thio)ethane, 1,3-bis(2-vinyloxy ethoxy)benzene, 1,4-bis(2-vinyloxy ethoxy)benzene, p-(2-vinyloxy ethoxy)biphenyl, p-aryloxy biphenyl, p-propargyloxy biphenyl, dibenzoyloxy methane, 1,3-dibenzoyloxy propane, dibenzyl disulfide, 1,1-diphenyl ethanol, 1,1-diphenyl propanol, p-(benzyloxy)benzyl alcohol, 1,3-diphenoxy-2-propanol, N-octadecyl carbamoyl-p-methoxy carbonyl benzene, N-octadecyl carbamoyl benzene, oxalic acid dibenzyl ester and 1,5-bis(p-methoxyphenyloxy)-3-oxapentane. Each of these may be used alone or in combination with two or more.

In the heat-sensitive recording layer, various auxiliary additive components, for example, a surfactant and a lubricant can be used in combination in accordance with necessity. Examples of the lubricant include higher fatty acids or metal salts thereof, higher fatty acid amides, higher fatty acid esters, animal waxes, vegetable waxes, mineral waxes and petroleum waxes.

The method of forming the heat-sensitive recording layer is not particularly limited, and the heat-sensitive recording layer can be formed by a typically know method. For example, a leuco dye and a color developer are pulverized and dispersed with a binder resin and other components by a dispersing device such as a ball mill, an attritor and a sand mill until the particle diameter of the dispersion is 1 μm to 3 μm, and then a coating solution for heat-sensitive recording layer is prepared by mixing the dispersion along with a dispersed liquid composed of a filler and the like in a specific formulation as needed, and the coating solution is applied over a surface of a support, thereby the heat-sensitive recording layer can be formed on the support.

The thickness of the heat-sensitive recording layer varies depending on the composition of the heat-sensitive recording layer and application of the heat-sensitive adhesive material to be produced and cannot be uniformly defined, however, it is preferably 1 μm to 50 μm, and more preferably 3 μm to 20 μm.

[Heat-Sensitive Adhesive Material for Thermal Transfer Recording and Inkjet Recording]

A thermal transfer recording ink-receiving layer in the heat-sensitive adhesive material for thermal transfer recording or an ink-receiving layer in the heat-sensitive adhesive material for inkjet recording contains a filler, a binder resin and a water resistant additive and further contains other components in accordance with necessity.

The filler is not particularly limited and may be suitably selected in accordance with the intended use. Examples thereof include fine powders of calcium carbonate, silica, titanium oxide, aluminum hydroxide, clay, calcined clay, magnesium silicate, magnesium carbonate, white carbon, zinc oxide, barium sulfate, calcium carbonate or silica that has been subjected to a surface treatment, urea-formalin resin, styrene-methacrylic acid copolymer, polystyrene, and the like.

The binder resin is not particularly limited and may be suitably selected from among conventional water-soluble resins. Examples thereof include polyvinyl alcohols, starches or derivatives thereof, cellulose derivatives such as methoxy cellulose, hydroxyethyl cellulose, carboxy methyl cellulose, methyl cellulose and ethyl cellulose; water-soluble polymers such as polyacrylic acid soda, polyvinyl pyrrolidone, acrylamide-acrylic acid ester copolymer, acrylamide-acrylic acid ester-methacrylic acid ternary copolymer, styrene-maleic anhydride copolymer alkaline salt, isobutylene-maleic anhydride copolymer alkaline salt, polyacrylamide, alginic acid soda, gelatin and casein. Each of these may be used alone or in combination with two ore more.

The content ratio between the filler and the water-soluble resin in the ink-receiving layer relates to effect of blocking resistance of the heat-sensitive adhesive material, and the mass ratio therebetween is preferably, when based on the solid content, 0.1% by mass to 0.2% by mass of the water-soluble resin to 1% by mass of the filler.

The water resistant additive is not particularly limited and may be suitably selected in accordance with the intended use. Examples thereof include formaldehydes, glyoxals, chrome alums, melamines, melamine-formaldehyde resins, polyamide resins and polyamide-epichlorohydrin resins.

The content ration between the water resistant additive and the water-soluble resin also relates to effect of blocking resistance of the heat-sensitive adhesive material, and the mass ratio therebetween is preferably, when based on the solid content, 0.3% by mass to 0.5% by mass to 1% by mass of the water-soluble resin. In this way, the ink-receiving layer is formed by containing a filler and a water-soluble resin, further, a water-soluble resin and a water resistant additive in a coating solution for ink-receiving layer. Further, in addition to the effect obtained by the filler, the print quality can be further enhanced by subjecting the ink-receiving layer surface to a calender treatment so as to obtain a smoothness of 500 seconds or more.

<Protective Layer>

The protective layer contains a resin component and further contains other components in accordance with necessity. For the resin, for example, a hydrophobic resin emulsion or a water-soluble resin can be used, however, a film formed by using a water-soluble resin is preferable in terms of barrier property as a protective layer. When a water-soluble resin is used, the function of the water-soluble resin can be enhanced by using a crosslinking agent to make it water resistant.

For the water-soluble resin, polyvinyl alcohols are typically used, and a combination of a polyvinyl alcohol with a crosslinking agent to make it resistant can be suitably selected for use. Examples of the combination include a combination between a carboxy-modified polyvinyl alcohol and a polyamide epichlorohydrin resin and a combination between an alcohol having a reactive carbonyl group and a hydrazide compound.

Of these, a protective layer containing a polyvinyl alcohol having a reactive carbonyl group and a hydrazide compound as a crosslinking agent has extremely high heat-resistance and water-resistance and is hardly affected by pressure, temperature, and humidity addition, and thus the blocking resistance can be remarkably enhanced.

The polyvinyl alcohol having a reactive carbonyl group can be produced by a conventional method such as a method of which a polymer obtained by copolymerizing a vinyl monomer having a reactive carbonyl group and a fatty acid vinyl ester is saponified. Examples of the vinyl monomer having a reactive carbonyl group include groups having an ester residue and groups having an acetone group, however, vinyl monomers having a diacetone group are preferable. Specifically, diacetone acrylamide and methadiacetone acrylamide are preferable. Examples of the fatty acid vinyl ester include vinyl formate, vinyl acetates, vinyl propionates. Of these, vinyl acetates are particularly preferable.

The polyvinyl alcohol (PVA) having a reactive carbonyl group may be a copolymer formed by copolymerization of copolymerizable other vinyl monomers. Examples of these copolymerizable vinyl monomers include acrylic acid esters, butadienes, ethylenes, propylene acrylic acids, methacrylic acids, maleic acids, maleic anhydrides and itaconic acids.

The content of the reactive carbonyl group in the polyvinyl alcohol (PVA) having a reacting carbonyl group is preferably 0.5 mol % to 20 mol % of the total polymer content. In view of water-resistance, it is more preferably 2 mol % to 10 mol % of the total polymer content. When the content is less than 2 mol %, the water-resistance is insufficient in practical use, and even when more than 10 mol %, further enhanced water-resistance cannot be obtained, and it is not economical because that would just make it costly. The polymerization degree of the polyvinyl alcohol (PVA) having a reactive carbonyl group is preferably 300 to 3,000, and more preferably 500 to 2,200. The saponification degree of the polyvinyl alcohol (PVA) having a reactive carbonyl group is preferably 80% or more.

The hydrazide compound is not particularly limited as long as the compound has a hydrazide group, and may be suitably selected in accordance with the intended use. Examples thereof include carbohydrazide, oxalic acid dihydrazide, hydrazide formate, hydrazide acetate, malonic acid dihydrazide, succinic acid hydrazide, adipic acid hydrazide, azelaic acid hydrazide, sebacic acid hydrazide, dodecanedioic acid hydrazide, maleic acid dihydrazide, fumaric acid hydrazide, itaconic acid dihydrazide, hydrazide benzoate, glutaric acid dihydrazide, diglycolic acid hydrazide, tartaric acid dihydrazide, malic acid dihydrazide, isophthalic acid hydrazide, terephthalic acid dihydrazide, 2,7-naphthoic acid dihydrazide and polyacrylic hydrazide. Each of these may be used alone or in combination with two or more. Among hydrazide compounds, adipic acid hydrazide is preferable in terms of water-resistance and safety.

The content of the hydrazide compound is preferably 5 parts by mass to 40 parts by mass, and more preferably 15 parts by mass to 25 parts by mass to 100 parts by mass of the polyvinyl alcohol having a reactive carbonyl group.

The protective layer preferably contains a filler. For the filler, a basic filler is preferable. Examples thereof include aluminum hydroxides, calcium carbonates, talcs and alkaline silicates. Of these, aluminum hydroxides and calcium carbonates are preferable in terms of matching to a thermal head (preventing adhesion of foreign substances), etc., and aluminum hydroxides are particularly preferable in view of pH control with appropriate water-soluble bases. For the filler contained in the heat-sensitive chromogenic layer, conventional fillers can be used. Examples thereof include inorganic pigments such as calcium carbonates, zinc oxides, aluminum oxides, titanium dioxides, silicas, aluminum hydroxides, barium sulfates, talcs, kaolins, aluminas and clays or organic pigments known in the art, however, the filler is not limited thereto. Further, in view of water-resistance (water-resistant peel-resistant property), silicas, kaolins, aluminas, which are acidic pigments or exhibit acidic property in aqueous solutions, are preferable. Silicas are particularly preferable in terms of color developing concentration.

The method of forming the protective layer is not particularly limited and can be formed by a generally known method. For example, a coating solution for protective layer is prepared by a conventional method and the coating solution is applied over the surface of the recording layer, thereby a protective layer can be formed.

The thickness of the protective layer is not particularly limited and may be suitably selected in accordance with the intended use, however, it is preferably 1.0 µm to 7.0 µm.

In between the support and the heat-sensitive recording layer, the under layer and the like can be formed in accordance with necessity. For components constituting these layers, pigments containing the hollow particle, binders, thermofusible materials, surfactants and the like can be used.

The heat-sensitive adhesive material of the present invention can be preferably used before or after the heat-sensitive tacky layer is thermally activated or heated. In this case, cut lines may be previously formed in the heat-sensitive adhesive material. It is advantageous that the heat-sensitive adhesive material can be preferably used for various applications such as labels and tags.

The shape of the heat-sensitive adhesive material of the present invention is not particularly limited and may be suitably selected in accordance with the intended use. Preferred examples thereof include label shape, sheet-shape and rolled-shape. Of these, it is preferable that the heat-sensitive adhesive material is formed in a long sheet and stored in a condition where it is rewound to a cylindrical core and rolled in a roll shape from the viewpoint of convenience, storage space and handleability.

Adherends to which the heat-sensitive adhesive material of the present invention is affixed are not particularly limited and the size, structure, materials and the like of the adherends may be suitably selected in accordance with the intended use. Preferred materials thereof include polyolefins such as polyethylene and polypropylene; resin plates made from acrylate, polyethylene terephthalate (PET), polystyrene, nylon or the like; metal plates made from SUS and aluminum; paper products such as envelopes and corrugated boards; polyolefin wraps; polyvinyl chloride wraps; bonded or unwoven materials made from polyethylene such as envelopes.

The method to thermally activate the heat-sensitive tacky layer in the heat-sensitive adhesive material of the present invention is not particularly limited and may be suitably selected in accordance with the intended use. Examples of the method include activation methods utilizing hot air, activation methods utilizing a heat roller or a thermal head. Of these, activation methods utilizing a thermal head are preferable, and the thermal activation method of the heat-sensitive adhesive material of the present invention is particularly preferable. When the thermal activation method of the heat-sensitive adhesive material of the present invention is employed, it is advantageous in that information can be recorded on the heat-sensitive recording layer and the heat-sensitive tacky layer can be thermally activated by heating both surfaces of the heat-sensitive adhesive material by using an existing thermosensitive recording printer.

The heat-sensitive adhesive material of the present invention can exhibit its excellent adhesive strength under any environments of low temperatures (0° C.), room temperature, high temperatures (40° C.) by using the heat-sensitive pressure-sensitive adhesive of the present invention. With use of the heat-sensitive pressure-sensitive adhesive of the present invention, a heat-sensitive pressure-sensitive material that has high adhesive strength to rough-surfaced adherends such as corrugated boards and is excellent in blocking resistance as well as in storage stability. Further, by applying a coating solution for a recording layer over one surface of a support and applying the heat-sensitive pressure-sensitive adhesive of the present invention over the opposite surface of the support from the surface having the recording layer, it is possible to obtain a heat-sensitive adhesive material that has high adhesive strength to rough-surfaced adherends such as corrugated boards under any of environments of low temperatures (0° C.), room temperature, high temperatures (40° C.), can exhibit its surface tackiness by using a thermal head and is excellent in blocking resistance.

EXAMPLES

Hereafter, the present invention will be further described in detail referring to specific Examples and Comparative Examples, however, the present invention is not limited to the disclosed Examples.

First, respective heat-sensitive adhesive materials of Examples X-1 to X-16 and Comparative Examples X-1 to X-9 were prepared as follows.

Product Example X-1

-Preparation of Thermofusible Material Dispersion 1-

A mixture containing the following composition was dispersed by using a sand mill so that the mixture had a volume average particle diameter of 1.0 μm by using a sand mill to thereby prepare a thermofusible material dispersion 1.

| | |
|---|---|
| Triphenylphosphine (trade name: TPP, manufactured by HOKKO CHEMICAL INDUSTRY, CO., LTD.) | 30 parts by mass |
| 10% by mass aqueous solution of a copolymer between vinyl alcohol and sodium allyl sulfonate (trade name: L-3266, manufactured by Nippon Synthetic Chemical Industry Co., Ltd., number average molecular mass: 15,000, saponification degree: 88%) | 15 parts by mass |
| Alkyl-allyl sulfonate (surfactant) | 0.15 parts by mass |
| Water | 54.85 parts by mass |

Production Example X-2

-Preparation of Thermofusible Material Dispersion 2-

A mixture containing the following composition was dispersed by using a sand mill so that the mixture had a volume average particle diameter of 1.0 μm by using a sand mill to thereby prepare a thermofusible material dispersion 2.

| | |
|---|---|
| Tetrakis [3-(3,5-di-t-butyl-4-hydroxyphenyl) propionate] methane: trade name: TTHP, manufactured by HOKKO CHEMICAL INDUSTRY Co., LTD.) | 30 parts by mass |
| 10% by mass aqueous solution of a copolymer between vinyl alcohol and sodium allyl sulfonate (trade name: L-3266, manufactured by Nippon Synthetic Chemical Industry Co., Ltd., number average molecular mass: 15,000, saponification degree: 88%) | 15 parts by mass |
| Alkyl-allyl sulfonate (surfactant) | 0.15 parts by mass |
| Water | 54.85 parts by mass |

Product Example X-3

-Preparation of Thermofusible Material Dispersion 3-

A mixture containing the following composition was dispersed by using a sand mill so that the mixture had a volume average particle diameter of 1.0 μm by using a sand mill to thereby prepare a thermofusible material dispersion 3.

| | |
|---|---|
| Triphenylphosphine (trade name: TPP, manufactured by HOKKO CHEMICAL INDUSTRY, CO., LTD.) | 30 parts by mass |
| 10% by mass aqueous solution of a copolymer between vinyl alcohol and sodium allyl sulfonate (trade name: KL-318, manufactured by KURARAY Co., Ltd., number average molecular mass: 80,000, saponification degree: 88%) | 15 parts by mass |
| Alkyl-allyl sulfonate (surfactant) | 0.15 parts by mass |
| Water | 54.85 parts by mass |

Production Example X-4

-Preparation of Thermofusible Material Dispersion 4-

A mixture containing the following composition was dispersed by using a sand mill so that the mixture had a volume average particle diameter of 1.0 μm by using a sand mill to thereby prepare a thermofusible material dispersion 4.

| | |
|---|---|
| Tetrakis [3-(3,5-di-t-butyl-4-hydroxyphenyl) propionate] methane (trade name: TTHP, manufactured by HOKKO CHEMICAL INDUSTRY CO., LTD.) | 30 parts by mass |
| 10% by mass aqueous solution of a copolymer between vinyl alcohol and sodium allyl sulfonate (trade name: KL-318, manufactured by KURARAY Co., Ltd., number average molecular mass: 80,000, saponification degree: 88%) | 15 parts by mass |
| Alkyl-allyl sulfonate (surfactant) | 0.15 parts by mass |
| Water | 54.85 parts by mass |

Production Example X-5

-Preparation of Thermofusible Material Dispersion 5-

A mixture containing the following composition was dispersed by using a sand mill so that the mixture had a volume average particle diameter of 1.0 μm by using a sand mill to thereby prepare a thermofusible material dispersion 5.

| | |
|---|---|
| Tris (2,4-di-t-butylphenyl) phosphite (trade name: IRGAFOS168, manufactured by Chiba Specialty Chemicals K.K.) | 30 parts by mass |
| 10% by mass aqueous solution of a copolymer between vinyl alcohol and sodium allyl sulfonate (trade name: L-3266, manufactured by Nippon Synthetic Chemical Industry Co., Ltd., number average molecular mass: 15,000, saponification degree: 88%) | 15 parts by mass |
| Alkyl-allyl sulfonate (surfactant) | 0.15 parts by mass |
| Water | 54.85 parts by mass |

Production Example X-6

-Preparation of Thermofusible Material Dispersion 6-

A mixture containing the following composition was dispersed by using a sand mill so that the mixture had a volume average particle diameter of 1.0 μm by using a sand mill to thereby prepare a thermofusible material dispersion 6.

| | |
|---|---|
| Tris (2,4-di-t-butylphenyl) phosphite (trade name: IRGAFOS168, manufactured by Chiba Specialty Chemicals K.K.) | 30 parts by mass |

| | |
|---|---|
| 10% by mass aqueous solution of a copolymer between vinyl alcohol and sodium allyl sulfonate (trade name: KL-318, manufactured by KURARAY Co., Ltd., number average molecular mass: 80,000, saponification degree: 88%) | 15 parts by mass |
| Alkyl-allyl sulfonate (surfactant) | 0.15 parts by mass |
| Water | 54.85 parts by mass |

Production Example X-7

-Preparation of Thermofusible Material Dispersion 7-

A mixture containing the following composition was dispersed by using a sand mill so that the mixture had a volume average particle diameter of 1.0 μm by using a sand mill to thereby prepare a thermofusible material dispersion 7.

| | |
|---|---|
| 2-(3'-t-butyl-5'-methyl-2'-hydroxyphenyl)-5-chlorobenzotriazole | 30 parts by mass |
| 10% by mass aqueous solution of a copolymer between vinyl alcohol and sodium allyl sulfonate (trade name: L-3266, manufactured by Nippon Synthetic Chemical Industry Co., Ltd., number average molecular mass: 15,000, saponification degree: 88%) | 15 parts by mass |
| Alkyl-allyl sulfonate (surfactant) | 0.15 parts by mass |
| Water | 54.85 parts by mass |

Production Example X-8

-Preparation of Thermofusible Material Dispersion 8-

A mixture containing the following composition was dispersed by using a sand mill so that the mixture had a volume average particle diameter of 1.0 μm by using a sand mill to thereby prepare a thermofusible material dispersion 8.

| | |
|---|---|
| Dicyclohexyl phthalate (melting point: 63° C.) | 30 parts by mass |
| 10% by mass aqueous solution of a copolymer between vinyl alcohol and sodium allyl sulfonate (trade name: L-3266, manufactured by Nippon Synthetic Chemical Industry Co., Ltd., number average molecular mass: 15,000, saponification degree: 88%) | 15 parts by mass |
| Alkyl-allyl sulfonate (surfactant) | 0.15 parts by mass |
| Water | 54.85 parts by mass |

Production Example X-9

-Preparation of Non-thermofusible Material Dispersion 1-

A mixture containing the following composition was dispersed by using a sand mill so that the mixture had an average particle diameter of 1.0 μm by using a sand mill to thereby prepare a non-thermofusible material dispersion 1.

| | |
|---|---|
| Silicone resin particle (KMP-590, manufactured by Shin-Etsu Chemical Co., Ltd) | 30.0 parts by mass |
| 30% by mass aqueous solution of polyvinyl alcohol | 5.0 parts by mass |
| Surfactant (alkyl-allyl sulfonate) | 0.15 parts by mass |
| Water | 64.85 parts by mass |

Production Example X-10

-Preparation of Non-thermofusible Material Dispersion 2-

A mixture containing the following composition was dispersed by using a sand mill so that the mixture had an average particle diameter of 2.0 μm by using a sand mill to thereby prepare a non-thermofusible material dispersion 2.

| | |
|---|---|
| Methyl polymethacrylate crosslinked material (EPOSTAR MA1002, manufactured by NIPPON SHOKUBAI CO., LTD.) | 30.0 parts by mass |
| 30% by mass aqueous solution of polyvinyl alcohol | 5.0 parts by mass |
| Surfactant (alkyl-allyl sulfonate) | 0.15 parts by mass |
| Water | 64.85 parts by mass |

Production Example X-11

-Preparation of Under Layer Coating Solution-

A mixture containing the following composition was stirred and dispersed to thereby prepare an under layer coating solution.

| | |
|---|---|
| Copolymer resin containing vinylidene chloride/acrylonitrile ast the main components (solid content: 32% by mass, average particle diameter: 3.0 μm, hollow rate: 92%) | 30 parts by mass |
| Styrene-butadiene copolymer emulsion (glass transition temperature = 4° C., non-volatile content: 50% by mass) | 40 parts by mass |
| Water | 30 parts by mass |

Example X-1

<Preparation of Heat-sensitive Adhesive Material>

-Preparation of Heat-sensitive Pressure-sensitive Adhesive Liquid 1-

A heat-sensitive pressure-sensitive adhesive liquid 1 stated below was prepared by using the thermofusible material dispersions 1 and 2.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 1 | 52 parts by mass |
| Thermofusible material dispersion 2 | 18 parts by mass |

Next, the heat-sensitive pressure-sensitive adhesive liquid 1 was applied over a surface (back surface) of a single-sided coat paper of a basis weight of 80 g/m² on which no recording layer was formed, so as to have a dry mass of 16 g/m², and the applied liquid was dried to thereby prepare a heat-sensitive adhesive material of Example X-1.

Example X-2

>Preparation of Heat-sensitive Adhesive Material>

A heat-sensitive adhesive material of Example X-2 was prepared in the same manner as in Example X-1, except that a heat-sensitive pressure-sensitive adhesive liquid 2 stated below was used in place of the heat-sensitive pressure-sensitive adhesive liquid 1.

-Preparation of Heat-sensitive Pressure-sensitive Adhesive Liquid 2-

A heat-sensitive pressure-sensitive adhesive liquid 2 containing the following composition was prepared by using the thermofusible material dispersions 1 and 2 in the same manner as in Example X-1.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 1 | 35 parts by mass |
| Thermofusible material dispersion 2 | 35 parts by mass |

Example X-3

<Preparation of Heat-sensitive Adhesive Material>

A heat-sensitive adhesive material of Example X-3 was prepared in the same manner as in Example X-1, except that a heat-sensitive pressure-sensitive adhesive liquid 3 stated below was used in place of the heat-sensitive pressure-sensitive adhesive liquid 1.

-Preparation of Heat-sensitive Pressure-sensitive Adhesive Liquid 3-

A heat-sensitive pressure-sensitive adhesive liquid 3 containing the following composition was prepared by using the thermofusible material dispersions 1 and 2 in the same manner as in Example X-1.

| | |
|---|---|
| Methyl methacrylate-2-ethylhexyl acrylate copolymer emulsion (glass transition temperature (Tg) = −30° C., non-volatile content: 50% by mass) | 30 parts by mass |
| Thermofusible material dispersion 1 | 52 parts by mass |
| Thermofusible material dispersion 2 | 18 parts by mass |

Example X-4

<Preparation of Heat-sensitive Adhesive Material>

A heat-sensitive adhesive material of Example X-4 was prepared in the same manner as in Example X-1, except that a heat-sensitive pressure-sensitive adhesive liquid 4 stated below was used in place of the heat-sensitive pressure-sensitive adhesive liquid 1.

-Preparation of Heat-sensitive Pressure-sensitive Adhesive Liquid 4-

A heat-sensitive pressure-sensitive adhesive liquid 4 containing the following composition was prepared by using the thermofusible material dispersions 3 and 4.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 3 | 52 parts by mass |
| Thermofusible material dispersion 4 | 18 parts by mass |

Example X-5

<Preparation of Heat-sensitive Adhesive Material>

A heat-sensitive adhesive material of Example X-5 was prepared in the same manner as in Example X-1, except that a heat-sensitive pressure-sensitive adhesive liquid 5 stated below was used in place of the heat-sensitive pressure-sensitive adhesive liquid 1.

-Preparation of Heat-sensitive Pressure-sensitive Adhesive Liquid 5-

A heat-sensitive pressure-sensitive adhesive liquid 5 containing the following composition was prepared by using the thermofusible material dispersions 3 and 4.

| | |
|---|---|
| Styrene-butadiene copolymer emulsion (trade name: NALSTER SR111, manufactured by JSR Corporation, glass transition temperature (Tg) = −34° C., non-volatile content: 50% by mass) | 30 parts by mass |
| Thermofusible material dispersion 3 | 52 parts by mass |
| Thermofusible material dispersion 4 | 18 parts by mass |

Example X-6

<Preparation of Heat-sensitive Adhesive Material>

A heat-sensitive adhesive material of Example X-6 was prepared in the same manner as in Example X-1, except that a heat-sensitive pressure-sensitive adhesive liquid 6 stated below was used in place of the heat-sensitive pressure-sensitive adhesive liquid 1.

-Preparation of Heat-sensitive Pressure-sensitive Adhesive Liquid 6

A heat-sensitive pressure-sensitive adhesive liquid 6 containing the following composition was prepared by using the thermofusible material dispersions 1 and 2 and the non-thermofusible material dispersion 2.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 1 | 52 parts by mass |
| Thermofusible material dispersion 2 | 18 parts by mass |
| Non-thermofusible material dispersion 2 | 16.7 parts by mass |

Example X-7

<Preparation of Heat-sensitive Adhesive Material>

The under layer coating solution was applied over a surface (back surface) of a single-sided coat paper of a basis weight of 80 g/m², so as to have a dry mass of 5 g/m², and the applied coating solution was dried to thereby prepare an under layer.

Next, over the surface of the under layer, the same heat-sensitive pressure-sensitive adhesive liquid 1 as that used in Example X-1 was applied and the applied liquid 1 was dried in the same manner as in Example X-1 to thereby prepare a heat-sensitive adhesive material of Example X-7.

Example X-8

<Preparation of Heat-sensitive Adhesive Material>

A heat-sensitive adhesive material of Example X-8 was prepared in the same manner as in Example X-1, except that a heat-sensitive pressure-sensitive adhesive liquid 7 stated below was used in place of the heat-sensitive pressure-sensitive adhesive liquid 1.

-Preparation of Heat-sensitive Pressure-sensitive Adhesive Liquid 7-

A heat-sensitive pressure-sensitive adhesive liquid 7 containing the following composition was prepared by using the thermofusible material dispersions 1 and 5.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 1 | 52 parts by mass |
| Thermofusible material dispersion 5 | 18 parts by mass |

Example X-9

<Preparation of Heat-sensitive Adhesive Material>

A heat-sensitive adhesive material of Example X-9 was prepared in the same manner as in Example X-1, except that a heat-sensitive pressure-sensitive adhesive liquid 8 stated below was used in place of the heat-sensitive pressure-sensitive adhesive liquid 1.

-Preparation of Heat-sensitive Pressure-sensitive Adhesive Liquid 8-

A heat-sensitive pressure-sensitive adhesive liquid 8 containing the following composition was prepared by using the thermofusible material dispersions 1 and 5.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 1 | 35 parts by mass |
| Thermofusible material dispersion 5 | 35 parts by mass |

Example X-10

<Preparation of Heat-sensitive Adhesive Material>

A heat-sensitive adhesive material of Example X-10 was prepared in the same manner as in Example X-1, except that a heat-sensitive pressure-sensitive adhesive liquid 9 stated below was used in place of the heat-sensitive pressure-sensitive adhesive liquid 1.

-Preparation of Heat-sensitive Pressure-sensitive Adhesive Liquid 9-

A heat-sensitive pressure-sensitive adhesive liquid 9 containing the following composition was prepared by using the thermofusible material dispersions 1 and 5.

| | |
|---|---|
| Methyl methacrylate-2-ethylhexyl acrylate copolymer emulsion (glass transition temperature (Tg) = −30° C., non-volatile content: 50% by mass) | 30 parts by mass |
| Thermofusible material dispersion 1 | 52 parts by mass |
| Thermofusible material dispersion 5 | 18 parts by mass |

Example X-11

<Preparation of Heat-sensitive Adhesive Material>

A heat-sensitive adhesive material of Example X-11 was prepared in the same manner as in Example X-1, except that a heat-sensitive pressure-sensitive adhesive liquid 10 stated below was used in place of the heat-sensitive pressure-sensitive adhesive liquid 1.

-Preparation of Heat-sensitive Pressure-sensitive Adhesive Liquid 10-

A heat-sensitive pressure-sensitive adhesive liquid 10 containing the following composition was prepared by using the thermofusible material dispersions 3 and 6.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 3 | 52 parts by mass |
| Thermofusible material dispersion 6 | 18 parts by mass |

Example X-12

<Preparation of Heat-sensitive Adhesive Material>

A heat-sensitive adhesive material of Example X-12 was prepared in the same manner as in Example X-1, except that a heat-sensitive pressure-sensitive adhesive liquid 11 stated below was used in place of the heat-sensitive pressure-sensitive adhesive liquid 1.

-Preparation of Heat-sensitive Pressure-sensitive Adhesive Liquid 11-

A heat-sensitive pressure-sensitive adhesive liquid 11 containing the following composition was prepared by using the thermofusible material dispersions 1 and 5 and the non-thermofusible material dispersion 1.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 1 | 52 parts by mass |
| Thermofusible material dispersion 5 | 18 parts by mass |
| Non-thermofusible material dispersion 1 | 16.7 parts by mass |

Example X-13

<Preparation of Heat-sensitive Adhesive Material>

A heat-sensitive adhesive material of Example X-13 was prepared in the same manner as in Example X-1, except that a heat-sensitive pressure-sensitive adhesive liquid 12 stated below was used in place of the heat-sensitive pressure-sensitive adhesive liquid 1.

-Preparation of Heat-sensitive Pressure-sensitive Adhesive Liquid 12-

A heat-sensitive pressure-sensitive adhesive liquid 12 containing the following composition was prepared by using the thermofusible material dispersions 1 and 5.

| | |
|---|---|
| Styrene-butadiene copolymer emulsion (trade name: NALSTER SR111, manufactured by JSR Corporation, glass transition temperature (Tg) = −34° C., non-volatile content: 50% by mass | 30 parts by mass |
| Thermofusible material dispersion 1 | 52 parts by mass |
| Thermofusible material dispersion 5 | 18 parts by mass |

Example X-14

<Preparation of Heat-sensitive Adhesive Material>

The under layer coating solution was applied over a surface (back surface) of a single-sided coat paper of a basis weight of 80 g/m² on which no recording layer was formed, so as to have a dry mass of 5 g/m², and the applied coating solution was dried to thereby prepare an under layer.

Next, over the surface of the under layer, the same heat-sensitive pressure-sensitive adhesive liquid 7 as that used in Example X-8 was applied and the applied liquid 7 was dried in the same manner as in Example X-8 to thereby prepare a heat-sensitive adhesive material of Example X-14.

Example X-15

<Preparation of Heat-sensitive Adhesive Material>

A heat-sensitive adhesive material of Example X-15 was prepared in the same manner as in Example X-1, except that a heat-sensitive pressure-sensitive adhesive liquid 13 stated below was used in place of the heat-sensitive pressure-sensitive adhesive liquid 1.

-Preparation of Heat-sensitive Pressure-sensitive Adhesive Liquid 13-

A heat-sensitive pressure-sensitive adhesive liquid 13 containing the following composition was prepared by using the thermofusible material dispersions 1, 2 and 5.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 1 | 52 parts by mass |
| Thermofusible material dispersion 2 | 9 parts by mass |
| Thermofusible material dispersion 5 | 9 parts by mass |

Example X-16

<Formation of Heat-sensitive Recording Layer>
-Preparation of Non-Foamable Heat-Insulating Layer Coating Solution [E Liquid]-

A mixture containing the following composition was stirred and dispersed to thereby prepare a non-foamable heat-insulating layer forming coating solution [E liquid].

| | |
|---|---|
| Fine hollow particle dispersion (a copolymer resin containing vinylidene chloride-acrylonitrile as the main components, solid content = 32% by mass, average particle diameter = 3.6 μm, hollow rate = 92%): 30 parts by mass; and a styrene-butadiene copolymer latex (glass transition temperature (Tg) = +4° C.)) | 10 parts by mass |
| Surfactant (DAPRO W-77, manufactured by Elementis Japan K.K.) | 0.1 parts by mass |
| Water | 60 parts by mass |

-Preparation of Color-Coupler Dispersion [F Liquid]-

A mixture containing the following composition was stirred and dispersed to thereby prepare a color-coupler dispersion [F liquid].

| | |
|---|---|
| 3-di-n-butylamino-6-methyl-7-anilinofluoran | 20 parts by mass |
| Polyvinyl alcohol (10% by mass aqueous solution) | 10 parts by mass |
| Water | 70 parts by mass |

-Preparation of Color-Developer Dispersion [G Liquid]-

A mixture containing the following composition was dispersed by a sand mill such that the respective components had an average particle diameter of 1.5 μm to thereby prepare a color-developer dispersion [G liquid].

| | |
|---|---|
| 4-isopropoxy-4'-hydroxy diphenyl sulfone | 10 parts by mass |
| Polyvinyl alcohol (10% by mass aqueous solution) | 25 parts by mass |
| Calcium carbonate | 15 parts by mass |
| Water | 50 parts by mass |

Next, the color-coupler dispersion [F liquid] and the color-developing dispersion [G liquid] were mixed at a mixture ratio of [F liquid]:[G liquid]=1:8 (mass ratio) and stirred to prepare a coating solution for heat-sensitive chromogenic layer [H liquid].

Next, the coating solution for forming a non-foamable heat-insulating layer [E liquid] was applied over a surface (back surface) of a single-sided coat paper of an average basis weight of 80 g/m² (OK ADNIS ROUGH, manufactured by OJI Paper Co.) so as to have a dry mass of 4 g/m², and the applied E liquid was dried to thereby prepare a non-foamable heat-insulating layer.

Next, over the surface of the non-foamable heat-insulating layer, the color-coupler dispersion [F liquid] was applied so as to have a dry mass of 5 g/m² and the applied F liquid was dried to form a heat-sensitive recording layer. Subsequently, the surface of the heat-sensitive recording layer was subjected to a super-calender treatment so as to have an Oken smoothness of 2,000 seconds, thereby a heat-sensitive recording paper having a heat-sensitive recording layer was prepared.

Next, over the support surface of the obtained heat-sensitive recording paper on which no heat-sensitive recording layer was formed, the same heat-sensitive pressure-sensitive adhesive liquid 1 as that used in Example X-1 was applied such that the dry adhesion amount was 16 g/m² and the applied liquid 1 was dried to form a heat-sensitive tacky layer, thereby a heat-sensitive adhesive material of Example X-16 was prepared.

Comparative Example X-1

<Preparation of Heat-Sensitive Adhesive Material>

A heat-sensitive adhesive material of Comparative Example X-1 was prepared in the same manner as in Example X-1, except that a heat-sensitive pressure-sensitive adhesive liquid 14 stated below was used in place of the heat-sensitive pressure-sensitive adhesive liquid 1.

-Preparation of Heat-sensitive Pressure-sensitive Adhesive Liquid 14-

A heat-sensitive pressure-sensitive adhesive liquid 14 containing the following composition was prepared by using the thermofusible material dispersions 1 and 7.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 1 | 35 parts by mass |
| Thermofusible material dispersion 7 | 35 parts by mass |

Comparative Example X-2

<Preparation of Heat-sensitive Adhesive Material>

A heat-sensitive adhesive material of Comparative Example X-2 was prepared in the same manner as in Example X-1, except that a heat-sensitive pressure-sensitive adhesive liquid 15 stated below was used in place of the heat-sensitive pressure-sensitive liquid 1.

-Preparation of Heat-sensitive Pressure-sensitive Adhesive Liquid 15-

A heat-sensitive pressure-sensitive adhesive liquid 15 containing the following composition was prepared by using the thermofusible material dispersions 2 and 8.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 2 | 35 parts by mass |
| Thermofusible material dispersion 8 | 35 parts by mass |

Comparative Example X-3

<Preparation of Heat-sensitive Adhesive Material>

A heat-sensitive adhesive material of Comparative Example X-3 was prepared in the same manner as in Example X-1, except that a heat-sensitive pressure-sensitive adhesive liquid 16 stated below was used in place of the heat-sensitive pressure-sensitive liquid 1.

-Preparation of Heat-sensitive Pressure-sensitive Adhesive Liquid 16-

A heat-sensitive pressure-sensitive adhesive liquid 16 containing the following composition was prepared by using the thermofusible material dispersions 5 and 8.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 5 | 35 parts by mass |
| Thermofusible material dispersion 8 | 35 parts by mass |

Comparative Example X-4

<Preparation of Heat-sensitive Adhesive Material>

A heat-sensitive adhesive material of Comparative Example X-4 was prepared in the same manner as in Example X-1, except that a heat-sensitive pressure-sensitive adhesive liquid 17 stated below was used in place of the heat-sensitive pressure-sensitive liquid 1.

-Preparation of Heat-sensitive Pressure-sensitive Adhesive Liquid 17-

A heat-sensitive pressure-sensitive adhesive liquid 17 containing the following composition was prepared by using the thermofusible material dispersion 1.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 1 | 70 parts by mass |

Comparative Example X-5

<Preparation of Heat-sensitive Adhesive Material>

A heat-sensitive adhesive material of Comparative Example X-5 was prepared in the same manner as in Example X-1, except that a heat-sensitive pressure-sensitive adhesive liquid 18 stated below was used in place of the heat-sensitive pressure-sensitive liquid 1.

-Preparation of Heat-sensitive Pressure-sensitive Adhesive Liquid 18-

A heat-sensitive pressure-sensitive adhesive liquid 18 containing the following composition was prepared by using the thermofusible material dispersion 2.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 2 | 70 parts by mass |

Comparative Example X-6

<Preparation of Heat-sensitive Adhesive Material>

A heat-sensitive adhesive material of Comparative Example X-6 was prepared in the same manner as in Example X-1, except that a heat-sensitive pressure-sensitive adhesive liquid 19 stated below was used in place of the heat-sensitive pressure-sensitive liquid 1.

-Preparation of Heat-sensitive Pressure-sensitive Adhesive Liquid 19-

A heat-sensitive pressure-sensitive adhesive liquid 19 containing the following composition was prepared by using the thermofusible material dispersion 5.

| | |
|---|---|
| Methyl methacrylate-2-ethylhexyl acrylate copolymer emulsion (glass transition temperature (Tg) = −65° C., non-volatile content: 50% by mass) | 30 parts by mass |
| Thermofusible material dispersion 5 | 70 parts by mass |

Comparative Example X-7

<Preparation of Heat-sensitive Adhesive Material>

A heat-sensitive adhesive material of Comparative Example X-7 was prepared in the same manner as in Example X-1, except that a heat-sensitive pressure-sensitive adhesive liquid 20 stated below was used in place of the heat-sensitive pressure-sensitive liquid 1.

-Preparation of Heat-sensitive Pressure-sensitive Adhesive Liquid 20-

A heat-sensitive pressure-sensitive adhesive liquid 20 containing the following composition was prepared by using the thermofusible material dispersions 1 and 2.

| | |
|---|---|
| Methyl methacrylate-2-ethylhexyl acrylate copolymer emulsion (glass transition temperature (Tg) = −72° C., non-volatile content: 50% by mass) | 30 parts by mass |
| Thermofusible material dispersion 1 | 52 parts by mass |
| Thermofusible material dispersion 2 | 18 parts by mass |

Comparative Example X-8

<Preparation of Heat-sensitive Adhesive Material>

A heat-sensitive adhesive material of Comparative Example X-8 was prepared in the same manner as in Example X-1, except that a heat-sensitive pressure-sensitive adhesive liquid 21 stated below was used in place of the heat-sensitive pressure-sensitive liquid 1.

-Preparation of Heat-sensitive Pressure-sensitive Adhesive Liquid 21-

A heat-sensitive pressure-sensitive adhesive liquid 21 containing the following composition was prepared by using the thermofusible material dispersions 1 and 5.

| | |
|---|---|
| Methyl methacrylate-2-ethylhexyl acrylate copolymer emulsion (glass transition temperature (Tg) = −72° C., non-volatile content: 50% by mass) | 30 parts by mass |
| Thermofusible material dispersion 1 | 52 parts by mass |
| Thermofusible material dispersion 5 | 18 parts by mass |

Comparative Example X-9

<Preparation of Heat-sensitive Adhesive Material>

A heat-sensitive adhesive material of Comparative Example X-9 was prepared in the same manner as in Example X-1, except that a heat-sensitive pressure-sensitive adhesive liquid 22 stated below was used in place of the heat-sensitive pressure-sensitive liquid 1.

-Preparation of Heat-sensitive Pressure-sensitive Adhesive Liquid 22-

A heat-sensitive pressure-sensitive adhesive liquid 22 containing the following composition was prepared by using the thermofusible material dispersions 1 and 2.

| | |
|---|---|
| Methyl methacrylate-2-ethylhexyl acrylate copolymer emulsion (glass transition temperature (Tg) = −5° C., non-volatile content: 50% by mass) | 30 parts by mass |
| Thermofusible material dispersion 1 | 52 parts by mass |
| Thermofusible material dispersion 2 | 18 parts by mass |

Subsequently, the thus obtained respective heat-sensitive adhesive materials of Examples X-1 to X-16 and Comparative Examples X-1 to X-9 were evaluated as to adhesion property and blocking resistance as follows. Table 2X shows the evaluation results.

<Evaluation of Adhesion Property>

The obtained heat-sensitive adhesive materials were respectively cut in a rectangle (40 mm×150 mm) and each of the cut materials was thermally activated through the use of a heat-sensitive printing apparatus (TH-PMD, manufactured by Ohkura Electric Co., Ltd.) under the conditions of a thermal head energy: 0.50 mJ/dot; printing speed: 4 ms/line; and platen pressure: 6 kgf/line.

Next, the each of the thermally activated heat-sensitive adhesive materials was affixed to a corrugated board which was left intact for 1 hour or more, under three environmental conditions of 0° C. and a relative humidity (RH) of 30%; 22° C. and a relative humidity of 60%; and 40° C. and a relative humidity of 60%, in the longitudinal direction thereof using a rubber roller under a pressure of 2 kg, the corrugated board was stored for 1 day, and thereafter the heat-sensitive adhesive materials were respectively peeled off from the corrugated board under the conditions of a peeling angle of 180 degrees and a peeling rate of 300 mm/min.

The adhesive strength at that time was measured by means of a forth gauge (MODEL DPS-5, manufactured by IMADA Co.), and the measured data was read at 0.1-second intervals to express the adhesive strength by an averaged numerical value. Note that the unit of the adhesive strength is gf/40 mm.

[Rank of Adhesive Strength]
A: 1,000 gf/40 mm or more
B: 500 gf/40 mm or more to less than 1,000 gf/40 mm
C: 100 gf/40 mm or more to less than 500 gf/40 mm
D: 50 gf/40 mm or more to less than 100 gf/40 mm
E: less than 50 gf/40 mm (could not be affixed to corrugated boards)

<Evaluation of Blocking Resistance>

The obtained heat-sensitive adhesive materials were respectively cut in size of 50 mm×50 mm, the cut heat-sensitive adhesive materials were laminated on a PPC paper of the same size as the cut heat-sensitive adhesive materials, and then they were stored under a load of 5 kg and at a temperature of 50° C. for 24 hours. Appearance how the each of the heat-sensitive adhesive materials was actually peeled off from the corrugated board was visually checked, thereby the respective heat-sensitive adhesive materials were evaluated based on the rank and evaluation criteria shown in the following Table 1X.

TABLE 1X

| Evaluation | Rank | Resistance to peeling | Peel-off noise level | Dot-like transcription | Exfoliated level |
|---|---|---|---|---|---|
| A | 10 | its own weight | | | |
| | 9 | Slightly gave resistance | No noise | | |
| B | 8 | Gave resistance | Slightly heard | | |
| | 7 | | Noise caused | | |
| C | 6 | | | Partly found | |
| | 5 | | | 30% to 50% | |
| | 4 | | | 50% to the entire surface | |
| D | 3 | | | | Partly found |
| | 2 | | | | 30% to 50% |
| | 1 | | | | 50% to the entire surface |

TABLE 2X

| | Adhesive Strength | | | | | | Blocking Resistance | |
|---|---|---|---|---|---|---|---|---|
| | 0° C. | | 22° C. | | 40° C. | | 50° C. | |
| Ex. X-1 | 500 | B | 700 | B | 500 | B | 8 | B |
| Ex. X-2 | 400 | C | 900 | B | 600 | B | 9 | A |
| Ex. X-3 | 400 | C | 600 | B | 500 | B | 9 | A |
| Ex. X-4 | 500 | B | 800 | B | 700 | B | 8 | B |
| Ex. X-5 | 400 | C | 700 | B | 500 | B | 8 | B |
| Ex. X-6 | 515 | B | 690 | B | 520 | B | 9 | A |
| Ex. X-7 | 1,300 | A | 1,000 | A | 700 | B | 9 | A |
| Ex. X-8 | 618 | B | 712 | B | 502 | B | 7 | B |
| Ex. X-9 | 503 | B | 680 | B | 651 | B | 8 | B |
| Ex. X-10 | 512 | B | 624 | B | 688 | B | 8 | B |
| Ex. X-11 | 718 | B | 882 | B | 557 | B | 7 | B |
| Ex. X-12 | 615 | B | 708 | B | 501 | B | 10 | A |
| Ex. X-13 | 517 | B | 611 | B | 510 | B | 9 | A |
| Ex. X-14 | 1,405 | A | 1,255 | A | 745 | B | 7 | B |
| Ex. X-15 | 630 | B | 627 | B | 616 | B | 8 | B |
| Ex. X-16 | 500 | B | 700 | B | 500 | B | 8 | B |
| Compara. Ex. X-1 | 25 | E | 100 | C | 300 | C | 9 | A |
| Compara. Ex. X-2 | 0 | E | 300 | C | 600 | B | 7 | B |
| Compara. Ex. X-3 | 0 | E | 300 | C | 600 | B | 7 | B |

TABLE 2X-continued

| | Adhesive Strength | | | | | | Blocking Resistance | |
|---|---|---|---|---|---|---|---|---|
| | 0° C. | | 22° C. | | 40° C. | | 50° C. | |
| Compara. Ex. X-4 | 300 | C | 30 | E | 15 | E | 3 | D |
| Compara. Ex. X-5 | 0 | E | 200 | C | 600 | B | 7 | B |
| Compara. Ex. X-6 | 0 | E | 200 | C | 600 | B | 7 | B |
| Compara. Ex. X-7 | 800 | B | 300 | C | 100 | C | 2 | D |
| Compara. Ex. X-8 | 800 | B | 300 | C | 100 | C | 3 | D |
| Compara. Ex. X-9 | 30 | E | 220 | C | 439 | C | 9 | A |

The results shown in Table 2X demonstrated that the heat-sensitive adhesive materials of Examples X-1 to X-16 were excellent in adhesion property (surface tackiness) to corrugated boards under low-temperature (0° C.) environments to high-temperature (40° C.) environments and also excellent in blocking resistance as compared to the heat-sensitive adhesive materials of Comparative Examples X-1 to X-9.

Next, respective heat-sensitive adhesive materials of Examples Y-1 to Y-21 and Comparative Examples Y-1 to Y-7 were prepared as follows.

-Preparation of Heat-sensitive Adhesive Material-
<Preparation of Coating Solution>
[A Liquid] Thermofusible Material Dispersion

| Thermofusible material | 30.0 parts by mass |
|---|---|
| Polyvinyl alcohol (30% by mass aqueous solution) | 5.0 parts by mass |
| Surfactant (alkyl-allyl sulfonate) | 0.15 parts by mass |
| Water | 64.85 parts by mass |

A mixture containing the composition stated above was dispersed by using a sand mill so as to have an average particle diameter of 1.0 μm, thereby a dispersion [A liquid] was obtained.

[B Liquid] Non-thermofusible Material Dispersion

| Non-thermofusible material | 30.0 parts by mass |
|---|---|
| Polyvinyl alcohol (30% by mass aqueous solution- | 5.0 parts by mass |
| Surfactant (alkyl-allyl sulfonate) | 0.15 parts by mass |
| Water | 64.85 parts by mass |

A mixture containing the composition stated above was dispersed by using a sand mill so as to have an average particle diameter of 1.5 μm, thereby a dispersion [B liquid] was obtained.

[C Liquid] Heat-sensitive Tacky Layer-forming Liquid

| Methyl methacrylate-2-ethylhexyl acrylate copolymer emulsion (glass transition temperature (Tg): −65° C.; non-volatile content: 50%) | 10 parts by mass |
|---|---|
| Terpene adhesion imparting agent emulsion (TAMANOL E-100, manufactured by Arakawa Chemical Industries, Ltd.; softening point: 150° C.; non-volatile content: 50%) | 6.5 parts by mass |
| Thermofusible material dispersion prepared as above [A liquid] | 33.3 parts by mass |
| Thermofusible material dispersion prepared as above [B liquid] | 16.7 parts by mass |

[D Liquid] Under Layer Coating Solution

| Fine hollow particle (a copolymer resin containing acrylonitrile-vinylidene chloride as the main components) (solid content: 41%, volume average particle diameter: 3.6 μm, hollow rate: 90%) | 14.6 parts by mass |
|---|---|
| Copolymer of 2-ethylhexyl acrylate/methyl methacrylate/styrene (glass transition temperature (Tg) = −65° C.; solid content: 55.4%, manufactured by Showa High Polymer Co., Ltd.) | 21.7 parts by mass |
| Water | 63.7 parts by mass |

As a support, a single-sided coat paper of a basis weight of 80 g/m$^2$ (OK ADNIS ROUGH, manufactured by OJI Paper Co.) was used. Over the single-sided coat paper surface on which no coat layer was formed, the under layer coating solution [D liquid] prepared as above was applied such that the dry adhesion amount was 5 g/m$^2$ and the applied liquid D was dried to form an intermediate layer. Subsequently, over the surface of the intermediate layer, the heat-sensitive pressure-sensitive adhesive coating solution [C liquid] prepared as above was applied such that the dry adhesion amount was 10 g/m$^2$ and the applied liquid C was dried to form a heat-sensitive tacky layer, thereby a heat-sensitive adhesive material was prepared.

Example Y-1

According to the above-noted procedures to prepare a heat-sensitive adhesive material, a heat-sensitive adhesive material of Example Y-1 was prepared using a triphenylphosphine as a thermofusible material in the thermofusible material dispersion [A liquid] and a silicon dioxide (silica) as a non-thermofusible material in the non-thermofusible material dispersion [B liquid] as shown in the following Table 1Y-(a).

In Example Y-1, the mass ratio of the non-thermofusible material to the thermoplastic resin was 1.0, and the mass ratio of the non-thermofusible material to the thermofusible material was 0.5.

Example Y-2

-Preparation of Heat-sensitive Adhesive Material-
A heat-sensitive adhesive material of Example Y-2 was prepared in the same manner as in Example Y-1, except that a resin particle containing a benzoguanamine-melamine-formaldehyde condensate (EPOSTER M30, manufactured by NIPPON SHOKUBAI CO., LTD.) was used as a non-thermofusible material in the non-thermofusible material dispersion [B liquid] in place of the silicon dioxide, as shown in the following Table 1Y-(a).

Example Y-3

-Preparation of Heat-sensitive Adhesive Material-
A heat-sensitive adhesive material of Example Y-3 was prepared in the same manner as in Example Y-1, except that a silicone resin particle (KMP-590, manufactured by Shin-Etsu Chemical Co., Ltd.) was used as a non-thermofusible material in the non-thermofusible material dispersion [B liquid] in place of the silicon dioxide as shown in the following Table 1Y-(a).

Example Y-4

-Preparation of Heat-sensitive Adhesive Material-

A heat-sensitive adhesive material of Example Y-4 was prepared in the same manner as in Example Y-1, except that a polymethyl methacrylate crosslinked material (EPOSTER MA1002, manufactured by NIPPON SHOKUBAI CO., LTD.) was used as a non-thermofusible material in the non-thermofusible material dispersion [B liquid] in place of the silicon dioxide as shown in the following Table 1Y-(a).

Example Y-5

-Preparation of Heat-sensitive Adhesive Material-

A heat-sensitive adhesive material of Example Y-5 was prepared in the same manner as in Example Y-3, except that the added amount of the non-thermofusible material dispersion [B liquid] at the time of preparation of the heat-sensitive tacky layer-forming liquid [C liquid] was changed to 8.5 parts by mass as shown in the following Table 1Y-(a).

In Example Y-5, the mass ratio of the non-thermofusible material to the thermoplastic resin was 0.51.

Example Y-6

-Preparation of Heat-sensitive Adhesive Material-

A heat-sensitive adhesive material of Example Y-6 was prepared in the same manner as in Example Y-3, except that the added amount of the non-thermofusible material dispersion [B liquid] at the time of preparation of the heat-sensitive tacky layer-forming liquid [C liquid] was changed to 33 parts by mass as shown in the following Table 1Y-(a).

In Example Y-6, the mass ratio of the non-thermofusible material to the thermoplastic resin was 1.98.

Example Y-7

-Preparation of Heat-sensitive Adhesive Material-

A heat-sensitive adhesive material of Example Y-7 was prepared in the same manner as in Example Y-3, except that the added amount of the non-thermofusible material dispersion [B liquid] at the time of preparation of the heat-sensitive tacky layer-forming liquid [C liquid] was changed to 7 parts by mass as shown in the following Table 1Y-(a).

In Example Y-7, the mass ratio of the non-thermofusible material to the thermoplastic resin was 0.42.

Example Y-8

-Preparation of Heat-sensitive Adhesive Material-

A heat-sensitive adhesive material of Example Y-8 was prepared in the same manner as in Example Y-3, except that the added amount of the non-thermofusible material dispersion [B liquid] at the time of preparation of the heat-sensitive tacky layer-forming liquid [C liquid] was changed to 40 parts by mass as shown in the following Table 1Y-(a).

In Example Y-8, the mass ratio of the non-thermofusible material to the thermoplastic resin was 2.4 as shown in Table 1Y-(a).

Example Y-9

-Preparation of Heat-sensitive Adhesive Material-

A heat-sensitive adhesive material of Example Y-9 was prepared in the same manner as in Example Y-3, except that the terpene adhesion imparting agent emulsion was not added at the time of preparation of the heat-sensitive tacky layer-forming liquid [C liquid] as shown in the following Table 1Y-(a).

Example Y-10

-Preparation of Heat-sensitive Adhesive Material-

A heat-sensitive adhesive material of Example Y-10 was prepared in the same manner as in Example Y-3, except that the heat-sensitive pressure-sensitive adhesive coating solution [C liquid] was applied over the intermediate layer surface such that the dry adhesion amount thereof was 20 $g/m^2$ as shown in the following Table 1Y-(a).

Example Y-11

-Preparation of Heat-sensitive Adhesive Material-

A heat-sensitive adhesive material of Example Y-11 was prepared in the same manner as in Example Y-3, except that the heat-sensitive pressure-sensitive adhesive coating solution [C liquid] was applied over the intermediate layer surface such that the dry adhesion amount thereof was 9 $\mu m^2$ as shown in the following Table 1Y-(a).

Example Y-12

-Preparation of Heat-sensitive Adhesive Material-

A heat-sensitive adhesive material of Example Y-12 was prepared in the same manner as in Example Y-3, except that the heat-sensitive pressure-sensitive adhesive coating solution [C liquid] was applied over the intermediate layer surface such that the dry adhesion amount thereof was 21 $g/m^2$ as shown in the following Table 1Y-(a).

Example Y-13

-Preparation of Heat-sensitive Adhesive Material-

A heat-sensitive adhesive material of Example Y-13 was prepared in the same manner as in Example Y-3, except that the heat-sensitive pressure-sensitive adhesive coating solution [C liquid] was applied over the intermediate layer surface such that the dry adhesion amount thereof was 30 $g/m^2$ as shown in the following Table 1Y-(a).

Example Y-14

-Preparation of Heat-sensitive Adhesive Material-

A heat-sensitive adhesive material of Example Y-14 was prepared in the same manner as in Example Y-3, except that the heat-sensitive pressure-sensitive adhesive coating solution [C liquid] was applied over the intermediate layer surface such that the dry adhesion amount thereof was 31 $g/m^2$ as shown in the following Table 1Y-(a).

Example Y-15

-Preparation of Heat-sensitive Adhesive Material-

A heat-sensitive adhesive material of Example Y-15 was prepared in the same manner as in Example Y-3, except that the heat-sensitive pressure-sensitive adhesive coating solution [C liquid] was applied over the intermediate layer surface

Example Y-16

-Preparation of Heat-sensitive Adhesive Material-

A heat-sensitive adhesive material of Example Y-16 was prepared in the same manner as in Example Y-3, except that no under layer was formed as shown in the following Table 1Y-(a).

Example Y-17

-Preparation of Heat-sensitive Adhesive Material-

A heat-sensitive adhesive material of Example Y-17 was prepared in the same manner as in Example Y-3, except that in the preparation of the thermofusible material dispersion [A liquid] at the time of preparation of the heat-sensitive pressure-sensitive adhesive coating solution [C liquid], a mixture of triphenylphosphine and tri-m-tolylphosphine which was mixed at a mass ratio of 1:1 (50:50) was used in place of triphenylphosphine, as shown in the following Table 1Y-(a). It should be noted that the tri-m-tolylphosphine is a compound represented by the Structural Formula (6).

Example Y-18

-Preparation of Heat-sensitive Adhesive Material-

A heat-sensitive adhesive material of Example Y-18 was prepared in the same manner as in Example Y-3, except that in the preparation of the thermofusible material dispersion [A liquid] at the time of preparation of the heat-sensitive pressure-sensitive adhesive coating solution [C liquid], a mixture of triphenylphosphine and 2-(2'-hydroxy-3'-t-butyl-5'-methylphenyl)-5 chlorobenzotriazole which was mixed at a mass ratio of 1:1 (50:50) was used in place of triphenylphosphine, as shown in the following Table 1Y-(a). It should be noted that the 2-(2'-hydroxy-3'-t-butyl-5'-methylphenyl)-5 chlorobenzotriazole is a compound represented by the Structural Formula (1).

Example Y-19

-Preparation of Heat-sensitive Adhesive Material-

A heat-sensitive adhesive material of Example Y-19 was prepared in the same manner as in Example Y-18, except that in the preparation of the thermofusible material dispersion [A liquid] at the time of preparation of the heat-sensitive pressure-sensitive adhesive coating solution [C liquid], the mass ratio of the mixture of triphenylphosphine and 2-(2'-hydroxy-3'-t-butyl-5'-methylphenyl)-5 chlorobenzotriazole was changed to 3:1 (75:25), as shown in the following Table 1Y-(a).

Example Y-20

-Preparation of Heat-sensitive Adhesive Material-

A heat-sensitive adhesive material of Example Y-20 was prepared in the same manner as in Example Y-18, except that in the preparation of the thermofusible material dispersion [A liquid] at the time of preparation of the heat-sensitive pressure-sensitive adhesive coating solution [C liquid], the mass ratio of the mixture of triphenylphosphine and 2-(2'-hydroxy-3'-t-butyl-5'-methylphenyl)-5 chlorobenzotriazole was changed to 1:3 (25:75), as shown in the following Table 1Y-(b).

Example Y-21

-Preparation of Heat-sensitive Adhesive Material-

A heat-sensitive adhesive material of Example Y-21 was prepared in the same manner as in Example Y-3, except that in place of the terpene adhesion imparting agent emulsion (TAMANOL E-100, manufactured by Arakawa Chemical Industries, Ltd.) used in the heat-sensitive pressure-sensitive adhesive coating solution [C liquid], a rosin ester adhesion imparting agent emulsion (SUPER ESTER E-650, manufactured by Arakawa Chemical Industries, Ltd.; softening point: 160° C.; non-volatile content: 50%) was used, as shown in the following Table 1Y-(b).

Comparative Example Y-1

-Preparation of Heat-sensitive Adhesive Material-

A heat-sensitive adhesive material of Comparative Example Y-1 was prepared in the same manner as in Example Y-3, except that the non-thermofusible material dispersion [B liquid] was not used at the preparation of the heat-sensitive pressure-sensitive adhesive coating solution [C liquid], as shown in the following Table 1Y-(b).

Comparative Example Y-2

-Preparation of Heat-sensitive Adhesive Material-

A heat-sensitive adhesive material of Comparative Example Y-2 was prepared in the same manner as in Example Y-3, except that in the preparation of the thermofusible material dispersion [A liquid] at the time of preparation of the heat-sensitive pressure-sensitive adhesive coating solution [C liquid], 2-(2'-hydroxy-3'-t-butyl-5'-methylphenyl)-5 chlorobenzotriazole was used in place of triphenylphosphine, as shown in the following Table 1Y-(b).

Comparative Example Y-3

-Preparation of Heat-sensitive Adhesive Material-

A heat-sensitive adhesive material of Comparative Example Y-3 was prepared in the same manner as in Example Y-3, except that in the preparation of the thermofusible material dispersion [A liquid] at the time of preparation of the heat-sensitive pressure-sensitive adhesive coating solution [C liquid], 1,4-cyclohexanedimethanol bis(diphenyl phosphate) was used in place of triphenylphosphine, as shown in the following Table 1Y-(b).

Comparative Example Y-4

-Preparation of Heat-sensitive Adhesive Material-

A heat-sensitive adhesive material of Comparative Example Y-4 was prepared in the same manner as in Example Y-3, except that in the preparation of the thermofusible material dispersion [A liquid] at the time of preparation of the heat-sensitive pressure-sensitive adhesive coating solution [C liquid], resorcinol bis[di(2,6-dimethylphenyl)phosphate] was used in place of triphenylphosphine, as shown in the following Table 1Y-(b).

Comparative Example Y-5

-Preparation of Heat-sensitive Adhesive Material-

A heat-sensitive adhesive material of Comparative Example Y-5 was prepared in the same manner as in Example Y-3, except that in the preparation of a heat-sensitive tacky layer forming liquid at the time of preparation of the heat-sensitive pressure-sensitive adhesive coating solution [C liquid], the non-thermofusible material dispersion [B liquid] was not used, as shown in the following Table 1Y-(b).

Comparative Example Y-6

-Preparation of Heat-sensitive Adhesive Material-

A heat-sensitive adhesive material of Comparative Example Y-6 was prepared in the same manner as in Example Y-4, except that in the preparation of the heat-sensitive pressure-sensitive adhesive coating solution [C liquid], the non-thermofusible material dispersion [B liquid] was not used, as shown in the following Table 1Y-(b).

Comparative Example Y-7

-Preparation of Heat-sensitive Adhesive Material-

A heat-sensitive adhesive material of Comparative Example Y-7 was prepared in the same manner as in Example Y-1, except that in the preparation of the heat-sensitive pressure-sensitive adhesive coating solution [C liquid], the terpene adhesion imparting agent emulsion was not added, as shown in the following Table 1Y-(b).

TABLE 1Y-(a)

|  | Thermofusible material | Non-thermofusible material | Thermoplastic resin | Adhesion imparting agent | Intermediate layer (under layer) | Mass ratio *4 | Mass ratio *5 | Adhesion amount (g/m$^2$) |
|---|---|---|---|---|---|---|---|---|
| Ex. Y-1 | Triphenylphosphine | Silicon dioxide | *1 | TAMANOL E-100 | Formed | 1.0 | 0.5 | 10 |
| Ex. Y-2 | Triphenylphosphine | EPOSTER M30 | *1 | TAMANOL E-100 | Formed | 1.0 | 0.5 | 10 |
| Ex. Y-3 | Triphenylphosphine | KMP-590 | *1 | TAMANOL E-100 | Formed | 1.0 | 0.5 | 10 |
| Ex. Y-4 | Triphenylphosphine | EPOSTER M1002 | *1 | TAMANOL E-100 | Formed | 1.0 | 0.5 | 10 |
| Ex. Y-5 | Triphenylphosphine | KMP-590 | *1 | TAMANOL E-100 | Formed | 0.51 | 0.5 | 10 |
| Ex. Y-6 | Triphenylphosphine | KMP-590 | *1 | TAMANOL E-100 | Formed | 1.98 | 0.5 | 10 |
| Ex. Y-7 | Triphenylphosphine | KMP-590 | *1 | TAMANOL E-100 | Formed | 0.42 | 0.5 | 10 |
| Ex. Y-8 | Triphenylphosphine | KMP-590 | *1 | TAMANOL E-100 | Formed | 2.40 | 0.5 | 10 |
| Ex. Y-9 | Triphenylphosphine | KMP-590 | *1 | Not used | Formed | 1.0 | 0.5 | 10 |
| Ex. Y-10 | Triphenylphosphine | KMP-590 | *1 | TAMANOL E-100 | Formed | 1.0 | 0.5 | 20 |
| Ex. Y-11 | Triphenylphosphine | KMP-590 | *1 | TAMANOL E-100 | Formed | 1.0 | 0.5 | 9 |
| Ex. Y-12 | Triphenylphosphine | KMP-590 | *1 | TAMANOL E-100 | Formed | 1.0 | 0.5 | 21 |
| Ex. Y-13 | Triphenylphosphine | KMP-590 | *1 | TAMANOL E-100 | Formed | 1.0 | 0.5 | 30 |
| Ex. Y-14 | Triphenylphosphine | KMP-590 | *1 | TAMANOL E-100 | Formed | 1.0 | 0.5 | 31 |
| Ex. Y-15 | Triphenylphosphine | KMP-590 | *1 | TAMANOL E-100 | Formed | 1.0 | 0.5 | 40 |
| Ex. Y-16 | Triphenylphosphine | KMP-590 | *1 | TAMANOL E-100 | Not formed | 1.0 | 0.5 | 10 |
| Ex. Y-17 | Triphenylphosphine:Structural Formula (6) = 1:1 | KMP-590 | *1 | TAMANOL E-100 | Formed | 1.0 | 0.5 | 10 |
| Ex. Y-18 | Triphenylphosphine:Structural Formula (1) = 1:1 | KMP-590 | *1 | TAMANOL E-100 | Formed | 1.0 | 0.5 | 10 |
| Ex. Y-19 | Triphenylphosphine:Structural Formula (1) = 3:1 | KMP-590 | *1 | TAMANOL E-100 | Formed | 1.0 | 0.5 | 10 |

TABLE 1Y-(b)

|  | Thermofusible material | Non-thermofusible material | Thermoplastic resin | Adhesion imparting agent | Intermediate layer (under layer) | Mass ratio *4 | Mass ratio *5 | Adhesion amount (g/m$^2$) |
|---|---|---|---|---|---|---|---|---|
| Ex. Y-20 | Triphenylphosphine:Structural Formula (1) = 1:3 | KMP-590 | *1 | TAMANOL E-100 | Formed | 1.0 | 0.5 | 10 |
| Ex. Y-21 | Triphenylphosphine | KMP-590 | *1 | SUPER ESTER E-650 | Formed | 1.0 | 0.5 | 10 |
| Compara Ex. Y-1 | Triphenylphosphine | Not used | *1 | TAMANOL E-100 | Formed | 0.0 | 0.0 | 10 |
| Compara Ex. Y-2 | Structural Formula (1) | KMP-590 | *1 | TAMANOL E-100 | Formed | 1.0 | 0.5 | 10 |
| Compara Ex. Y-3 | Phosphorus compound *2 | KMP-590 | *1 | TAMANOL E-100 | Formed | 1.0 | 0.5 | 10 |

TABLE 1Y-(b)-continued

|  | Thermofusible material | Non-thermofusible material | Thermoplastic resin | Adhesion imparting agent | Intermediate layer (under layer) | Mass ratio *4 | Mass ratio *5 | Adhesion amount (g/m²) |
|---|---|---|---|---|---|---|---|---|
| Compara Ex. Y-4 | Phosphorus compound *3 | KMP-590 | *1 | TAMANOL E-100 | Formed | 1.0 | 0.5 | 10 |
| Compara Ex. Y-5 | Phosphorus compound *2 | Not used | *1 | TAMANOL E-100 | Formed | 0.0 | 0.0 | 10 |
| Compara Ex. Y-6 | Phosphorus compound *3 | Not used | *1 | TAMANOL E-100 | Formed | 0.0 | 0.0 | 10 |
| Compara Ex. Y-7 | Triphenylphosphine | Not used | *1 | Not used | Formed | 0.0 | 0.0 | 10 |

*1: Methyl methacrylate-2-ethylhexyl acrylate copolymer emulsion (thermoplastic resin: methacrylic acid ester copolymer)
*2: 1,4-cyclohexane dimethanol bis(diphenyl phosphate)
*3: Resorcinol bis [di(2,6-dimethylphenyl) phosphate]
*4: Mass ratio of non-thermofusible material to thermofusible resin (non-thermofusible material/thermofusible material)
*5: Mass ratio of non-thermofusible material to thermofusible material (non-thermofusible material/thermofusible material)

In the heat-sensitive adhesive material with the heat-sensitive tacky layer formed on one surface of the support, on the opposite surface of the support from the surface on which the heat-sensitive tacky layer was formed, various recording layers such as a heat-sensitive recording layer, an inkjet recording layer, a thermal transfer ink-receiving layer and an electrophotographic recording layer can be formed. These recording layers can be formed using, for example, various heat-sensitive adhesive materials of Examples Y-1 to Y-15 and Comparative Examples Y-1 to Y-7 according to the following procedures.

Hereinafter, Examples of heat-sensitive adhesive materials according to the present invention each of which a heat-sensitive recording layer is formed on one surface of a support which is the opposite surface of the support from the surface on which a heat-sensitive tacky layer is formed will be described, however, the present invention is not limited to the disclosed Examples.

Examples Y-22 to Y-42 and Comparative Examples Y-8 to Y-14

-Preparation of Heat-sensitive Adhesive Material for Thermal Recording-

Using the heat-sensitive adhesive materials of Examples Y-1 to Y-21 and Comparative Examples Y-1 to Y-7, a heat-sensitive recording layer was formed on each of the opposite surfaces of the heat-sensitive adhesive materials from the surfaces on which each of the heat-sensitive tacky layers was formed according to the following procedures, to thereby form heat-sensitive adhesive materials for thermal recording of Examples Y-22 to Y-42 and Comparative Examples Y-8 to Y-14.

-Formation of Heat-sensitive Recording Layer-

Hereinafter, preparations of various coat-layer forming liquids or coating solutions to form a heat-sensitive recording layer will be described.

[Intermediate Layer (Heat-insulating Layer) Forming Liquid]

| | |
|---|---|
| Fine hollow particle dispersion (a copolymer resin containing vinylidene chloride/acrylonitrile as the main components, solid content 32%, volume average particle diameter: 3.0 μm; hollow rate: 92%) | 30 parts by mass |
| Styrene/butadiene copolymer latex (glass transition temperature (Tg): +4° C.) | 10 parts by mass |
| Water | 60 parts by mass |

A mixture containing the composition stated above was stirred and dispersed to form an intermediate layer forming liquid.

[Heat-sensitive Recording Layer (Heat-sensitive Chromogenic Layer) Forming Liquid]

<<Leuco Dye Dispersion>>

| | |
|---|---|
| 3-di-n-butylamino-6-methyl-7-anilino fluoran | 20 parts by mass |
| Polyvinyl alcohol (10% by mass aqueous solution) | 10 parts by mass |
| Water | 70 parts by mass |

<<Color-developer Dispersion>>

| | |
|---|---|
| 4-isopropoxy-4'-hydroxydiphenylsulfone | 10 parts by mass |
| Polyvinyl alcohol (10% by mass aqueous solution) | 25 parts by mass |
| Calcium carbonate | 15 parts by mass |
| Water | 50 parts by mass |

Mixtures containing the compositions stated above were respectively dispersed by using a sand mill such that the average particle diameter of the respective components was about 1.5 μm to thereby prepare the above-noted leuco dye dispersion and color-developer dispersion. Subsequently, the leuco dye dispersion and the color-developer dispersion were mixed at a mixture ratio of the leuco dye dispersion:the color-developer dispersion=1:8 (mass ratio) and stirred to thereby prepare a heat-sensitive recording layer forming liquid.

The intermediate layer forming liquid prepared as above was applied over the surface of the support such that the dry mass thereof was 4 g/m², and the applied liquid was dried to form an intermediate layer (heat-insulating layer). Over the surface of the heat-insulating layer, the prepared heat-sensitive recording layer forming liquid was applied, and the applied liquid was dried to form a heat-sensitive recording layer, thereby a paper sheet having one surface coated with the heat-sensitive recording layer liquid was prepared.

[Protective Layer Forming Liquid]
<<Protective Layer Primary Dispersion>>

| | |
|---|---|
| Aluminum hydroxide | 20 parts by mass |
| 10% by mass PVA aqueous solution | 20 parts by mass |
| Water | 40 parts by mass |

A mixture for a protective layer primary dispersion containing the composition stated above was pulverized and dispersed by using a vertical sand mill so as to have an average particle diameter of 1 µm or less, thereby a protective layer primary dispersion was obtained.

Next, a protective layer forming liquid containing the following composition was prepared using the protective layer primary dispersion.
<<Protective Layer Forming Liquid>>

| | |
|---|---|
| Prepared protective layer primary dispersion | 10 parts by mass |
| 10% mass PVA aqueous solution | 20 parts by mass |
| 12.5% by mass epichlorohydrin aqueous solution | 5 parts by mass |
| 30% by mass zinc stearate dispersion | 2 parts by mass |

A protective layer forming liquid containing the composition stated above was prepared, and the protective layer forming liquid was applied over the surface of the heat-sensitive recording layer such that the dry adhesion mass thereof was 3 g/m$^2$, the applied protective layer forming liquid was dried, and the surface thereof was further subjected to a super calender treatment so as to have an Oken smoothness of 2,000 seconds, thereby heat-sensitive adhesive materials of Examples Y-22 to Y-42 and Comparative Examples Y-8 to Y-13 were prepared.

Subsequently, the thus obtained respective heat-sensitive adhesive materials of Examples Y-22 to Y-42 and Comparative Examples Y-8 to Y-13 having one of the heat-sensitive recording layers of Examples Y-16 to Y-30 and Comparative Examples Y-8 to Y-14 were evaluated as to adhesion property and blocking resistance according to the following procedures. Table 3Y shows the evaluation results.
<Evaluation of Adhesion Property>

The obtained respective heat-sensitive adhesive materials were cut in a rectangle (40 mm×150 mm) and each of the cut materials was thermally activated through the use of a heat-sensitive printing apparatus (TH-PMD, manufactured by Ohkura Electric Co., Ltd.) under the conditions of each thermal head energy: 0.40 mJ/dot and 0.50 mJ/dot; printing speed: 4 ms/line; and platen pressure: 6 kgf/line. Next, the each of the thermally activated heat-sensitive adhesive materials was affixed to a corrugated board which was left intact for 15 hours under respective environmental conditions, in the longitudinal direction thereof using a rubber roller under a pressure of 2 kg. Then, 15 hours later, the heat-sensitive adhesive materials were respectively peeled off from the corrugated board under the conditions of a peeling angle of 180 degrees and a peeling rate of 300 mm/min.

The adhesive strength at that time was measured by means of a forth gauge (MODEL DPS-5, manufactured by IMADA Co.), and the measured data was read at 0.1-second intervals to express the adhesive strength by an averaged numerical value. Note that the unit of the adhesive strength is gf/40 mm. The evaluation test was carried out under room temperature (22° C.) and low temperature (0° C.) environments.

Ranks of adhesive strength are as follows.
[Rank of Adhesive Strength]
A: 1,000 gf/40 mm or more
B: 999 gf/40 mm to 500 gf/40 mm
C: 499 gf/40 mm to 100 gf/40 mm
D: less than 100 gf/40 mm
<Evaluation of Blocking Resistance>

Each surface of the heat-sensitive tacky layers in the thus obtained heat-sensitive adhesive materials was made contact with the opposite surface therefrom, i.e., the surface on which each of the heat-sensitive recording layers was formed, and the heat-sensitive adhesive materials were left intact under application of a pressure of 200 gf/cm$^2$ at a temperature of 60° C. in dry atmosphere for 15 hours. Thereafter, they were left intact at room temperature and then each of the heat-sensitive adhesive materials was peeled off from the corrugated board. The blocking resistance at that time was evaluated based on the evaluation criteria shown in Table 2Y. It should be noted that a rank of 7 or more is at a practically usable level.

TABLE 2Y

| Evaluation | Rank | Resistance to peeling | Peel-off noise level | Dot-like transcription | Exfoliated level |
|---|---|---|---|---|---|
| A | 10 | its own weight | | | |
|  | 9 | Slightly gave resistance | No noise | | |
| B | 8 | Gave resistance | Slightly heard | | |
|  | 7 | | Noise caused | | |
| C | 6 | | | Partly found | |
|  | 5 | | | 30% to 50% | |
|  | 4 | | | 50% to the entire surface | |
| D | 3 | | | | Partly found |
|  | 2 | | | | 30% to 50% |
|  | 1 | | | | 50% to the entire surface |

TABLE 3Y

| Heat-sensitive adhesive material | | Adhesion property to corrugated board (evaluated under adhesive strength gf/40 mm) | | | | Blocking resistance Rank/ Evaluation |
|---|---|---|---|---|---|---|
| | | 0° C. | | 22° C. | | |
| Ex. Y-22 | Ex. Y-1 | 610 | B | 480 | C | 7/B |
| Ex. Y-23 | Ex. Y-2 | 800 | B | 660 | B | 6/C |
| Ex. Y-24 | Ex. Y-3 | 920 | B | 700 | B | 8/B |
| Ex. Y-25 | Ex. Y-4 | 1,020 | A | 800 | B | 8/B |
| Ex. Y-26 | Ex. Y-5 | 1,260 | A | 980 | B | 7/B |
| Ex. Y-27 | Ex. Y-6 | 1,030 | A | 830 | B | 8/B |
| Ex. Y-28 | Ex. Y-7 | 1,200 | A | 1,010 | A | 6/C |
| Ex. Y-29 | Ex. Y-8 | 630 | B | 500 | B | 9/A |
| Ex. Y-30 | Ex. Y-9 | 820 | B | 600 | B | 7/B |
| Ex. Y-31 | Ex. Y-10 | 1,450 | A | 1,100 | A | 9/A |
| Ex. Y-32 | Ex. Y-11 | 830 | B | 620 | B | 7/B |
| Ex. Y-33 | Ex. Y-12 | 1,320 | A | 1,030 | A | 9/A |
| Ex. Y-34 | Ex. Y-13 | 980 | A | 965 | B | 9/A |
| Ex. Y-35 | Ex. Y-14 | 950 | A | 930 | B | 9/A |
| Ex. Y-36 | Ex. Y-15 | 720 | B | 640 | B | 9/A |
| Ex. Y-37 | Ex. Y-16 | 650 | B | 550 | B | 8/B |
| Ex. Y-38 | Ex. Y-17 | 900 | B | 750 | B | 9/A |
| Ex. Y-39 | Ex. Y-18 | 890 | B | 790 | B | 10/A |
| Ex. Y-40 | Ex. Y-19 | 1,360 | A | 610 | B | 7/B |
| Ex. Y-41 | Ex. Y-20 | 780 | B | 960 | B | 8/B |
| Ex. Y-42 | Ex. Y-21 | 950 | B | 590 | B | 8/B |

TABLE 3Y-continued

| Heat-sensitive adhesive material | | Adhesion property to corrugated board (evaluated under adhesive strength gf/40 mm) | | | | Blocking resistance Rank/ Evaluation |
|---|---|---|---|---|---|---|
| | | 0° C. | | 22° C. | | |
| Compara. Ex. Y-8 | Compara. Ex. Y-1 | 890 | B | 710 | B | 1/D |
| Compara. Ex. Y-9 | Compara. Ex. Y-2 | 30 | D | 350 | C | 10/A |
| Compara. Ex. Y-10 | Compara. Ex. Y-3 | 50 | D | 490 | C | 8/B |
| Compara. Ex. Y-11 | Compara. Ex. Y-4 | 20 | D | 430 | C | 8/B |
| Compara. Ex. Y-12 | Compara. Ex. Y-5 | 180 | C | 560 | B | 5/C |
| Compara. Ex. Y-13 | Compara. Ex. Y-6 | 150 | C | 550 | B | 5/C |
| Compara. Ex. Y-14 | Compara. Ex. Y-7 | 430 | C | 750 | B | 1/D |

The evaluation results shown in Table 3Y demonstrated that the heat-sensitive adhesive materials of Examples Y-22 to Y-42 were excellent in surface tackiness to corrugated boards in low temperature (0° C.) to room temperature (22° C.) environments and were also excellent in blocking resistance, as compared to the heat-sensitive adhesive materials of Comparative Examples Y-8 to Y-14.

Next, respective heat-sensitive adhesive materials of Examples Z-1 to Z-15 and Comparative Examples Z-1 to Z-7 were prepared according to the following procedures.

Preparation Example Z-1-1

-Preparation of Under Layer Coating Solution [A-1 Liquid]-

A mixture containing the following composition was stirred and dispersed to prepare an under layer coating solution [A-1 liquid].

| | |
|---|---|
| Spherical hollow plastic particle (a copolymer resin containing vinylidene chloride-acrylonitrile as the main components; solid content: 32% by mass, average particle diameter: 3.0 μm; hollow rate: 92%) | 15 parts by mass |
| Styrene-butadiene copolymer latex (glass transition temperature (Tg): +4° C.) | 10 parts by mass |
| Water | 60 parts by mass |

Preparation Example Z-1-2

-Under layer Coating Solution [A-2 Liquid]-

A mixture containing the following composition was stirred and dispersed to prepare an under layer coating solution [A-2 liquid].

| | |
|---|---|
| Spherical hollow plastic particle (a copolymer resin containing vinylidene chloride-acrylonitrile as the main components; solid content: 32% by mass, average particle diameter: 3.0 μm; hollow rate: 92%) | 15 parts by mass |
| Carboxy-modified styrene-butadiene copolymer latex (glass transition temperature (Tg): −34° C.) | 10 parts by mass |
| Water | 60 parts by mass |

Preparation Example Z-1-3

-Preparation of Under Layer Coating Solution [A-3 Liquid]-

A mixture containing the following composition was stirred and dispersed to prepare an under layer coating solution [A-3 liquid].

| | |
|---|---|
| Spherical hollow plastic particle (a copolymer resin containing vinylidene chloride-acrylonitrile as the main components; solid content: 32% by mass, average particle diameter: 3.0 μm; hollow rate: 92%) | 15 parts by mass |
| Carboxy-modified styrene-butadiene copolymer latex (glass transition temperature (Tg): 25° C.) | 10 parts by mass |
| Water | 60 parts by mass |

Preparation Example Z-1-4

-Preparation of Under Layer Coating Solution [A-4 Liquid]-

A mixture containing the following composition was stirred and dispersed to prepare an under layer coating solution [A-4 liquid].

| | |
|---|---|
| Spherical hollow plastic particle (a copolymer resin containing vinylidene chloride-acrylonitrile as the main components; solid content: 32% by mass, average particle diameter: 3.0 μm; hollow rate: 92%) | 15 parts by mass |
| Carboxy-modified styrene-butadiene copolymer latex (glass transition temperature (Tg): 35° C.) | 10 parts by mass |
| Water | 60 parts by mass |

Preparation Example Z-1-5

-Preparation of Under Layer Coating Solution [A-5 Liquid]-

A mixture containing the following composition was stirred and dispersed to prepare an under layer coating solution [A-5 liquid].

| | |
|---|---|
| Spherical hollow plastic particle (a copolymer resin containing vinylidene chloride-acrylonitrile as the main components; solid content: 32% by mass, average particle diameter: 3.0 μm; hollow rate: 92%) | 15 parts by mass |
| Carboxy-modified styrene-butadiene copolymer latex (glass transition temperature (Tg): −42° C.) | 10 parts by mass |
| Water | 60 parts by mass |

Preparation Example Z-1-6

-Preparation of Under Layer Coating Solution [A-6 Liquid]-

A mixture containing the following composition was stirred and dispersed to prepare an under layer coating solution [A-6 liquid].

| | |
|---|---|
| Spherical hollow plastic particle (an acrylonitrile-vinylidene chloride-methyl methacrylate copolymer; solid content: 41% by mass, volume average particle diameter: 3.2 μm; hollow rate: 70%) | 11 parts by mass |
| Carboxy-modified styrene-butadiene copolymer latex (glass transition temperature (Tg): 4° C.) | 10 parts by mass |
| Water | 60 parts by mass |

Preparation Example Z-1-7

-Preparation of Under Layer Coating Solution [A-7 Liquid]-
A mixture containing the following composition was stirred and dispersed to prepare an under layer coating solution [A-7 liquid].

| | |
|---|---|
| Spherical hollow plastic particle (an acrylonitrile-vinylidene chloride-methyl methacrylate copolymer; solid content: 40% by mass, volume average particle diameter: 1.5 μm; hollow rate: 50%) | 15 parts by mass |
| Carboxy-modified styrene-butadiene copolymer latex (glass transition temperature (Tg): 4° C.) | 10 parts by mass |
| Water | 60 parts by mass |

Preparation Example Z-1-8

-Preparation of Under Layer Coating Solution [A-8 Liquid]-
A mixture containing the following composition was stirred and dispersed to prepare an under layer coating solution [A-8 liquid].

| | |
|---|---|
| Spherical hollow plastic particle (an acrylonitrile-methacrylonitrile-isobonyl methacrylate copolymer; solid content: 33% by mass, volume average particle diameter: 6.0 μm; hollow rate: 91%) | 13.7 parts by mass |
| Carboxy-modified styrene-butadiene copolymer latex (glass transition temperature (Tg): 4° C.) | 10 parts by mass |
| Water | 60 parts by mass |

Preparation Example Z-1-9

-Preparation of Under Layer Coating Solution [A-9 Liquid]-
A mixture containing the following composition was stirred and dispersed to prepare an under layer coating solution [A-9 liquid].

| | |
|---|---|
| Spherical hollow plastic particle (a copolymer resin containing vinylidene chloride-acrylonitrile as the main components; solid content: 32% by mass, average particle diameter: 3.0 μm; hollow rate: 92%) | 3.1 parts by mass |
| Styrene-butadiene copolymer latex (glass transition temperature (Tg): +4° C.) | 11 parts by mass |
| Water | 60 parts by mass |

Preparation Example Z-1-10

-Preparation of Under Layer Coating Solution [A-10 Liquid]-
A mixture containing the following composition was stirred and dispersed to prepare an under layer coating solution [A-10 liquid].

| | |
|---|---|
| Spherical hollow plastic particle (a copolymer resin containing vinylidene chloride-acrylonitrile as the main components; solid content: 32% by mass, average particle diameter: 3.0 μm; hollow rate: 92%) | 34.3 parts by mass |
| Styrene-butadiene copolymer latex (glass transition temperature (Tg): +4° C.) | 10 parts by mass |
| Water | 60 parts by mass |

Preparation Example Z-1-11

-Preparation of Under Layer Coating Solution [A-11 Liquid]-
A mixture containing the following composition was stirred and dispersed to prepare an under layer coating solution [A-11 liquid].

| | |
|---|---|
| Spherical hollow plastic particle (a copolymer resin containing vinylidene chloride-acrylonitrile as the main components; solid content: 32% by mass, average particle diameter: 3.0 μm; hollow rate: 92%) | 34.3 parts by mass |
| 2-ethylhexylacrylate-methyl methacrylate-styrene copolymer (glass transition temperature (Tg): −65° C., solid content: 55.4% by mass) | 16.3 parts by mass |
| Water | 60 parts by mass |

Preparation Example Z-2-1

-Preparation of Thermofusible Material Dispersion [B-1 Liquid]-
A mixture containing 30.0 parts by mass of triphenyl phosphine, 15 parts by mass of polyvinyl alcohol (trade name: GOHSERAN L-3266, manufactured by Nippon Synthetic Chemical Industry Co., Ltd.; 10% by mass aqueous solution), 1.5 parts by mass of a surfactant (trade name: NEWCOL 290M manufactured by Nippon Nyukazai Co., Ltd.; 10% by mass aqueous solution) and 53.5 parts by mass of water was dispersed using a sand mill so as to have an average particle diameter of 1.0 μm, thereby a thermofusible material dispersion [B-1 liquid] was obtained.

Preparation Example Z-2-2

-Preparation of Thermofusible Material Dispersion [C-1 Liquid]-
A mixture containing 30.0 parts by mass of 2-(2'-hydroxy-3'-t-butyl-5'-methylphenyl)-5-chlorobenzotriazole (melting point (mp): 138° C.), 15 parts by mass of polyvinyl alcohol (trade name: GOHSERAN L-3266, manufactured by Nippon Synthetic Chemical Industry Co., Ltd.; 10% by mass aqueous solution), 1.5 parts by mass of a surfactant (trade name: NEWCOL 290M manufactured by Nippon Nyukazai Co., Ltd.; 10% by mass aqueous solution) and 53.5 parts by mass of water was dispersed using a sand mill so as to have an average particle diameter of 1.0 μm, thereby a thermofusible material dispersion [C-1 liquid] was prepared.

Preparation Example Z-3-1

-Preparation of Heat-sensitive Pressure-sensitive Adhesive Coating Solution [D-1 Liquid]-
A mixture containing 9.2 parts by mass of an acrylic acid ester copolymer aqueous emulsion (POLYZOL PSA SE-4040, manufactured by Showa High Polymer Co., Ltd.; glass transition temperature (Tg): −65° C., solid content: 55% by mass), 6.6 parts by mass of an adhesion imparting agent (E-100, manufactured by Arakawa Chemical Industries, Ltd.; containing terpene phenol as the main component; solid content: 50% by mass; softening point: 150° C.), 63.2 parts by mass of the thermofusible material dispersion [B-1 liquid] and 21.1 parts by mass of the thermofusible material dispersion [C-1 liquid] was uniformly mixed to prepare a heat-sensitive pressure-sensitive adhesive coating solution [D-1 liquid].

Preparation Example Z-3-2

-Preparation of Heat-sensitive Pressure-sensitive Adhesive Coating Solution [D-2 Liquid]-

A mixture containing 9.2 parts by mass of an acrylic acid ester copolymer aqueous emulsion (POLYZOL PSA SE-4040, manufactured by Showa High Polymer Co., Ltd.; glass transition temperature (Tg): −65° C., solid content: 55% by mass), 6.6 parts by mass of an adhesion imparting agent (E-100, manufactured by Arakawa Chemical Industries, Ltd.; containing terpene phenol as the main component; solid content: 50% by mass; softening point: 150° C.), 42.1 parts by mass of the thermofusible material dispersion [B-1 liquid] and 42.1 parts by mass of the thermofusible material dispersion [C-1 liquid] was uniformly mixed to prepare a heat-sensitive pressure-sensitive adhesive coating solution [D-2 liquid].

Preparation Example Z-3-3

-Preparation of Heat-sensitive Pressure-sensitive Adhesive Coating Solution [D-3 Liquid]-

A mixture containing 9.2 parts by mass of an acrylic acid ester copolymer aqueous emulsion (POLYZOL PSA SE-4040, manufactured by Showa High Polymer Co., Ltd.; glass transition temperature (Tg): −65° C., solid content: 55% by mass), 6.6 parts by mass of an adhesion imparting agent (E-100, manufactured by Arakawa Chemical Industries, Ltd.; containing terpene phenol as the main component; solid content: 50% by mass; softening point: 150° C.), 40 parts by mass of the thermofusible material dispersion [B-1 liquid] and 44.1 parts by mass of the thermofusible material dispersion [C-1 liquid] was uniformly mixed to prepare a heat-sensitive pressure-sensitive adhesive coating solution [D-3 liquid].

Preparation Example Z-3-4

-Preparation of Heat-sensitive Pressure-sensitive Adhesive Coating Solution [D-4 Liquid]-

A mixture containing 9.2 parts by mass of an acrylic acid ester copolymer aqueous emulsion (POLYZOL PSA SE-4040, manufactured by Showa High Polymer Co., Ltd.; glass transition temperature (Tg): −65° C., solid content: 55% by mass), 6.6 parts by mass of an adhesion imparting agent (E-100, manufactured by Arakawa Chemical Industries, Ltd.; containing terpene phenol as the main component; solid content: 50% by mass; softening point: 150° C.), 65 parts by mass of the thermofusible material dispersion [B-1 liquid] and 19.2 parts by mass of the thermofusible material dispersion [C-1 liquid] was uniformly mixed to prepare a heat-sensitive pressure-sensitive adhesive coating solution [D-4 liquid].

Preparation Example Z-3-5

-Preparation of Heat-sensitive Pressure-sensitive Adhesive Coating Solution [D-5 Liquid]-

A mixture containing 9.2 parts by mass of an acrylic acid ester copolymer aqueous emulsion (POLYZOL PSA SE-4040, manufactured by Showa High Polymer Co., Ltd.; glass transition temperature (Tg): −65° C., solid content: 55% by mass), 6.6 parts by mass of an adhesion imparting agent (E-100, manufactured by Arakawa Chemical Industries, Ltd.; containing terpene phenol as the main component; solid content: 50% by mass; softening point: 150° C.) and 84.2 parts by mass of the thermofusible material dispersion [B-1 liquid] was uniformly mixed to prepare a heat-sensitive pressure-sensitive adhesive coating solution [D-5 liquid].

Preparation Example Z-3-6

-Preparation of Heat-sensitive Pressure-sensitive Adhesive Coating Solution [D-6 Liquid]-

A mixture containing 9.2 parts by mass of an acrylic acid ester copolymer aqueous emulsion (POLYZOL PSA SE-4040, manufactured by Showa High Polymer Co., Ltd.; glass transition temperature (Tg): −65° C., solid content: 55% by mass), 6.6 parts by mass of an adhesion imparting agent (E-100, manufactured by Arakawa Chemical Industries, Ltd.; containing terpene phenol as the main component; solid content: 50% by mass; softening point: 150° C.) and 84.2 parts by mass of the thermofusible material dispersion [C-1 liquid] was uniformly mixed to prepare a heat-sensitive pressure-sensitive adhesive coating solution [D-6 liquid].

Example Z-1

-Preparation of Heat-sensitive Adhesive Material-

The under layer coating solution [A-1] was applied over a surface of a single-sided coat paper of an average basis weight of 80 g/m² (OK ADNIS ROUGH, manufactured by OJI Paper Co.), serving as a support, i.e., over the surface having no coat layer thereon, so as to have a dry adhesion amount of 5 g/m², and the applied A-1 coating solution was dried to thereby form an under layer.

Over the surface of the thus obtained under layer, the heat-sensitive pressure-sensitive adhesive coating solution [D-1] was applied so as to have a dry adhesion amount of 10 g/m² and the applied D-1 coating solution was dried to form a heat-sensitive tacky layer, thereby a heat-sensitive adhesive material of Example Z-1 was prepared.

Example Z-2

-Preparation of Heat-sensitive Adhesive Material-

A heat-sensitive adhesive material of Example Z-2 was prepared in the same manner as in Example Z-1, except that the under layer coating solution [A-2] was applied in place of the [A-1] coating solution so as to have a dry adhesion amount of 5 g/m², and the applied A-2 coating solution was dried to thereby prepare an under layer.

Example Z-3

-Preparation of Heat-sensitive Adhesive Material-

A heat-sensitive adhesive material of Example Z-3 was prepared in the same manner as in Example Z-1, except that the under layer coating solution [A-3] was applied in place of the [A-1] so as to have a dry adhesion amount of 5 g/m², and the applied A-3 coating solution was dried to thereby prepare an under layer.

Example Z-4

-Preparation of Heat-sensitive Adhesive Material-

A heat-sensitive adhesive material of Example Z-4 was prepared in the same manner as in Example Z-1, except that the under layer coating solution [A-6] was applied in place of the [A-1] so as to have a dry adhesion amount of 5 g/m², and the applied A-6 coating solution was dried to thereby prepare an under layer.

Example Z-5

-Preparation of Heat-sensitive Adhesive Material-

A heat-sensitive adhesive material of Example Z-5 was prepared in the same manner as in Example Z-1, except that the under layer coating solution [A-7] was applied in place of the [A-1] so as to have a dry adhesion amount of 5 g/m², and the applied A-7 coating solution was dried to thereby prepare an under layer.

Example Z-6

-Preparation of Heat-sensitive Adhesive Material-

A heat-sensitive adhesive material of Example Z-6 was prepared in the same manner as in Example Z-1, except that the under layer coating solution [A-8] was applied in place of the [A-1] so as to have a dry adhesion amount of 5 g/m², and the applied A-8 coating solution was dried to thereby prepare an under layer.

Example Z-7

-Preparation of Heat-sensitive Adhesive Material-

A heat-sensitive adhesive material of Example Z-7 was prepared in the same manner as in Example Z-1, except that the under layer coating solution [A-9] was applied in place of the [A-1] so as to have a dry adhesion amount of 5 g/m², and the applied A-9 coating solution was dried to thereby prepare an under layer.

Example Z-8

-Preparation of Heat-sensitive Adhesive Material-

A heat-sensitive adhesive material of Example Z-8 was prepared in the same manner as in Example Z-1, except that the under layer coating solution [A-10] was applied in place of the [A-1] so as to have a dry adhesion amount of 5 g/m², and the applied A-10 coating solution was dried to thereby prepare an under layer.

Example Z-9

-Preparation of Heat-sensitive Adhesive Material-

A heat-sensitive adhesive material of Example Z-9 was prepared in the same manner as in Example Z-1, except that the heat-sensitive pressure-sensitive adhesive coating solution [D-1] was applied so as to have a dry adhesion amount of 8 g/m² and the applied D-1 coating solution was dried to thereby prepare a heat-sensitive tacky layer.

Example Z-10

-Preparation of Heat-sensitive Adhesive Material-

A heat-sensitive adhesive material of Example Z-10 was prepared in the same manner as in Example Z-1, except that the heat-sensitive pressure-sensitive adhesive coating solution [D-1] was applied so as to have a dry adhesion amount of 20 g/m² and the applied D-1 coating solution was dried to thereby prepare a heat-sensitive tacky layer.

Example Z-11

-Preparation of Heat-sensitive Adhesive Material-

A heat-sensitive adhesive material of Example Z-11 was prepared in the same manner as in Example Z-1, except that the heat-sensitive pressure-sensitive adhesive coating solution [D-1] was applied so as to have a dry adhesion amount of 25 g/m² and the applied D-1 coating solution was dried to thereby prepare a heat-sensitive tacky layer.

Example Z-12

-Preparation of Heat-sensitive Adhesive Material-

A heat-sensitive adhesive material of Example Z-12 was prepared in the same manner as in Example Z-1, except that the heat-sensitive pressure-sensitive adhesive coating solution [D-2] was used in place of the heat-sensitive pressure-sensitive adhesive coating solution [D-1].

Example Z-13

-Preparation of Heat-sensitive Adhesive Material-

A heat-sensitive adhesive material of Example Z-13 was prepared in the same manner as in Example Z-1, except that the heat-sensitive pressure-sensitive adhesive coating solution [D-3] was used in place of the heat-sensitive pressure-sensitive adhesive coating solution [D-1].

Example Z-14

-Preparation of Heat-sensitive Adhesive Material-

A heat-sensitive adhesive material of Example Z-14 was prepared in the same manner as in Example Z-1, except that the heat-sensitive pressure-sensitive adhesive coating solution [D-4] was used in place of the heat-sensitive pressure-sensitive adhesive coating solution [D-1].

Example Z-15

<Formation of Heat-sensitive Recording Layer>
-Preparation of Non-Foamable Heat-Insulating Layer Forming Coating Solution [E Liquid]-

A mixture containing 30 parts by mass of a fine hollow particle dispersion (a copolymer resin containing vinylidene-acrylonitrile as the main components; solid content: 32% by mass; average particle diameter: 3.6 μm; hollow rate: 92%), 10 parts by mass of a styrene-butadiene copolymer latex (glass transition temperature (Tg): +4° C.), 0.1 parts by mass of a surfactant (DAPRO W-77, manufactured by Element is Japan K.K.) and 60 parts by mass of water was stirred and dispersed to thereby prepare a non-foamable heat-insulating layer forming coating solution [E liquid].

-Preparation of Color-Coupler Dispersion [F Liquid]-

A mixture containing 20 parts by mass of 3-di-n-butylamino-6-methyl-7-anilino fluoran, 10 parts by mass of polyvinyl alcohol (10% by mass aqueous solution) and 70 parts by mass of water was stirred and dispersed to prepare a color-coupler dispersion [F liquid].

-Preparation of Color Developer Dispersion [G Liquid]-

A mixture containing 10 parts by mass of 4-isopropoxy-4'-hydroxydiphenylsulfone, 25 parts by mass of polyvinyl alcohol (10% by mass aqueous solution), 15 parts by mass of calcium carbonate and 50 parts by mass of water was dispersed by a sand mill such that the average particle diameter of the respective components was 1.5 μm to thereby prepare a color developer dispersion [G liquid].

Next, the color-coupler dispersion [F liquid] and the color developer dispersion [G liquid] were mixed at a mixture ratio of [F liquid]:[G liquid]=1.8 (mass ratio) and stirred to prepare a heat-sensitive chromogenic layer coating solution [H liquid].

Next, the non-foamable heat-insulating layer forming coating solution [E liquid] was applied over a surface of a single-sided coat paper of an average basis weight of 80 g/m² (OK ADNIS ROUGH, manufactured by OJI Paper Co.) so as to have a dry mass of 4 g/m², and the applied E liquid was dried to thereby prepare a non-foamable heat-insulating layer.

Next, over the surface of the non-foamable heat-insulating layer, the color-coupler dispersion [F liquid] was applied so as to have a dry mass of 5 g/m² and the applied F liquid was dried to form a heat-sensitive recording layer. Thereafter, the surface of the heat-sensitive recording layer was subjected to a super-calender treatment so as to have an Oken smoothness of 2,000 seconds, thereby a heat-sensitive recording paper having a heat-sensitive recording layer was prepared.

Next, over the support surface of the thus obtained heat-sensitive recording paper on which the heat-sensitive recording layer was not formed, the under layer coating solution [A-1] was applied so as to have a dry adhesion amount of 5 g/m² and the applied A-1 coating solution was dried to form an under layer. Over the surface of the under layer, the heat-sensitive pressure-sensitive coating solution [D-1] was applied so as to have a dry adhesion amount of 10 g/m² and the applied D-1 coating solution was dried to form a heat-sensitive tacky layer, thereby a heat-sensitive adhesive material of Example Z-15 was prepared.

Comparative Example Z-1

-Preparation of Heat-sensitive Adhesive Material-

The under layer coating solution [A-11] was applied over a surface of a single-sided coat paper of an average basis weight of 80 g/m² (OK ADNIS ROUGH, manufactured by OJI Paper Co.) serving as a support, on which no coat layer was formed, so as to have a dry adhesion amount of 5 g/m², and the applied A-11 coating solution was dried to prepare an under layer.

Over the surface of the under layer, the heat-sensitive pressure-sensitive adhesive coating solution [D-5] was applied so as to have a dry adhesion amount of 10 g/m² and the applied D-5 coating solution was dried to form a heat-sensitive tacky layer, thereby a heat-sensitive adhesive material of Comparative Example Z-1 was prepared.

Comparative Example Z-2

-Preparation of Heat-sensitive Adhesive Material-

The under layer coating solution [A-11] was applied over a surface of a single-sided coat paper of an average basis weight of 80 g/m² (OK ADNIS ROUGH, manufactured by OJI Paper Co.) serving as a support, on which no coat layer was formed, so as to have a dry adhesion amount of 5 g/m², and the applied A-11 coating solution was dried to prepare an under layer. Over the surface of the under layer, the heat-sensitive pressure-sensitive adhesive coating solution [D-6] was applied so as to have a dry adhesion amount of 10 g/m² and the applied D-6 coating solution was dried to form a heat-sensitive tacky layer, thereby a heat-sensitive adhesive material of Comparative Example Z-2 was prepared.

Comparative Example Z-3

-Preparation of Heat-sensitive Adhesive Material-

A heat-sensitive adhesive material of Comparative Example Z-3 was prepared in the same manner as in Example Z-1, except that the under layer coating solution [A-4] was applied in place of the [A-1] coating solution so as to have a dry adhesion amount of 5 g/m² and the applied A-4 coating solution was dried to form an under layer.

Comparative Example Z-4

-Preparation of Heat-sensitive Adhesive Material-

A heat-sensitive adhesive material of Comparative Example Z-4 was prepared in the same manner as in Example Z-1, except that the under layer coating solution [A-5] was applied in place of the [A-1] coating solution so as to have a dry adhesion amount of 5 g/m² and the applied A-5 coating solution was dried to form an under layer.

Comparative Example Z-5

-Preparation of Heat-sensitive Adhesive Material-

A heat-sensitive adhesive material of Comparative Example Z-5 was prepared in the same manner as in Example Z-1, except that no under layer was formed.

Comparative Example Z-6

-Preparation of Heat-sensitive Adhesive Material-

A heat-sensitive adhesive material of Comparative Example Z-6 was prepared in the same manner as in Example Z-1, except that the under layer coating solution [A-11] was used in place of the under layer coating solution [A-1].

Comparative Example Z-7

-Preparation of Heat-sensitive Adhesive Material-

A heat-sensitive adhesive material of Comparative Example Z-7 was prepared in the same manner as in Example Z-1, except that the heat-sensitive pressure-sensitive adhesive coating solution [D-6] was used in place of the heat-sensitive pressure-sensitive adhesive coating solution [D-1].

Subsequently, the thus obtained heat-sensitive adhesive materials of Example Z-1 to Z-15 and Comparative Examples Z-1 to Z-7 were evaluated as to adhesive strength and blocking property according to the following procedures. Table 2Z shows the evaluation results.

<Measurement of Adhesive Strength>

The obtained respective heat-sensitive adhesive materials were cut in a rectangle (25 mm×150 mm) and each of the cut materials was thermally activated through the use of a heat-sensitive printing apparatus (TH-PMD, manufactured by Ohkura Electric Co., Ltd.) under the conditions of thermal head energy: 0.50 mJ/dot; printing speed: 4 ms/line; and platen pressure: 6 kgf/line. Next, the each of the thermally activated heat-sensitive adhesive materials was affixed to an adherend (corrugated board), in the longitudinal direction thereof using a rubber roller under a pressure of 2 kg. One day later, the heat-sensitive adhesive materials were respectively peeled off from the corrugated board under the conditions of a peeling angle of 180 degrees and a peeling rate of 300 mm/min. The adhesive strength at that time was measured by means of a forth gauge (MODEL DPS-5, manufactured by IMADA Co.), and the measured data was read at 0.1-second intervals to express the adhesive strength by an averaged numerical value. Note that the unit of the adhesive strength is gf/25 mm. The evaluation test was carried out under low temperature (0° C.) and normal temperature/humidity (23° C., 65% RH) environments.

[Evaluation Criteria of Adhesive Strength to Corrugated Board]
A: 700 gf/25 mm or more
B: 500 gf/25 mm or more to less than 700 gf/25 mm
C: 300 gf/25 mm or more to less than 500 gf/25 mm
D: less than 300 gf/25 mm <Evaluation of Blocking Resistance>

Each surface of the heat-sensitive tacky layers in the thus obtained heat-sensitive adhesive materials was made contact with the opposite surface therefrom, i.e., the surface on which each of the heat-sensitive recording layers was formed, and the heat-sensitive adhesive materials were left intact under application of a pressure of 200 gf/cm$^2$ and a temperature of 50° C. in dry atmosphere for 24 hours. Thereafter, they were left intact at room temperature and then each of the heat-sensitive adhesive materials was peeled off from the corrugated board. The blocking resistance at that time was evaluated based on the ranks and evaluation criteria shown in Table 1Z.

TABLE 1Z

| Evaluation | Rank | Resistance to peeling | Peel-off noise level | Dot-like transcription | Exfoliated level |
|---|---|---|---|---|---|
| A | 10 | its own weight | | | |
|   | 9 | Slightly gave resistance | No noise | | |
| B | 8 | Gave resistance | Slightly heard | | |
|   | 7 | | Noise caused | | |
| C | 6 | | | Partly found | |
|   | 5 | | | 30% to 50% | |
|   | 4 | | | 50% to the entire surface | |
| D | 3 | | | | Partly found |
|   | 2 | | | | 30% to 50% |
|   | 1 | | | | 50% to the entire surface |

[Evaluation Criteria]
A: Rank at 10 to 9
B: Rank at 8 to 7
C: Rank at 6 to 4
D: Rank at 3 or lower

TABLE 2Z

| | Adhesive Strength | | | | Blocking Resistance | |
| | 0° C. | | 23° C. | | 50° C. | |
| | 1-day later | Evaluation | 1-day later | Evaluation | Rank | Evaluation |
|---|---|---|---|---|---|---|
| Ex. Z-1 | 1,615 | A | 1,057 | A | 8 | B |
| Ex. Z-2 | 2,337 | A | 921 | A | 8 | B |
| Ex. Z-3 | 633 | B | 510 | B | 9 | A |
| Ex. Z-4 | 1,337 | A | 721 | A | 8 | B |
| Ex. Z-5 | 650 | B | 501 | B | 8 | B |
| Ex. Z-6 | 1,635 | A | 821 | A | 8 | B |
| Ex. Z-7 | 780 | A | 512 | B | 7 | C |
| Ex. Z-8 | 550 | B | 502 | B | 8 | B |
| Ex. Z-9 | 655 | B | 503 | B | 9 | A |
| Ex. Z-10 | 2,557 | A | 1,500 | A | 8 | B |
| Ex. Z-11 | 632 | B | 512 | B | 8 | B |
| Ex. Z-12 | 505 | B | 810 | A | 9 | A |
| Ex. Z-13 | 302 | C | 1,010 | A | 9 | A |
| Ex. Z-14 | 2,800 | A | 821 | A | 6 | C |
| Ex. Z-15 | 1,515 | A | 1,022 | A | 8 | B |
| Compara. Ex. Z-1 | 120 | D | 80 | D | 1 | D |
| Compara. Ex. Z-2 | 10 | D | 503 | B | 8 | B |
| Compara. Ex. Z-3 | 4 | D | 40 | D | 10 | A |
| Compara. Ex. Z-4 | 2,550 | A | 1,350 | A | 5 | C |
| Compara. Ex. Z-5 | 150 | D | 115 | A | 8 | B |
| Compara. Ex. Z-6 | 1,825 | A | 728 | A | 3 | D |
| Compara. Ex. Z-7 | 0 | D | 803 | A | 9 | B |

The evaluation results shown in Table 2Z demonstrated that the heat-sensitive adhesive materials of Examples Z-1 to Z-15 respectively had a strong adhesive strength to corrugated boards under low temperature (0° C.) to room temperature (23° C.) environments and had less decrease in adhesive strength with a lapse of time, were respectively enabled to be thermally activated with low energy applied by a thermal head or the like and were also excellent in blocking resistance, as compared to the heat-sensitive adhesive materials of Comparative Examples Z-1 to Z-7.

For the heat-sensitive adhesive material of Example Z-7, the blocking resistance was slightly reduced because the content of the thermoplastic resin was high as compared to the content of the hollow filler in the under layer.

For the heat-sensitive adhesive material of Example Z-8, the binding strength of the under layer was weakened because the content of the hollow filler was high as compared to the content of the thermoplastic resin in the under layer, and for this reason, the adhesive strength of the heat-sensitive adhesive material was slightly reduced under low temperature and room temperature environments.

For the heat-sensitive adhesive material of Example Z-9, the adhesive strength thereof was slightly reduced-under low temperature and room temperature environments because the dry adhesion amount of the heat-sensitive tacky layer was lower than the lower limit value of the preferred range.

For the heat-sensitive adhesive material of Example Z-11, the heat-insulating effect was weakened because the dry adhesion amount of the heat-sensitive tacky layer was higher than the upper limit value of the preferred range, and for this reason, the adhesive strength thereof was slightly reduced.

For the heat-sensitive adhesive material of Example Z-12, the adhesive strength thereof at low temperature was slightly reduced because the content of triphenylphosphine in the thermofusible material was lower than the lower limit value of the preferred range.

For the heat-sensitive adhesive material of Example Z-14, the blocking resistance thereof was slightly reduced because the content of triphenylphosphine in the thermofusible material was higher than the upper limit value of the preferred range.

For the heat-sensitive adhesive material of Comparative Example Z-1, the adhesive strength was extremely weak and the blocking resistance was extremely degraded because only triphenylphosphine was used as a thermofusible material for the heat-sensitive tacky layer, and no styrene-butadiene copolymer nor modified compound thereof was used as a thermoplastic resin for the under layer.

For the heat-sensitive adhesive material of Comparative Example Z-2, the adhesive strength at low temperature was extremely weak because only benzotriazole was used as a thermofusible material for the heat-sensitive tacky layer, and no styrene-butadiene copolymer nor modified compound thereof was used as a thermoplastic resin for the under layer.

For the heat-sensitive adhesive material of Comparative Example Z-3, the adhesive strength at low temperature was extremely weak because the glass transition temperature of the thermoplastic resin in the under layer was 35° C.

For the heat-sensitive adhesive material of Comparative Example Z-4, the blocking resistance was low because the glass transition temperature of the thermoplastic resin in the under layer was −42° C.

For the heat-sensitive adhesive material of Comparative Example Z-5, the adhesive strength was extremely weak because no under layer was formed therein.

For the heat-sensitive adhesive material of Comparative Example Z-6, the blocking resistance was low because no styrene-butadiene copolymer nor modified compound thereof was used as a thermoplastic resin for the under layer.

For the heat-sensitive adhesive material of Comparative Example Z-7, the adhesive strength at low temperature was extremely weak because only benzotriazole was used as a thermofusible material for the heat-sensitive tacky layer.

Respective heat-sensitive adhesive materials of Examples S-1-1 to S-17 and Comparative Examples S-1 to S-7 were prepared according to the following procedures.

Preparation Example S-1-1

-Preparation of Under Layer Coating Solution [A-1 Liquid]-
A mixture containing the following composition was stirred and dispersed to prepare an under layer coating solution [A-1 liquid].

| | |
|---|---|
| Spherical hollow plastic particle (a copolymer resin containing vinylidene-acrylonitrile as the main components, solid content: 32% by mass, volume average particle diameter: 3.0 μm; hollow rate: 92%) | 15 parts by mass |
| Styrene-butadiene copolymer latex, (SMARTEX PA-9159 manufactured by Nippon A&L Inc.; glass transition temperature (Tg): 4° C.) | 10 parts by mass |
| Water | 60 parts by mass |

Preparation Example S-1-2

-Preparation of Under Layer Coating Solution [A-2 Liquid]-
A mixture containing the following composition was stirred and dispersed to prepare an under layer coating solution [A-2 liquid].

| | |
|---|---|
| Spherical hollow plastic particle (a copolymer resin containing vinylidene-acrylonitrile as the main components, solid content: 32% by mass, volume average particle diameter: 3.0 μm; hollow rate: 92%) | 15 parts by mass |
| Carboxy-modified styrene-butadiene copolymer latex (NALSTER SR-111, manufactured by Nippon A&L Inc.; glass transition temperature (Tg): −34° C.) | 10 parts by mass |
| Water | 60 parts by mass |

Preparation Example S-1-3

-Preparation of Under Layer Coating Solution [A-3 Liquid]-
A mixture containing the following composition was stirred and dispersed to prepare an under layer coating solution [A-3 liquid].

| | |
|---|---|
| Spherical hollow plastic particle (a copolymer resin containing vinylidene-acrylonitrile as the main components, solid content: 32% by mass, volume average particle diameter: 3.0 μm; hollow rate: 92%) | 15 parts by mass |
| Carboxy-modified styrene-butadiene copolymer latex (NALSTER SR-100, manufactured by Nippon A&L Inc.; glass transition temperature (Tg): 25° C.) | 10 parts by mass |
| Water | 60 parts by mass |

Preparation Example S-1-4

-Preparation of Under Layer Coating Solution [A-4 Liquid]-
A mixture containing the following composition was stirred and dispersed to prepare an under layer coating solution [A-4 liquid].

| | |
|---|---|
| Spherical hollow plastic particle (a copolymer resin containing vinylidene-acrylonitrile as the main components, solid content: 32% by mass, volume average particle diameter: 3.0 μm; hollow rate: 92%) | 15 parts by mass |
| Carboxy-modified styrene-butadiene copolymer latex (NALSTER SR-143, manufactured by Nippon A&L Inc.; glass transition temperature (Tg): 35° C.) | 10 parts by mass |
| Water | 60 parts by mass |

Preparation Example S-1-5

-Preparation of Under Layer Coating Solution [A-5 Liquid]-
A mixture containing the following composition was stirred and dispersed to prepare an under layer coating solution [A-5 liquid].

| | |
|---|---|
| Spherical hollow plastic particle (a copolymer resin containing vinylidene-acrylonitrile as the main components, solid content: 32% by mass, volume average particle diameter: 3.0 μm; hollow rate: 92%) | 15 parts by mass |
| Carboxy-modified styrene-butadiene copolymer latex (NALSTER SR-112, manufactured by Nippon A&L Inc.; glass transition temperature (Tg): −42° C.) | 10 parts by mass |
| Water | 60 parts by mass |

Preparation Example S-1-6

-Preparation of Under Layer Coating Solution [A-6 Liquid]-

A mixture containing the following composition was stirred and dispersed to prepare an under layer coating solution [A-6 liquid].

| | |
|---|---|
| Spherical hollow plastic particle (an acrylonitrile-vinylidene chloride-methyl methacrylate copolymer, solid content: 41% by mass, volume average particle diameter: 3.2 μm; hollow rate: 70%) | 11 parts by mass |
| Styrene-butadiene copolymer latex (SMARTEX PA-9159, manufactured by Nippon A&L Inc.; glass transition temperature (Tg): 4° C.) | 10 parts by mass |
| Water | 60 parts by mass |

Preparation Example S-1-7

-Preparation of Under Layer Coating Solution [A-7 Liquid]-

A mixture containing the following composition was stirred and dispersed to prepare an under layer coating solution [A-7 liquid].

| | |
|---|---|
| Spherical hollow plastic particle (an acrylonitrile-vinylidene chloride-methyl methacrylate copolymer, solid content: 40% by mass, volume average particle diameter: 1.5 μm; hollow rate: 50%) | 15 parts by mass |
| Styrene-butadiene copolymer latex (SMARTEX PA-9159, manufactured bby Nippon A&L Inc.; glass transition temperature (Tg): 4° C.) | 10 parts by mass |
| Water | 60 parts by mass |

Preparation Example S-1-8)

-Preparation of Under Layer Coating Solution [A-8 Liquid]-

A mixture containing the following composition was stirred and dispersed to prepare an under layer coating solution [A-8 liquid].

| | |
|---|---|
| Spherical hollow plastic particle (an acrylonitrile-methacrylonitrile-isobonyl methacrylate copolymer, solid content: 33% by mass, volume average particle diameter: 6.0 μm; hollow rate: 91%) | 13.7 parts by mass |
| Styrene-butadiene copolymer latex (SMARTEX PA-9159, manufactured by Nippon A&L Inc.; glass transition temperature (Tg): 4° C.) | 10 parts by mass |
| Water | 60 parts by mass |

Preparation Example S-1-9

-Preparation of Under Layer Coating Solution [A-9 Liquid]-

A mixture containing the following composition was stirred and dispersed to prepare an under layer coating solution [A-9 liquid].

| | |
|---|---|
| Spherical hollow plastic particle (a copolymer resin containing vinylidene-acrylonitrile as the main components, solid content: 32% by mass, volume average particle diameter: 3.0 μm; hollow rate: 92%) | 3.1 parts by mass |
| Styrene-butadiene copolymer latex (SMARTEX PA-9159, manufactured by Nippon A&L Inc.; glass transition temperature (Tg): 4° C.) | 11 parts by mass |
| Water | 60 parts by mass |

Preparation Example S-1-10

-Preparation of Under Layer Coating Solution [A-10 Liquid]-

A mixture containing the following composition was stirred and dispersed to prepare an under layer coating solution [A-10 liquid].

| | |
|---|---|
| Spherical hollow plastic particle (a copolymer resin containing vinylidene-acrylonitrile as the main components, solid content: 32% by mass, volume average particle diameter: 3.0 μm; hollow rate; 92%) | 34.3 parts by mass |
| Styrene-butadiene copolymer latex (SMARTEX PA-9159, manufactured by Nippon A&L Inc.; glass transition temperature (Tg): 4° C.) | 10 parts by mass |
| Water | 60 parts by mass |

Preparation Example S-1-11

-Preparation of Under Layer Coating Solution [A-11 Liquid]-

A mixture containing the following composition was stirred and dispersed to prepare an under layer coating solution [A-11 liquid].

| | |
|---|---|
| Spherical hollow plastic particle (a copolymer resin containing vinylidene-acrylonitrile as the main componeents, solid content: 32% by mass, volume average particle diameter: 3.0 μm; hollow rate: 92%) | 34.3 parts by mass |
| Acrylic acid ester copolymer aqueous emulsion (POLYZOL PSA SE-4040, manufactured by Showa High Polymer Co., Ltd.; glass transition temperature (Tg): −65° C.; solid content: 55% by mass) | 16.3 parts by mass |
| Water | 60 parts by mass |

Preparation Example S-2-1

-Preparation of Thermofusible Material Dispersion [B-1 Liquid]-

A mixture containing the following composition was dispersed by using a sand mill so as to have a volume average particle diameter of 1.0 μm, thereby a thermofusible material dispersion [B-1 liquid] was prepared.

| Triphenylphosphine | 30.0 parts by mass |
|---|---|
| Polyvinyl alcohol (GOHSERAN L-3266, manufactured by Nippon Synthetic Chemical Industry Co., Ltd., 10% by mass aqueous solution) | 15 parts by mass |
| Surfactant (NEWCOL 290 M manufactured by Nippon Nyukazai Co., Ltd.; 10% by mass aqueous solution) | 1.5 parts by mass |
| Water | 53.5 parts by mass |

Preparation Example S-2-2-1

-Preparation of Thermofusible Material Dispersion [C-1-1 Liquid]-

A mixture containing the following composition was dispersed by using a sand mill so as to have a volume average particle diameter of 1.0 μm, thereby a thermofusible material dispersion [C-1-1 liquid] was prepared.

| 2-(2'-hydroxy-3'-t-butyl-5'-methylphenyl)-5-chlorobenzotriazole (melting point: 138° C.) | 30.0 parts by mass |
|---|---|
| Polyvinyl alcohol (GOHSERAN L-3266, manufactured by Nippon Synthetic Chemical Industry Co., Ltd., 10% by mass aqueous solution) | 15 parts by mass |
| Surfactant (NEWCOL 290 M manufactured by Nippon Nyukazai Co., Ltd.; 10% by mass aqueous solution) | 1.5 parts by mass |
| Water | 53.5 parts by mass |

Preparation Example S-2-2-2

-Preparation of Thermofusible Material Dispersion [C-1-2 Liquid]-

A mixture containing the following composition was dispersed by using a sand mill so as to have a volume average particle diameter of 1.0 μm, thereby a thermofusible material dispersion [C-1-2 liquid] was prepared.

| 2-(2'-hydroxy-3',5'-t-butylphenyl)-5-chlorobenzotriazole (melting point: 152° C.) | 30.0 parts by mass |
|---|---|
| Polyvinyl alcohol (GOHSERAN L-3266, manufactured by Nippon Synthetic Chemical Industry Co., Ltd., 10% by mass aqueous solution) | 15 parts by weight |
| Surfactant (NEWCOL 290 M manufactured by Nipponn Nyukazai Co., Ltd.; 10% by mass aqueous solution) | 1.5 parts by mass |
| Water | 53.5 parts by mass |

Preparation Example S-2-2-3

-Preparation of Thermofusible Material Dispersion [C-1-3 Liquid]-

A mixture containing the following composition was dispersed by using a sand mill so as to have a volume average particle diameter of 1.0 μm, thereby a thermofusible material dispersion [C-1-3 liquid] was prepared.

| 2-[2'-hydroxy-3',5'-di(1,1-dimethylbenzyl) phenyl] benzotriazole (melting point: 140° C.) | 30.0 parts by mass |
|---|---|
| Polyvinyl alcohol (GOHSERAN L-3266, manufactured by Nippon Synthetic Chemical Industry Co., Ltd., 10% by mass aqueous solution) | 15 parts by mass |
| Surfactant (NEWCOL 290M manufactured by Nippon Nyukazai Co., Ltd.; 10% by mass aqueous solution) | 1.5 parts by mass |
| Water | 53.5 parts by mass |

Preparation Example S-2-2-4

-Preparation of Thermofusible Material Dispersion [C-1-4 Liquid]-

A mixture containing the following composition was dispersed by using a sand mill so as to have a volume average particle diameter of 1.0 μm, thereby a thermofusible material dispersion [C-1-4 liquid] was prepared.

| 2-(2'-hydroxy-5'-t-octylphenyl) benzotriazole (melting point: 102° C.) | 30.0 parts by mass |
|---|---|
| Polyvinyl alcohol (GOHSERAN L-3266, manufactured by Nippon Synthetic Chemical Industry Co., Ltd., 10% by mass aqueous solution) | 15 parts by mass |
| Surfactant (NEWCOL 290M manufactured by Nippon Nyukazai Co., Ltd.; 10% by mass aqueous solution) | 1.5 parts by mass |
| Water | 53.5 parts by mass |

Preparation Example S-2-3

-Preparation of Silicone Resin Dispersion [D-1 Liquid]-

A mixture containing the following composition was dispersed by using a sand mill so as to have a volume average particle diameter of 1.0 μm, thereby a dispersion [D-1 liquid] was obtained.

| Silicone resin particle (KMP-590, manufactured by Shin-Etsu Chemical Co., Ltd.) | 30 parts by mass |
|---|---|
| Polyvinyl alcohol (GOHSERAN L-3266, manufactured by Nippon Synthetic Chemical Industry Co., Ltd., 30% by mass aqueous solution) | 5.0 parts by mass |
| Surfactant (NEWCOL 290M manufactured by Nippon Nyukazai Co., Ltd.; 10% by mass aqueous solution) | 1.5 parts by mass |
| Water | 64.85 parts by mass |

Preparation Example S-3-1-1

-Preparation of Heat-sensitive Pressure-sensitive Adhesive Coating Solution [E-1-1 Liquid]-

A mixture containing the following composition was uniformly mixed to prepare a heat-sensitive pressure-sensitive adhesive coating solution [E-1-1 liquid].

| Acrylic acid ester copolymer aqueous emulsion (POLYZOL PSA SE-4040, manufactured by Showa High Polymer Co., Ltd.; glass transition temperature (Tg): −65° C.; solid content: 55% by mass) | 9.2 parts by mass |
|---|---|

-continued

| | |
|---|---|
| Adhesion imparting agent (E-100, manufactured by Arakawa Chemical Industries, Ltd.; containing terpene phenol as the main component; solid content: 50% by mass; softening point: 150° C.) | 6.6 parts by mass |
| Thermofusible material dispersion [B-1 liquid] | 71.7 parts by mass |
| Thermofusible material dispersion [C-1-1 liquid] | 12.6 parts by mass |
| Silicone resin dispersion [D-1 liquid] | 3.8 parts by mass |

Preparation Example S-3-1-2

-Preparation of Heat-sensitive Pressure-sensitive Adhesive Coating Solution [E-1-2 Liquid]-

A mixture containing the following composition was uniformly mixed to prepare a heat-sensitive pressure-sensitive adhesive coating solution [E-1-2 liquid].

| | |
|---|---|
| Acrylic acid ester copolymer aqueous emulsion (POLYZOL PSA SE-4040, manufactured by Showa High Polymer Co., Ltd.; glass transition temperature (Tg): −65° C.; solid content: 55% by mass) | 9.2 parts by mass |
| Adhesion imparting agent (E-100, manufactured by Arakawa Chemical Industries, Ltd.; containing terpene phenol as the main component; solid content: 50% by mass; softening point: 150° C.) | 6.6 parts by mass |
| Thermofusible material dispersion [B-1 liquid] | 63.2 parts by mass |
| Thermofusible material dispersion [C-1-2 liquid] | 21.1 parts by mass |
| Silicone resin dispersion [D-1 liquid] | 3.8 parts by mass |

Preparation Example S-3-1-3

-Preparation of Heat-sensitive Pressure-sensitive Adhesive Coating Solution [E-1-3 Liquid]-

A mixture containing the following composition was uniformly mixed to prepare a heat-sensitive pressure-sensitive adhesive coating solution [E-1-3 liquid].

| | |
|---|---|
| Acrylic acid ester copolymer aqueous emulsion (POLYZOL PSA SE-4040, manufactured by Showa High Polymer Co., Ltd.; glass transition temperature (Tg): −65° C.; solid content: 55% by mass) | 9.2 parts by mass |
| Adhesion imparting agent (E-100, manufactured by Arakawa Chemical Industries, Ltd.; containing terpene phenol as the main component; solid content: 50% by mass; softening point: 150° C.) | 6.6 parts by mass |
| Thermofusible material dispersion [B-1 liquid] | 63.2 parts by mass |
| Thermofusible material dispersion [C-1-3 liquid] | 21.1 parts by mass |
| Silicone resin dispersion [D-1 liquid] | 3.8 parts by mass |

Preparation Example S-3-2

-Preparation of Heat-sensitive Pressure-sensitive Adhesive Coating Solution [E-2 Liquid]-

A mixture containing the following composition was uniformly mixed to prepare a heat-sensitive pressure-sensitive adhesive coating solution [E-2 liquid].

| | |
|---|---|
| Acrylic acid ester copolymer aqueous emulsion (POLYZOL PSA SE-4040, manufactured by Showa High Polymer Co., Ltd.; glass transition temperature (Tg): −65° C.; solid content: 55% by mass) | 9.2 parts by mass |
| Adhesion imparting agent (E-100, manufactured by Arakawa Chemical Industries, Ltd.; containing terpene phenol as the main component; solid content: 50% by mass; softening point: 150° C.) | 6.6 parts by mass |
| Thermofusible material dispersion [B-1 liquid] | 63.2 parts by mass |
| Thermofusible material dispersion [C-1-1 liquid] | 21.1 parts by mass |
| Silicone resin dispersion [D-1 liquid] | 3.8 parts by mass |

Preparation Example S-3-3

-Preparation of Heat-sensitive Pressure-sensitive Adhesive Coating Solution [E-3 Liquid]-

A mixture containing the following composition was uniformly mixed to prepare a heat-sensitive pressure-sensitive adhesive coating solution [E-3 liquid].

| | |
|---|---|
| Acrylic acid ester copolymer aqueous emulsion (POLYZOL PSA SE-4040, manufactured by Showa High Polymer Co., Ltd.; glass transition temperature (Tg): −65° C.; solid content: 55% by mass) | 9.2 parts by mass |
| Adhesion imparting agent (E-100, manufactured by Arakawa Chemical Industries, Ltd.; containing terpene phenol as the main component; solid content: 50% by mass; softening point: 150° C.) | 6.6 parts by mass |
| Thermofusible material dispersion [B-1 liquid] | 67.44 parts by mass |
| Thermofusible material dispersion [C-1-1 liquid] | 16.86 parts by mass |
| Silicone resin dispersion [D-1 liquid] | 3.8 parts by mass |

Preparation Example S-3-4

-Preparation of Heat-sensitive Pressure-sensitive Adhesive Coating Solution [E-4 Liquid]-

A mixture containing the following composition was uniformly mixed to prepare a heat-sensitive pressure-sensitive adhesive coating solution [E-4 liquid].

| | |
|---|---|
| Acrylic acid ester copolymer aqueous emulsion (POLYZOL PSA SE-4040, manufactured by Showa High Polymer Co., Ltd.; glass transition temperature (Tg): −65° C.; solid content: 55% by mass) | 9.2 parts by mass |
| Adhesion imparting agent (E-100, manufactured by Arakawa Chemical Industries, Ltd.; containing terpene phenol as the main component; solid content: 50% by mass; softening point: 150° C.) | 6.6 parts by mass |
| Thermofusible material dispersion [B-1 liquid] | 75.87 parts by mass |
| Thermofusible material dispersion [C-1-1 liquid] | 8.43 parts by mass |
| Silicone resin dispersion [D-1 liquid] | 3.8 parts by mass |

Preparation Example S-3-5

-Preparation of Heat-sensitive Pressure-sensitive Adhesive Coating Solution [E-5 Liquid]-

A mixture containing the following composition was uniformly mixed to prepare a heat-sensitive pressure-sensitive adhesive coating solution [E-5 liquid].

| | |
|---|---|
| Acrylic acid ester copolymer aqueous emulsion (POLYZOL PSA SE-4040, manufactured by Showa High Polymer Co., Ltd.; glass transition temperature (Tg): −65° C.; solid content: 55% by mass) | 9.2 parts by mass |
| Adhesion imparting agent (E-100, manufactured by Arakawa Chemical Industries, Ltd.; containing terpene phenol as the main component; solid content: 50% by mass; softening point: 150° C.) | 6.6 parts by mass |
| Thermofusible material dispersion [B-1 liquid] | 80.08 parts by mass |
| Thermofusible material dispersion [C-1-1 liquid] | 4.22 parts by mass |
| Silicone resin dispersion [D-1 liquid] | 3.8 parts by mass |

Preparation Example S-3-6

-Preparation of Heat-sensitive Pressure-sensitive Adhesive Coating Solution [E-6 Liquid]-

A mixture containing the following composition was uniformly mixed to prepare a heat-sensitive pressure-sensitive adhesive coating solution [E-6 liquid].

| | |
|---|---|
| Acrylic acid ester copolymer aqueous emulsion (POLYZOL PSA SE-4040, manufactured by Showa High Polymer Co., Ltd.; glass transition temperature (Tg): −65° C.; solid content: 55% by mass) | 9.2 parts by mass |
| Adhesion imparting agent (E-100, manufactured by Arakawa Chemical Industries, Ltd.; containing terpene phenol as the main component; solid content: 50% by mass; softening point: 150° C.) | 6.6 parts by mass |
| Thermofusible material dispersion [B-1 liquid] | 80.08 parts by mass |
| Thermofusible material dispersion [C-1-1 liquid] | 4.22 parts by mass |

Preparation Example S-3-7

-Preparation of Heat-sensitive Pressure-sensitive Adhesive Coating Solution [E-7 Liquid]-

A mixture containing the following composition was uniformly mixed to prepare a heat-sensitive pressure-sensitive adhesive coating solution [E-7 liquid].

| | |
|---|---|
| Acrylic acid ester copolymer aqueous emulsion (POLYZOL PSA SE-4040, manufactured by Showa High Polymer Co., Ltd.; glass transition temperature (Tg): −65° C.; solid content: 55% by mass) | 9.2 parts by mass |
| Adhesion imparting agent (E-100, manufactured by Arakawa Chemical Industries, Ltd.; containing terpene phenol as the main component; solid content: 50% by mass; softening point: 150° C.) | 6.6 parts by mass |
| Thermofusible material dispersion [B-1 liquid] | 84.2 parts by mass |

Preparation Example S-3-8

-Preparation of Heat-sensitive Pressure-sensitive Adhesive Coating Solution [E-8 Liquid]-

A mixture containing the following composition was uniformly mixed to prepare a heat-sensitive pressure-sensitive adhesive coating solution [E-8 liquid].

| | |
|---|---|
| Acrylic acid ester copolymer aqueous emulsion (POLYZOL PSA SE-4040, manufactured by Showa High Polymer Co., Ltd.; glass transition temperature (Tg): −65° C.; solid content: 55% by mass) | 9.2 parts by mass |
| Adhesion imparting agent (E-100, manufactured by Arakawa Chemical Industries, Ltd.; containing terpene phenol as the main component; solid content: 50% by mass; softening point: 150° C.) | 6.6 parts by mass |
| Thermofusible material dispersion [C-1-1 liquid] | 84.2 parts by mass |

Example S-1-1

-Preparation of Heat-sensitive Adhesive Material-

As a support, a single-sided coat paper of a basis weight of 80 g/m² (OK ADNIS ROUGH, manufactured by OJI Paper Co.) was used. Over the single-sided coat paper surface on which no coat layer was formed, the under layer coating solution [A-1 liquid] was applied such that the dry adhesion amount was 5 g/m² and the applied A-1 liquid was dried to form an under layer.

Over the surface of the obtained under layer, the heat-sensitive pressure-sensitive adhesive layer coating solution [E-1-1 liquid] was applied such that the dry adhesion amount was 10 g/m² and the applied E-1-1 liquid was dried to form a heat-sensitive tacky layer, thereby a heat-sensitive adhesive material of Example S-1-1 was prepared.

Example S-1-2

-Preparation of Heat-sensitive Adhesive Material-

A heat-sensitive adhesive material of Example S-1-2 was prepared in the same manner as in Example S-1-1, except that the heat-sensitive pressure-sensitive adhesive coating solution [E-1-2 liquid] was used in place of the heat-sensitive pressure-sensitive adhesive coating solution [E-1-1 liquid].

Example S-1-3

-Preparation of Heat-sensitive Adhesive Material-

A heat-sensitive adhesive material of Example S-1-3 was prepared in the same manner as in Example S-1-1, except that the heat-sensitive pressure-sensitive adhesive coating solution [E-1-3 liquid] was used in place of the heat-sensitive pressure-sensitive adhesive coating solution [E-1-1 liquid].

Example S-2

-Preparation of Heat-sensitive Adhesive Material-

A heat-sensitive adhesive material of Example S-2 was prepared in the same manner as in Example S-1-1, except that the under layer coating solution [A-2 liquid] was used in place of the under layer coating solution [A-1 liquid].

Example S-3

-Preparation of Heat-sensitive Adhesive Material-

A heat-sensitive adhesive material of Example S-3 was prepared in the same manner as in Example S-1-1, except that the under layer coating solution [A-3 liquid] was used in place of the under layer coating solution [A-1 liquid].

Example S-4

-Preparation of Heat-sensitive Adhesive Material-

A heat-sensitive adhesive material of Example S-4 was prepared in the same manner as in Example S-1-1, except that the under layer coating solution [A-6 liquid] was used in place of the under layer coating solution [A-1 liquid].

Example S-5

-Preparation of Heat-sensitive Adhesive Material-

A heat-sensitive adhesive material of Example S-5 was prepared in the same manner as in Example S-1-1, except that the under layer coating solution [A-7 liquid] was used in place of the under layer coating solution [A-1 liquid].

Example S-6

-Preparation of Heat-sensitive Adhesive Material-

A heat-sensitive adhesive material of Example S-6 was prepared in the same manner as in Example S-1-1, except that the under layer coating solution [A-8 liquid] was used in place of the under layer coating solution [A-1 liquid].

Example S-7

-Preparation of Heat-sensitive Adhesive Material-

A heat-sensitive adhesive material of Example S-7 was prepared in the same manner as in Example S-1-1, except that the under layer coating solution [A-9 liquid] was used in place of the under layer coating solution [A-1 liquid].

Example S-8

-Preparation of Heat-sensitive Adhesive Material-

A heat-sensitive adhesive material of Example S-8 was prepared in the same manner as in Example S-1-1, except that the under layer coating solution [A-10 liquid] was used in place of the under layer coating solution [A-1 liquid].

Example S-9

-Preparation of Heat-sensitive Adhesive Material-

A heat-sensitive adhesive material of Example S-9 was prepared in the same manner as in Example S-1-1, except that the heat-sensitive pressure-sensitive adhesive coating solution [E-1-1] was applied such that the dry adhesion amount was 8 g/m$^2$ and the applied [E-1-1] liquid was dried to thereby form a heat-sensitive tacky layer.

Example S-10

-Preparation of Heat-sensitive Adhesive Material-

A heat-sensitive adhesive material of Example S-10 was prepared in the same manner as in Example S-1-1, except that the heat-sensitive pressure-sensitive adhesive coating solution [E-1-1] was applied such that the dry adhesion amount was 20 g/m$^2$ and the applied [E-1-1] liquid was dried to thereby form a heat-sensitive tacky layer.

Example S-11

-Preparation of Heat-sensitive Adhesive Material-

A heat-sensitive adhesive material of Example S-11 was prepared in the same manner as in Example S-1-1, except that the heat-sensitive pressure-sensitive adhesive coating solution [E-1-1] was applied such that the dry adhesion amount was 25 g/m$^2$ and the applied [E-1-1] liquid was dried to thereby form a heat-sensitive tacky layer.

Example S-12

-Preparation of Heat-sensitive Adhesive Material-

A heat-sensitive adhesive material of Example S-12 was prepared in the same manner as in Example S-1-1, except that the heat-sensitive pressure-sensitive adhesive coating solution [E-2 liquid] was used in place of the heat-sensitive pressure-sensitive adhesive coating solution [E-1-1 liquid].

Example S-13

-Preparation of Heat-sensitive Adhesive Material-

A heat-sensitive adhesive material of Example S-13 was prepared in the same manner as in Example S-1-1, except that the heat-sensitive pressure-sensitive adhesive coating solution [E-3 liquid] was used in place of the heat-sensitive pressure-sensitive adhesive coating solution [E-1-1 liquid].

Example S-14

-Preparation of Heat-sensitive Adhesive Material-

A heat-sensitive adhesive material of Example S-14 was prepared in the same manner as in Example S-1-1, except that the heat-sensitive pressure-sensitive adhesive coating solution [E-4 liquid] was used in place of the heat-sensitive pressure-sensitive adhesive coating solution [E-1-1 liquid].

Example S-15

-Preparation of Heat-sensitive Adhesive Material-

A heat-sensitive adhesive material of Example S-15 was prepared in the same manner as in Example S-1-1, except that the heat-sensitive pressure-sensitive adhesive coating solution [E-5 liquid] was used in place of the heat-sensitive pressure-sensitive adhesive coating solution [E-1-1 liquid].

Example S-16

<Formation of Heat-sensitive Recording Layer>

-Preparation of Non-Foamable Heat-Insulating Layer Forming Coating Solution [F Liquid]-

A mixture containing the following composition was stirred and dispersed to prepare a non-foamable heat-insulating layer forming coating solution [F liquid].

| | |
|---|---|
| Fine hollow particle dispersion (a copolymer resin containing vinylidene chloride-acrylonitrile as the main components, solid content: 32%, volume average particle diameter: 3.6 μm, hollow rate: 92%) | 30 parts by mass |
| Styrene-butadiene copolymer latex (SMARTEX PA-9159, manufactured by Nippon A&L Inc.; glass transition temperature (Tg): 4° C.) | 10 parts by mass |

-continued

| | |
|---|---|
| Surfactant (DAPRO W-77, manufactured by Elementis Japan K.K.) | 0.1 parts by mass |
| Water | 60 parts by mass |

-Preparation of Color Coupler Dispersion [G Liquid]-

A mixture containing the following composition was stirred and dispersed to prepare a color-coupler dispersion [G liquid].

| | |
|---|---|
| 3-di-n-butylammino-6-methyl-7-anilinofluoran | 20 parts by mass |
| Polyvinyl alcohol (GOHSERAN L-3266, manufactured by Nippon Synthetic Chemical Industry Co., Ltd.; 10% by mass aqueous solution) | 10 parts by mass |
| Water | 70 parts by mass |

-Preparation of Color Developer Dispersion [H Liquid]-

A mixture containing the following composition was dispersed by using a sand mill so as to have a volume average particle diameter of 1.5 μm, thereby a color coupler dispersion [H liquid] was prepared.

| | |
|---|---|
| 4-isopropoxy-4'-hydroxydiphenyl sulfone | 10 parts by mass |
| Polyvinyl alcohol (GOHSERAN L-3266, manufactured by Nippon Synthetic Chemical Industry Co., Ltd.; 10% by mass aqueous solution) | 25 parts by mass |
| Calcium carbonate (CALSHITEC BRILLIANT-15, manufactured by Shiroishi-kougiyou Co., Ltd) | 15 parts by mass |
| Water | 50 parts by mass |

Next, the color coupler dispersion [G liquid] and the color developer dispersion were mixed at a mixture ration of [G liquid]:[H liquid]=1.8 (mass ratio) and stirred to prepare a heat-sensitive chromogenic layer coating solution [I liquid].

Next, the non-foamable heat-insulating layer forming coating solution [F liquid] was applied over a single-sided coat paper of an average basis weight of 80 g/m$^2$ (OK ADNIS ROUGH, manufactured by OJI Paper Co.) such that the dry mass was 4 g/m$^2$ and the applied [F liquid] was dried, thereby a non-foamable heat-insulating layer was formed.

Next, over the surface of the non-foamable heat-insulating layer, the color coupler dispersion [G liquid] was applied such that the dry mass was 5 g/m$^2$ and the applied G liquid was dried to form a heat-sensitive recording layer. Subsequently, the surface of the heat-sensitive recording layer was subjected to a super calender treatment so as to have an Oken smoothness of 2,000 seconds, thereby a heat-sensitive recording paper having a heat-sensitive recording layer was prepared.

Next, in the obtained heat-sensitive recording paper, over the support surface on which the heat-sensitive recording layer was not formed, the under layer coating solution [A-1] was applied such that the dry adhesion amount was 5 g/m$^2$, the applied A-1 liquid was dried to form an under layer. Over the surface of the under layer, the heat-sensitive pressure-sensitive adhesive coating solution [E-1-1 liquid] was applied such that the dry adhesion amount was 10 g/m$^2$, and the applied E-1-1 liquid was dried to form a heat-sensitive tacky layer, thereby a heat-sensitive adhesive material of Example S-16 was prepared.

Comparative Example S-1

-Preparation of Heat-sensitive Adhesive Material-

As a support, a single-sided coat paper of a basis weight of 80 g/m$^2$ (OK ADNIS ROUGH, manufactured by OJI Paper Co.) was used. Over the single-sided coat paper surface on which no coat layer was formed, the under layer coating solution [A-11 liquid] was applied such that the dry adhesion amount was 5 g/m$^2$ and the applied A-11 liquid was dried to form an under layer.

Over the surface of the under layer, the heat-sensitive pressure-sensitive adhesive layer coating solution [E-7 liquid] was applied such that the dry adhesion amount was 10 g/m$^2$ and the applied E-7 liquid was dried to form a heat-sensitive tacky layer, thereby a heat-sensitive adhesive material of Comparative Example S-1 was prepared.

Comparative Example S-2

-Preparation of Heat-sensitive Adhesive Material-

As a support, a single-sided coat paper of a basis weight of 80 g/m$^2$ (OK ADNIS ROUGH, manufactured by OJI Paper Co.) was used. Over the single-sided coat paper surface on which no coat layer was formed, the under layer coating solution [A-11 liquid] was applied such that the dry adhesion amount was 5 g/m$^2$ and the applied A-11 liquid was dried to form an under layer. Over the surface of the under layer, the heat-sensitive pressure-sensitive adhesive layer coating solution [E-8 liquid] was applied such that the dry adhesion amount was 10 μm$^2$ and the applied E-8 liquid was dried to form a heat-sensitive tacky layer, thereby a heat-sensitive adhesive material of Comparative Example S-2 was prepared.

-Comparative Example S-3

Preparation of Heat-sensitive Adhesive Material-

A heat-sensitive adhesive material of Comparative Example S-3 was prepared in the same manner as in Example S-1-1, except that the under layer coating solution [A-4] was used in place of the A-1 liquid such that the dry adhesion amount was 5 g/m$^2$ and the applied A-4 liquid was dried to form a heat-sensitive tacky layer.

Comparative Example S-4

-Preparation of Heat-sensitive Adhesive Material-

A heat-sensitive adhesive material of Comparative Example S-4 was prepared in the same manner as in Example S-1-1, except that the under layer coating solution [A-5] was used in place of the A-1 liquid such that the dry adhesion amount was 5 g/m$^2$ and the applied A-5 liquid was dried to form a heat-sensitive tacky layer.

Comparative Example S-5

-Preparation of Heat-sensitive Adhesive Material-

A heat-sensitive adhesive material of Comparative Example S-5 was prepared in the same manner as in Example S-1-1, except that no under layer was formed.

Comparative Example S-6

-Preparation of Heat-sensitive Adhesive Material-

A heat-sensitive adhesive material of Comparative Example S-6 was prepared in the same manner as in Example S-1-1, except that the under layer coating solution [A-11 liquid] was used in place of the under layer coating solution [A-1 liquid].

Comparative Example S-7

-Preparation of Heat-sensitive Adhesive Material-

A heat-sensitive adhesive material of Comparative Example S-7 was prepared in the same manner as in Example S-1-1, except that the heat-sensitive pressure-sensitive adhesive coating solution [E-8 liquid] was used in place of the heat-sensitive pressure-sensitive adhesive coating solution [E-1-1 liquid].

Comparative Example S-8

-Preparation of Heat-sensitive Adhesive Material-

A heat-sensitive adhesive material of Comparative Example S-8 was prepared in the same manner as in Example S-1-1, except that the heat-sensitive pressure-sensitive adhesive coating solution [E-6 liquid] was used in place of the heat-sensitive pressure-sensitive adhesive coating solution [E-1-1 liquid].

Comparative Example S-9

-Preparation of Heat-sensitive Adhesive Material-

A heat-sensitive adhesive material of Comparative Example S-9 was prepared in the same manner as in Example S-1-1, except that the heat-sensitive pressure-sensitive adhesive coating solution [E-7 liquid] was used in place of the heat-sensitive pressure-sensitive adhesive coating solution [E-1-1 liquid].

Next, the obtained respective heat-sensitive adhesive materials of Examples S-1-1 to S-16 and Comparative Examples S-1 to S-9 were evaluated as to adhesive strength and blocking resistance according to the following procedures. Tables 2S-(a) and 2S-(b) show the evaluation results.

<Measurement of Adhesive Strength>

The obtained heat-sensitive adhesive materials were respectively cut in a rectangle (25 mm×150 mm) and each of the cut materials was thermally activated through the use of a heat-sensitive printing apparatus (TH-PMD, manufactured by Ohkura Electric Co., Ltd.) under the conditions of a thermal head energy: 0.50 mJ/dot; printing speed: 4 ms/line; and platen pressure: 6 kgf/line. Next, the each of the thermally activated heat-sensitive adhesive materials was affixed to an adherend (corrugated board) in the longitudinal direction thereof using a rubber roller under a pressure of 2 kg. Two minutes later and 1-day later, the heat-sensitive adhesive materials were respectively peeled off from the corrugated board under the conditions of a peeling angle of 180 degrees and a peeling rate of 300 mm/min.

The adhesive strength at that time was measured by means of a forth gauge (MODEL DPS-5, manufactured by IMADA Co.), and the measured data was read at 0.1-second intervals to express the adhesive strength by an averaged numerical value. Note that the unit of the adhesive strength is gf/25 mm. The test was carried out under low temperature (0° C.), normal temperature/normal humidity (23° C., 65% RH), and high temperature (40° C., 60% RH) environments.

[Evaluation Criteria of Adhesive Strength to Corrugated Board]

A: 700 gf/25 mm or more
B: 500 gf/25 mm or more to less than 700 gf/25 mm
C: 300 gf/25 mm or more to less than 500 gf/25 mm
D: less than 300 gf/25 mm <Evaluation of Blocking Resistance>

Each surface of the heat-sensitive tacky layers in the thus obtained heat-sensitive adhesive materials was made contact with the opposite surface therefrom, i.e., the surface on which each of the heat-sensitive recording layers was formed, and the heat-sensitive adhesive materials were left intact under application of a pressure of 200 gf/cm$^2$ at a temperature of 50° C. in dry atmosphere for 24 hours. Thereafter, they were left intact at room temperature and then each of the heat-sensitive adhesive materials was peeled off from the corrugated board. The blocking resistance at that time was evaluated based on the evaluation criteria shown in Table 1S. Ranks were divided into 10 categories, ranks 10 and 9 were evaluated as "A"; ranks 8 and 7 were evaluated as "B"; ranks 6, 5 and 4 were evaluated as "C"; and ranks 3, 2 and 1 were evaluated as "D". Note that a rank of 7 or more is at a practically usable level. Tables 2S-(a) and 2S-(b) show the evaluation results.

It should be noted that the terms of "Exfoliated level", Dot-like transcription", "Peel-off noise level", "Resistance to peeling" indicate degrees of seriousness of blocking troubles in order of mention. "Resistance to peeling" means a condition where a heat-sensitive adhesive material slightly sticks to an adherend when it has no surface tackiness. In the column of "Resistance to peeling", the term "its own weight" indicates a condition that when two sheets of heat-sensitive adhesive materials are laid and slightly stick to each other, however, when the upper sheet is pinched, it naturally fell away. The term "Peel-off noise level" means a condition that when a heat-sensitive adhesive material sticks close to an adherend and then is peeled off from the adherend, it generates noise. The term "Dot-like transcription" means a condition where a heat-sensitive tacky layer is transcribed in a dotted manner on the back surface of a heat-sensitive adhesive material. The term "Exfoliated level" means a phenomenon that a heat-sensitive tacky layer sticks to the back surface of the heat-sensitive adhesive material and the heat-sensitive tacky layer is exfoliated from the heat-sensitive adhesive material or paper of the back surface is exfoliated therefrom (is torn).

TABLE 1S

| Evaluation | Rank | Resistance to peeling | Peel-off noise level | Dot-like transcription | Exfoliated level |
|---|---|---|---|---|---|
| A | 10 | its own weight | | | |
|   | 9 | Slightly gave resistance | No noise | | |
| B | 8 | Gave resistance | Slightly heard | | |
|   | 7 | | Noise caused | | |
| C | 6 | | | Partly found | |
|   | 5 | | | 30% to 50% | |
|   | 4 | | | 50% to the entire surface | |
| D | 3 | | | | Partly found |
|   | 2 | | | | 30% to 50% |
|   | 1 | | | | 50% to the entire surface |

TABLE 2S-(a)

| | Adhesive Strength | | | | | | | | | | | | Blocking Resistance | |
|---|---|---|---|---|---|---|---|---|---|---|---|---|---|---|
| | 0° C. | | | | 23° C. | | | | 40° C. | | | | 50° C. | |
| | 2-min later | *Ev. | 1-day later | *Ev. | 2-min later | *Ev. | 1-day later | *Ev. | 2-min later | *Ev. | 1-day later | *Ev. | Rank | *Ev. |
| Ex. S-1-1 | 1,354 | A | 1,255 | A | 750 | A | 1,553 | A | 501 | B | 522 | B | 9 | A |
| Ex. S-1-2 | 1,083 | A | 1,004 | A | 600 | B | 1,242 | A | 505 | B | 513 | B | 9 | A |
| Ex. S-1-3 | 1,051 | A | 1,001 | A | 612 | B | 1,234 | A | 502 | B | 510 | B | 9 | A |
| Ex. S-1-4 | 1,033 | A | 1,005 | A | 622 | B | 1,258 | A | 517 | B | 507 | B | 9 | A |
| Ex. S-2 | 2,050 | A | 2,337 | A | 557 | B | 921 | A | 530 | B | 605 | B | 9 | B |
| Ex. S-3 | 650 | B | 633 | B | 550 | B | 510 | B | 515 | B | 520 | B | 9 | A |
| Ex. S-4 | 1,125 | A | 1,414 | A | 510 | B | 721 | A | 528 | B | 512 | B | 8 | B |
| Ex. S-5 | 564 | B | 654 | B | 512 | B | 502 | B | 519 | B | 533 | B | 8 | B |
| Ex. S-6 | 1,154 | A | 1,532 | A | 585 | B | 821 | A | 522 | B | 558 | B | 8 | B |
| Ex. S-7 | 667 | B | 780 | A | 512 | B | 512 | B | 512 | B | 505 | B | 7 | B |
| Ex. S-8 | 600 | B | 550 | B | 517 | B | 502 | B | 513 | B | 501 | B | 8 | B |
| Ex. S-9 | 570 | B | 855 | B | 501 | B | 682 | B | 501 | B | 427 | C | 10 | A |
| Ex. S-10 | 2,350 | A | 1,855 | A | 705 | A | 1,553 | A | 554 | B | 575 | B | 8 | B |
| Ex. S-11 | 850 | B | 872 | B | 512 | B | 639 | B | 510 | B | 511 | B | 7 | B |
| Ex. S-12 | 1,680 | A | 1,515 | A | 305 | C | 1,022 | A | 165 | D | 510 | B | 8 | B |
| Ex. S-13 | 1,235 | A | 1,750 | A | 750 | A | 1,553 | A | 501 | B | 522 | B | 8 | B |
| Ex. S-14 | 1,335 | A | 1,699 | A | 748 | A | 1,540 | A | 507 | B | 514 | B | 8 | B |
| Ex. S-15 | 530 | B | 845 | B | 540 | B | 568 | B | 480 | C | 508 | B | 7 | B |
| Ex. S-16 | 1,344 | A | 1,265 | A | 755 | A | 1,499 | A | 503 | B | 512 | B | 8 | B |

TABLE 2S-(b)

| | Adhesive Strength | | | | | | | | | | | | Blocking Resistance | |
|---|---|---|---|---|---|---|---|---|---|---|---|---|---|---|
| | 0° C. | | | | 23° C. | | | | 40° C. | | | | 50° C. | |
| | 2-min later | *Ev. | 1-day later | *Ev. | 2-min later | *Ev. | 1-day later | *Ev. | 2-min later | *Ev. | 1-day later | *Ev. | Rank | *Ev. |
| Compara. Ex. S-1 | 145 | D | 125 | D | 142 | D | 85 | D | 120 | D | 135 | D | 2 | D |
| Compara. Ex. S-2 | 12 | D | 0 | D | 550 | B | 485 | C | 333 | C | 240 | D | 9 | A |
| Compara. Ex. S-3 | 115 | D | 114 | D | 120 | D | 140 | D | 80 | D | 40 | D | 10 | A |
| Compara. Ex. S-4 | 2,239 | A | 2,550 | A | 570 | B | 1,350 | A | 545 | B | 665 | B | 3 | D |
| Compara. Ex. S-5 | 305 | C | 154 | D | 330 | C | 115 | D | 270 | D | 120 | D | 8 | B |
| Compara. Ex. S-6 | 1,890 | A | 1,725 | A | 812 | A | 728 | A | 554 | B | 517 | B | 3 | D |
| Compara. Ex. S-7 | 0 | D | 0 | D | 750 | A | 803 | A | 450 | C | 351 | C | 10 | A |
| Compara. Ex. S-8 | 1,447 | A | 1,476 | A | 754 | A | 1,518 | A | 610 | B | 633 | B | 6 | C |
| Compara. Ex. S-9 | 136 | D | 120 | D | 122 | D | 70 | D | 100 | D | 100 | D | 5 | C |

The evaluation results shown in Tables 2S-(a) and 2S-(b) demonstrated that the heat-sensitive adhesive materials of Examples S-1 to S-16 respectively had a strong adhesive strength to corrugated boards under low temperature (0° C.) to high temperature (40° C.) environments and had less decrease in adhesive strength with a lapse of time, were enabled to be thermally activated with low energy applied by a thermal head or the like and were also excellent in blocking resistance, as compared to the heat-sensitive adhesive materials of Comparative Examples of S-1 to S-9.

For the heat-sensitive adhesive material of Example S-7, the blocking resistance was slightly reduced because the content of the thermoplastic resin was high as compared to the content of the hollow filler in the under layer.

For the heat-sensitive adhesive material of Example S-8, the binding strength of the under layer was weakened because the content of the hollow filler was high as compared to the content of the thermoplastic resin in the under layer, and for this reason, the adhesive strength of the heat-sensitive adhesive material was slightly reduced under low temperature and room temperature environments.

For the heat-sensitive adhesive material of Example S-9, the adhesive strength thereof was slightly reduced under low temperature (0° C.) to high temperature (40° C.) environments because the dry adhesion amount of the heat-sensitive tacky layer was lower than the lower limit value of the preferred range.

For the heat-sensitive adhesive material of Example S-11, the heat-insulating effect was weakened because the dry adhesion amount of the heat-sensitive tacky layer was higher than the upper limit value of the preferred range, and for this reason, the adhesive strength thereof was slightly reduced.

For the heat-sensitive adhesive material of Example S-12, the adhesive strength thereof immediately after being affixed at temperatures of 23° C. to 40° C. was slightly reduced because the content of triphenylphosphine in the thermofusible material was lower than the lower limit value of the preferred range.

For the heat-sensitive adhesive material of Example S-15, both the adhesive strength and the blocking resistance thereof were slightly reduced because the content of triphenylphosphine in the thermofusible material was higher than the upper limit value of the preferred range.

For the heat-sensitive adhesive materials of Examples S-1 to S-6, S-10, S-13 and S-14, the adhesive strength was strong at low temperature (0° C.) to high temperature (40° C.) environments in the early stage of test and with a lapse of time and were also excellent in blocking resistance because the content of triphenyl phosphine in the thermofusible material was 80% to 90%.

For the heat-sensitive adhesive material of Comparative Example S-1, the adhesive strength was extremely weak and the blocking resistance was extremely reduced because only triphenylphosphine was used as a thermofusible material for the heat-sensitive tacky layer, and no styrene-butadiene copolymer nor modified compound thereof was used as a thermoplastic resin for the under layer.

For the heat-sensitive adhesive material of Comparative Example S-2, the adhesive strength at low temperature was extremely weak because only benzotriazole was used as a thermofusible material for the heat-sensitive tacky layer, and no styrene-butadiene copolymer nor modified compound thereof was used as a thermoplastic resin for the under layer.

For the heat-sensitive adhesive material of Comparative Example S-3, the adhesive strength at low temperature was extremely weak because the glass transition temperature of the thermoplastic resin in the under layer was 35° C.

For the heat-sensitive adhesive material of Comparative Example S-4, the blocking resistance was reduced because the glass transition temperature of the thermoplastic resin in the under layer was −42° C.

For the heat-sensitive adhesive material of Comparative Example S-5, the adhesive strength at low temperature was extremely weak because no under layer was formed therein.

For the heat-sensitive adhesive material of Comparative Example S-6, the blocking resistance was reduced because no styrene-butadiene copolymer nor modified compound thereof was used as a thermoplastic resin for the under layer.

For the heat-sensitive adhesive material of Comparative Example S-7, the adhesive strength at low temperature was extremely weak because only benzotriazole was used as a thermofusible material for the heat-sensitive tacky layer.

For the heat-sensitive adhesive material of Comparative Example S-8, the blocking resistance was slightly reduced because no silicone resin was contained therein.

For the heat-sensitive adhesive material of Comparative Example S-9, the adhesive strength was weak and the blocking resistance was slightly reduced because only triphenylphosphine was used as a thermofusible material for the heat-sensitive tacky layer, although a styrene-butadiene copolymer was used as a thermoplastic resin for the under layer.

A heat-sensitive pressure-sensitive adhesive of the present invention and a heat-sensitive adhesive material using the heat-sensitive pressure-sensitive adhesive of the present invention can exhibit excellent adhesive strength under any environments of low temperatures (0° C.), room temperature and high temperatures (40° C.) and have strong adhesive strength to rough-surfaced adherends such as corrugated boards, are enabled to be thermally activated with low energy applied by a thermal head or the like and are also excellent in blocking resistance. The heat-sensitive pressure-sensitive adhesive and the heat-sensitive adhesive material of the present invention can be preferably and widely used in industrial, commercial and household applications.

Since the heat-sensitive pressure-sensitive adhesive of the present invention and the heat-sensitive adhesive material using the heat-sensitive pressure-sensitive adhesive of the present invention respectively have strong adhesive strength and have less decrease in adhesive strength with a lapse of time, are enabled to be thermally activated with low energy applied by a thermal head or the like and are also excellent in blocking resistance, they can be used, for example, for resin plates made from polyolefine (such as polyethylene and polypropylene), acryl, polyethylene terephthalate (PET), polystyrene, nylon, etc.; metal plates made from SUS, aluminum, etc.; paper products such as envelopes and corrugated boards; wraps made from polyolefins; wraps made from polyvinyl chloride and unwoven fabrics or bonded materials (such as envelopes), and in particular, they respectively have strong adhesive strength to adherends such as corrugated boards and can be solidly affixed thereto.

What is claimed is:

1. A heat-sensitive pressure-sensitive adhesive, comprising:
a thermoplastic resin, and
a thermofusible material,
wherein the thermoplastic resin has a glass transition temperature of −70° C. to −30° C., and the thermofusible material comprises triphenylphosphine represented by the following Structural Formula (i), and at least any one of tris(2,4-di-t-butylphenyl)phosphite represented by the following Structural Formula (ii) and tetrakis[3-(3,5-di-t-butyl-4-hydroxyphenyl)propionate]methane represented by the following Structural Formula (iii)

Structural Formula (i)

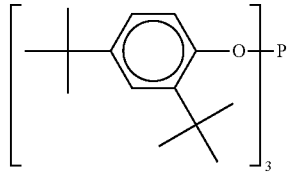

Structrural Formula (ii)

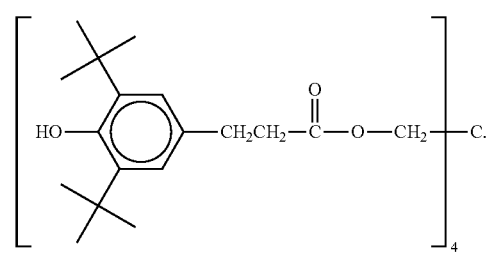

Structural Formula (iii)

2. The heat-sensitive pressure-sensitive adhesive according to claim 1, wherein a mass ratio (A:B) of the triphenylphosphine (A) to at least any one of the tris(2,4-di-t-butylphenyl) phosphite and tetrakis[3-(3,5-di-t-butyl-4-hydroxyphenyl)propionate]methane (B) is 75:25 to 50:50.

3. The heat-sensitive pressure-sensitive adhesive according to claim 1, further comprising a non-thermofusible material, wherein the non-thermofusible material is a spherical particle.

4. The heat-sensitive pressure-sensitive adhesive according to claim 3, wherein the non-thermofusible material is any one of a particle containing a silicone resin and a particle containing a crosslinked methyl polymethacrylate.

5. The heat-sensitive pressure-sensitive adhesive according to claim 1, used for a heat-sensitive adhesive material which comprises a support and a heat-sensitive tacky layer containing the heat-sensitive pressure-sensitive adhesive on one surface of the support.

6. A heat-sensitive pressure-sensitive adhesive, comprising:
a thermoplastic resin,
a thermofusible material, and
a non-thermofusible material,
wherein the thermofusible material comprises triphenylphosphine, and
wherein the thermoplastic resin is at least one selected from acrylic acid ester copolymers, methacrylic acid ester copolymers, acrylic acid ester-methacrylic acid ester copolymers, acrylic acid ester-styrene copolymers, acrylic acid ester-methacrylic acid ester-styrene copolymers, and ethylene-vinyl acetate copolymers.

7. The heat-sensitive pressure-sensitive adhesive according to claim 6, wherein the non-thermofusible material is a spherical particle.

8. The heat-sensitive pressure-sensitive adhesive according to claim 6, wherein the non-thermofusible material is any one of a particle containing a silicone resin and a particle containing a crosslinked methyl polymethacrylate.

9. The heat-sensitive pressure-sensitive adhesive according to claim 6, wherein a mass ratio of the thermofusible material to the thermoplastic resin is 0.5 to 2.0.

10. The heat-sensitive pressure-sensitive adhesive according to claim 1, wherein the thermofusible material comprises a dispersing agent, and the dispersing agent is a polyvinyl alcohol resin.

11. The heat-sensitive pressure-sensitive adhesive according to claim 10, wherein the polyvinyl alcohol resin has a number average molecular mass of 10,000 to 40,000 and a saponification degree of 70% or more.

12. A heat-sensitive pressure-sensitive adhesive, comprising:
a thermoplastic resin,
a thermofusible material,
a non-thermofusible material, and
an adhesion imparting agent,
wherein the thermofusible material comprises triphenylphosphine, and
wherein the adhesion imparting agent is at least one selected from rosin ester resins, terpene resins, aromatic-modified terpene resins, terpene phenol resins and hydrogenated terpene resins.

13. The heat-sensitive pressure-sensitive adhesive according to claim 6, used for a heat-sensitive adhesive material which comprises a support and a heat-sensitive tacky layer containing the heat-sensitive pressure-sensitive adhesive on one surface of the support.

14. A heat-sensitive adhesive material, comprising:
a support, and
at least an under layer, and a heat-sensitive tacky layer formed in this order on one surface of the support,
wherein the under layer is between the support and the heat-sensitive tacky layer, and wherein the under layer comprises a thermoplastic resin having a glass transition temperature (Tg) of $-35°C$ to $25°C$ and a hollow filler, the thermoplastic resin comprises any one selected from styrene-butadiene copolymers and modified compounds thereof; the heat-sensitive tacky layer comprises a thermoplastic resin, an adhesion imparting agent and a thermofusible material, and the thermofusible material comprises at least triphenylphosphine.

15. The heat-sensitive adhesive material according to claim 14, wherein the heat-sensitive tacky layer further comprises a non-thermofusible material.

16. The heat-sensitive adhesive material according to claim 15, wherein the non-thermofusible material comprises a particle containing a silicone resin.

17. The heat-sensitive adhesive material according to claim 14, wherein the modified compound of styrene-butadiene copolymer is a carboxy-modified styrene-butadiene copolymer.

18. The heat-sensitive adhesive material according to claim 14, wherein the hollow filler is a spherical hollow particle having a volume average particle diameter of 2.0 µm to 5.0 µm, and the spherical hollow particle has a hollow rate of 70% or more.

19. The heat-sensitive adhesive material according to claim 18, wherein material of the spherical hollow particle is any one of a vinylidene chloride-acrylonitrile copolymer, an acrylonitrile-vinylidene chloride-methyl methacrylate copolymer and an acrylonitrile-methacrylonitrile-isobonyl methacrylate copolymer.

20. The heat-sensitive adhesive material according to claim 14, wherein a mixture ratio of the thermoplastic resin to the hollow filler in the under layer is 0.1 parts by mass to 2 parts by mass of the hollow filler to 1 part by mass of the thermoplastic resin.

21. The heat-sensitive adhesive material according to claim 14, wherein the thermofusible material further comprises a benzotriazole compound represented by the following Structural Formula (1),

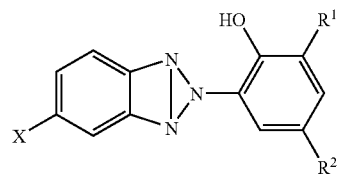

Structural Formula (1)

wherein $R^1$ and $R^2$ may be the same to each other or may be different from each other, and respectively represent any one of a hydrogen atom, an alkyl group and an α,α-dimethylbenzyl group; and X represents any one of a hydrogen atom and a halogen atom.

22. The heat-sensitive adhesive material according to claim 14, wherein a content of the triphenylphosphine in the thermofusible material is 50% by mass to 90% by mass.

23. The heat-sensitive adhesive material according to claim 14, wherein a dry adhesion amount of the heat-sensitive tacky layer is 5 g/m² to 20 g/m².

24. The heat-sensitive adhesive material according to claim 14, wherein the support has at least a heat-sensitive recording layer on the opposite surface thereof from the surface having the heat-sensitive tacky layer, and the heat-sensitive recording layer comprises at least a leuco dye and a color developer.

25. The heat-sensitive adhesive material according to claim 14, formed in any one of a label, a sheet, a label sheet and a roll.

* * * * *